US012761456B2

(12) United States Patent
Hillman et al.

(10) Patent No.: US 12,761,456 B2
(45) Date of Patent: Oct. 13, 2026

(54) SWEPT, CONFOCALLY-ALIGNED, PLANAR EXCITATION (SCAPE) MICROSCOPY USING A GRADED-INDEX (GRIN) LENS

(71) Applicant: The Trustees of Columbia University in the City of New York, New York, NY (US)

(72) Inventors: Elizabeth M.C. Hillman, New York, NY (US); Wenxuan Liang, Rushan (CN)

(73) Assignee: The Trustees of Columbia University in the City of New York, New York, NY (US)

( * ) Notice: Subject to any disclaimer, the term of this patent is extended or adjusted under 35 U.S.C. 154(b) by 282 days.

(21) Appl. No.: 18/388,947

(22) Filed: Nov. 13, 2023

(65) Prior Publication Data

US 2024/0085681 A1 Mar. 14, 2024

Related U.S. Application Data

(63) Continuation of application No. PCT/US2022/029444, filed on May 16, 2022.

(Continued)

(51) Int. Cl.
*G02B 21/00* (2006.01)
*G02B 3/00* (2006.01)

(Continued)

(52) U.S. Cl.
CPC ....... *G02B 21/0076* (2013.01); *G02B 3/0087* (2013.01); *G02B 21/0048* (2013.01); *G02B 21/33* (2013.01); *G02B 21/361* (2013.01)

(58) Field of Classification Search
CPC ............ G02B 21/0024; G02B 21/0048; G02B 21/361; G02B 21/0032
See application file for complete search history.

(56) References Cited

U.S. PATENT DOCUMENTS 8,582,203 B2 11/2013 Dunsby
8,619,237 B2 12/2013 Hillman et al.

(Continued)

FOREIGN PATENT DOCUMENTS

WO 2015109323 A2 7/2015
WO 2017015077 A1 1/2017

(Continued)

OTHER PUBLICATIONS

Botcherby et al., "An optical technique for remote focusing in microscopy," Optics Communications, vol. 281, pp. 880-887, 2008.

(Continued)

*Primary Examiner* — Lauren Nguyen
(74) *Attorney, Agent, or Firm* — Potomac Law Group, PLLC

(57) ABSTRACT

This application describes Swept, Confocally-Aligned Planar Excitation (SCAPE) microscopy systems that incorporate a gradient index (GRIN) lens to relay images from their distal tip to their proximal tip so that 3D images of deep tissue can be captured, without undue loss of light. A zero working distance feature can be designed into the third objective to ensure that the light that exits the second objective in the SCAPE system is not lost. Alternatively, a tapered fiber bundle may be positioned between the second objective and the third objective in the SCAPE system to ensure that the light that exits the second objective is not lost. As yet another alternative, direct detection at the intermediate image plane without using a third objective can ensure that the light that exits the second objective in the SCAPE system is not lost.

7 Claims, 41 Drawing Sheets

Related U.S. Application Data

(60) Provisional application No. 63/189,797, filed on May 18, 2021, provisional application No. 63/190,110, filed on May 18, 2021, provisional application No. 63/189,195, filed on May 16, 2021.

(51) Int. Cl.
*G02B 21/33* (2006.01)
*G02B 21/36* (2006.01)

(56) References Cited

U.S. PATENT DOCUMENTS

| | | | | |
|---|---|---|---|---|
| 9,516,997 | B2 | 12/2016 | Shishkov et al. | |
| 9,655,523 | B2 | 5/2017 | Hillman et al. | |
| 9,846,121 | B2 | 12/2017 | Schönborn | |
| 10,019,838 | B2 | 7/2018 | Liu et al. | |
| 10,061,111 | B2 | 8/2018 | Hillman et al. | |
| 10,386,302 | B2 | 8/2019 | Keller | |
| 10,690,849 | B2 | 6/2020 | Lipson et al. | |
| 10,831,014 | B2 | 11/2020 | Hillman | |
| 10,835,111 | B2 | 11/2020 | Hillman | |
| 10,852,520 | B2 | 12/2020 | Hillman et al. | |
| 10,897,610 | B2 | 1/2021 | Banks | |
| 10,908,088 | B2 | 2/2021 | Voleti et al. | |
| 10,955,652 | B2 | 3/2021 | Hillman et al. | |
| 11,036,037 | B2 | 6/2021 | Hillman et al. | |
| 11,109,758 | B2 | 9/2021 | Hillman et al. | |
| 11,269,169 | B2 | 3/2022 | Hillman et al. | |
| 11,317,787 | B2 | 5/2022 | Hillman et al. | |
| 11,333,874 | B2 | 5/2022 | Hillman et al. | |
| 11,604,342 | B2 | 3/2023 | Hillman et al. | |
| 2015/0185454 | A1 | 7/2015 | Kalkbrenner et al. | |
| 2016/0213252 | A1 | 7/2016 | Hillman et al. | |
| 2016/0327779 | A1* | 11/2016 | Hillman | G02B 21/0032 |
| 2019/0167081 | A1 | 6/2019 | Hillman | |
| 2020/0348505 | A1 | 11/2020 | Gopinath et al. | |
| 2021/0026071 | A1 | 1/2021 | Lipson et al. | |
| 2021/0041683 | A1* | 2/2021 | Huang | G02B 21/082 |

FOREIGN PATENT DOCUMENTS

| | | | |
|---|---|---|---|
| WO | 2018052905 | A1 | 3/2018 |
| WO | 2020176591 | A1 | 9/2020 |
| WO | 2020188018 | A1 | 9/2020 |

OTHER PUBLICATIONS

Cheng et al., "In vivo deep-brain imaging of microglia enabled by three-photon fluorescence microscopy," Opt. Lett., vol. 45, No. 18, pp. 5271-5274, Sep. 2020.

Chien et al., "Dual GRIN lens two-photon endoscopy for high-speed volumetric and deep brain imaging," Biomed. Opt Express, vol. 12, No. 1, pp. 162-172, 2021.

Dean-Ben et al., "Functional optoacoustic neuro-tomography for scalable whole-brain monitoring of calcium indicators," Light Sci Appl., vol. 5, No. 12, e16201, Dec. 2016.

Dunsby, "Optically sectioned imaging by oblique plane microscopy", Optics Express, 16(25), Dec. 2008, 11 pgs.

Hillman et al., "High-speed 3D imaging of cellular activity in the brain using axially-extended beams and light sheets", Current Opinioin in Neurobiology, vol. 50, pp. 190-200, Jun. 2018.

Hillman et al., "Light-Sheet Microscopy in Neuroscience," Annu. Rev. Neurosci., vol. 42, pp. 295-313, Jul. 2019.

International Search Report and Written Opinion mailed Sep. 28, 2022 for International Patent Application No. PCT/US2022/029444.

Meng et al., "High-throughput synapse-resolving two-photon fluorescence microendoscopy for deep-brain volumetric imaging in vivo," eLife, vol. 8, e40805, Jan. 2019.

Ozbay et al., "Three dimensional two-photon brain imaging in freely moving mice using a miniature fiber coupled microscope with active axial-scanning," Sci. Rep., vol. 8, No. 1, p. 8108, May 2018.

Sacher et al., "Implantable photonic neural probes for light-sheet fluorescence brain imaging," Neurophotonics, vol. 8, No. 2, p. 025003, Apr. 2021.

Tadayon et al., "3D microphotonic probe for high resolution deep tissue imaging," Opt. Express, vol. 27, No. 16, pp. 22352-22362, Aug. 2019.

Turtaev et al., "High-fidelity multimode fibre-based endoscopy for deep brain in vivo imaging," Light Sci. App., vol. 7, p. 92, Nov. 2018.

Vasquez-Lopez et al., "Subcellular spatial resolution achieved for deep-brain imaging in vivo using a minimally invasive multimode fiber," Light Sci. App., vol. 7, article 110, Dec. 2018.

Velasco et al., "3D super-resolution deep-tissue imaging in living mice," Optica, vol. 8, Issue 4, pp. 442-450, Apr. 2021.

Wang et al., "Deep brain photoacoustic tomography at single-neuron resolution using arrays of photonic emitters and high-frequency ultrasound transducers," NIH Grant 5U01NS099717-03, Sep. 30, 2016.

Xie et al., "UNS:MEMS-based Fiber-optic Two-photon Microscopy Probe for Real Time In vivo 3D Neural Imaging in Freely Behaving Animals," NSF Grant 1512531, Apr. 15, 2015.

Yang et al., "Epi-illumination SPIM for Volumetric Imaging with High Spatial-temporal Resolution," Nature Methods, vol. 16, No. 5, pp. 501-504, Jun. 2019.

Yang et al., "High-Resolution, Large Field-of-View, and Multi-View Single Objective Light-Sheet Microscopy," bioRxiv preprint, Sep. 2020, pp. 1-10.

Extended European Search Report dated Mar. 18, 2025 for European Patent Application No. 22805258.5.

* cited by examiner

Because NA = 1 in air is 90 degree acceptance angle = maximum.

Equivalent collection from water immersion NA 1.0 – because air to water transmission compresses the cone from 90 degrees to 48 degrees.

$n_1 \sin(\theta_1)=n_2 \sin(\theta_2)$
asin(1/1.33) = 48.8°
Critical angle in water.

| n1 | n2 | α1 | δ | other cone | top cone | bot. cone |
|---|---|---|---|---|---|---|
| 1 | 1.33 | 64.2 | 4.2 | 76.42 | 48.58 | 27.84 |

< acceptance angle of NA 1.0 water objective

| n1 | n2 | α1 | δ | other cone | top cone | bot. cone |
|---|---|---|---|---|---|---|
| 1 | 1.33 | 64.2 | 4.2 | 76.42 | 48.58 | 27.84 |

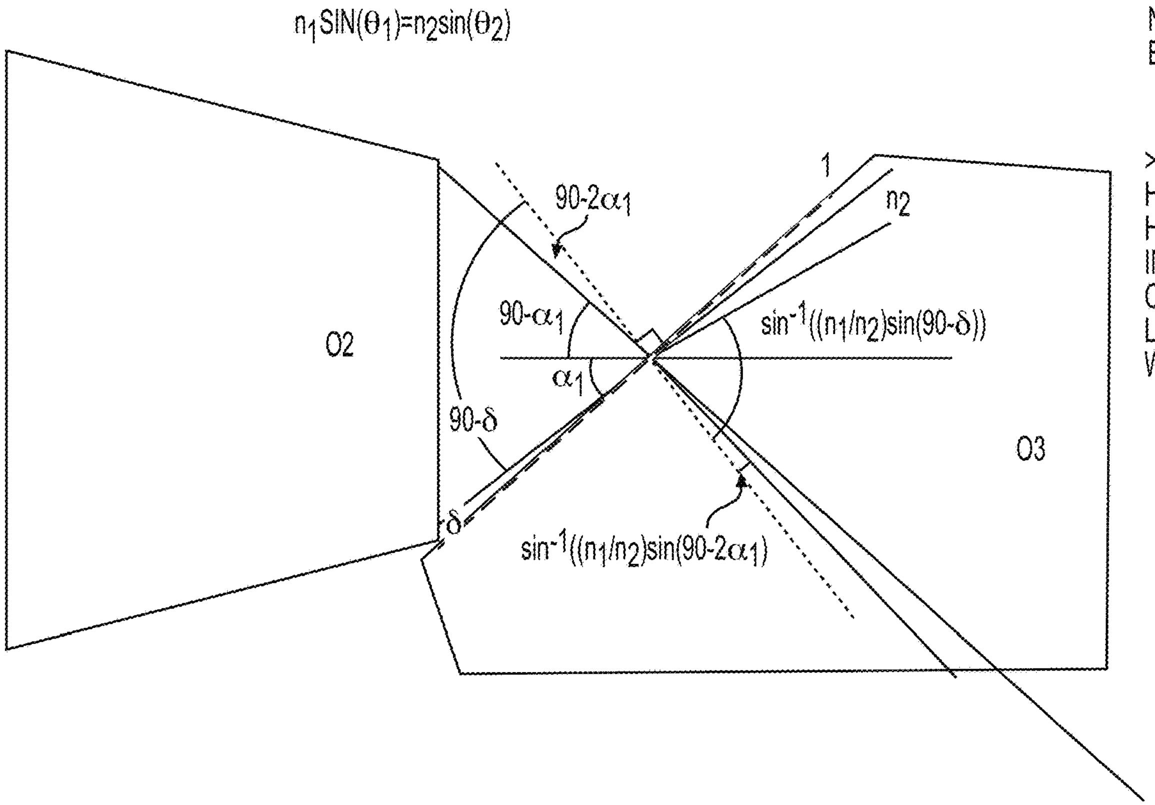

LOOKING AT LOWER NA AT O2. NOTHING CHANGES HERE- EQUATIONS ARE EQUIVALENT.

>RELAXES REQUIREMENTS FOR HIGH NA AT O1 (EVEN THOUGH HIGH CROSSING ANGLE IS ALSO IMPORTANT, THIS APPROACH CAN GATHER THE MAJORITY OF LIGHT AVAILABLE THROUGH O1 WITHOUT ANGLE -RELATED LOSSES).

| n1 | n2 | α1 | δ | OTHER CONE | TOP CONE | BOTTOM CONE |
|---|---|---|---|---|---|---|
| 1 | 1.33 | 40.00 | 4.2 | 41.08 | 48.58 | -7.50 |

| n1 | n2 | α1 | δ | OTHER CONE | TOP CONE | BOTTOM CONE |
|---|---|---|---|---|---|---|
| 1 | 1.33 | 64.2 | 4.2 | 76.42 | 48.58 | 27.84 |

< ACCEPTANCE ANGLE OF NA 1.0 WATER OBJECTIVE

FIG. 5E $$R_s = \left| \frac{n_1 \cos\theta_i - n_2 \cos\theta_t}{n_1 \cos\theta_i + n_2 \cos\theta_t} \right|^2 = \left| \frac{n_1 \cos\theta_i - n_2 \sqrt{1 - \left(\frac{n_1}{n_2} \sin\theta_i\right)^2}}{n_1 \cos\theta_i + n_2 \sqrt{1 - \left(\frac{n_1}{n_2} \sin\theta_i\right)^2}} \right|^2,$$

$$R_p = \left| \frac{n_1 \cos\theta_t - n_2 \cos\theta_i}{n_1 \cos\theta_t + n_2 \cos\theta_i} \right|^2 = \left| \frac{n_1 \sqrt{1 - \left(\frac{n_1}{n_2} \sin\theta_i\right)^2} - n_2 \cos\theta_i}{n_1 \sqrt{1 - \left(\frac{n_1}{n_2} \sin\theta_i\right)^2} + n_2 \cos\theta_i} \right|^2,$$

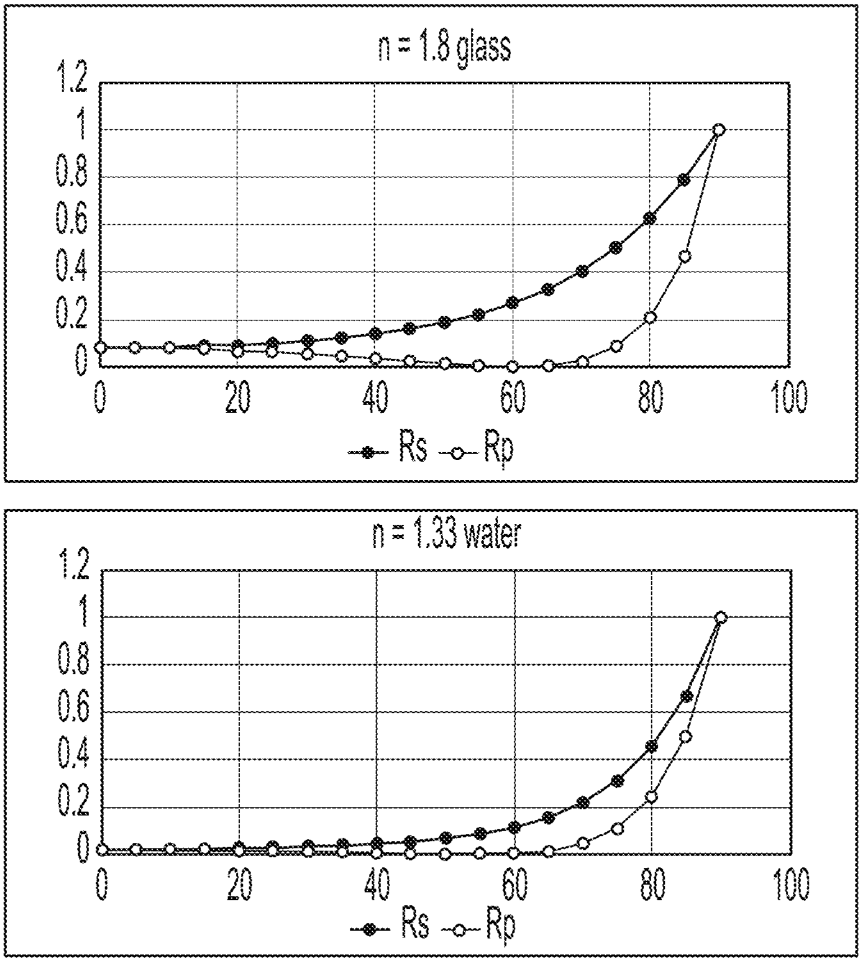

FIG. 5g

| | | |
|---|---|---|
| n1 | 1 | |
| n2 | 1.33 | |
| theta i | Rs | Rp |
| 0 | 0.020059 | 0.020059 |
| 5 | 0.02029 | 0.019829 |
| 10 | 0.021001 | 0.019138 |
| 15 | 0.022246 | 0.017981 |
| 20 | 0.024124 | 0.016356 |
| 25 | 0.026792 | 0.014265 |
| 30 | 0.030488 | 0.011736 |
| 35 | 0.035571 | 0.008838 |
| 40 | 0.042575 | 0.005729 |
| 45 | 0.052307 | 0.002736 |
| 50 | 0.065999 | 0.000501 |
| 55 | 0.085546 | 0.000259 |
| 60 | 0.113898 | 0.004353 |
| 65 | 0.15566 | 0.017219 |
| 70 | 0.218032 | 0.047281 |
| 75 | 0.312189 | 0.110664 |
| 80 | 0.45519 | 0.238642 |
| 85 | 0.672384 | 0.493072 |
| 90 | 1 | 1 |

| | | |
|---|---|---|
| n1 | 1 | |
| n2 | 1.8 | |
| theta i | Rs | Rp |
| 0 | 0.081633 | 0.081633 |
| 5 | 0.082326 | 0.080941 |
| 10 | 0.084442 | 0.078862 |
| 15 | 0.088089 | 0.07538 |
| 20 | 0.093456 | 0.070475 |
| 25 | 0.10083 | 0.064135 |
| 30 | 0.110617 | 0.056373 |
| 35 | 0.123376 | 0.04726 |
| 40 | 0.139863 | 0.036985 |
| 45 | 0.161095 | 0.025952 |
| 50 | 0.188423 | 0.014948 |
| 55 | 0.223643 | 0.005453 |
| 60 | 0.269114 | 0.000173 |
| 65 | 0.327916 | 0.004041 |
| 70 | 0.404011 | 0.026106 |
| 75 | 0.502419 | 0.083276 |
| 80 | 0.629355 | 0.208144 |
| 85 | 0.79231 | 0.466483 |
| 90 | 1 | 1 |

FIG. 5g
CONTINUED

Methods of casting and positioning add-on "blob"

2. Assembly of polymer blob and O3

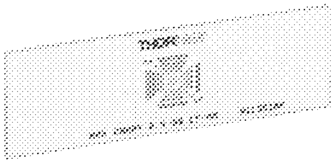

Bring polymer blob in contact with a clean, patterned glass slide (e.g. Resolution target)

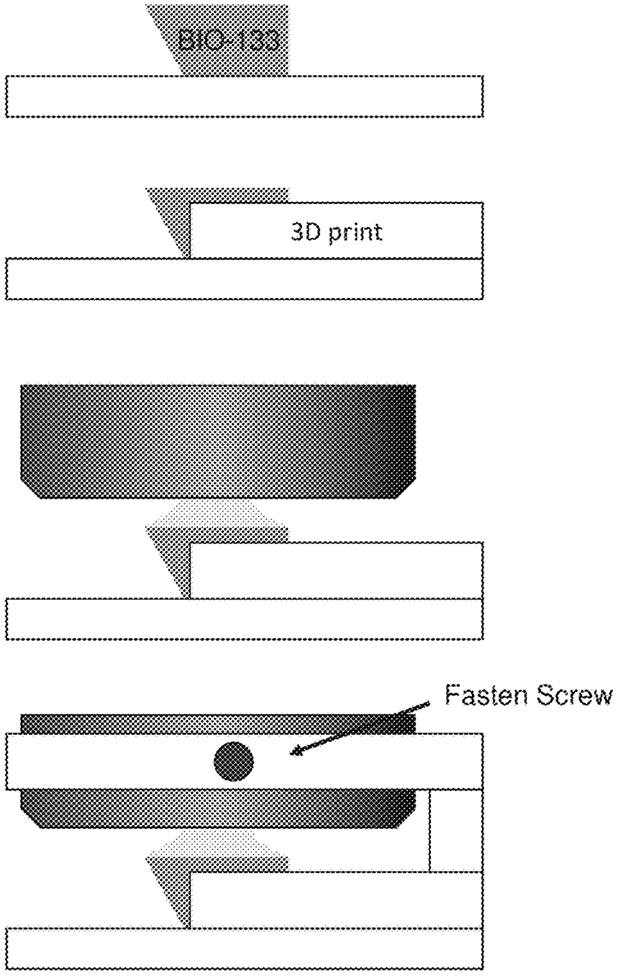

Gently bring a 3D printed support in contact with the polymer. This is intended to support the polymer later and avoid polymer buckling. The support and the polymer can be bonded together with UV glue Place the assembly under O3 and fill in the gap with water. Focus O3 until there is a focused image on the camera with a tube lens at infinity.

Attach a second 3D printed device to the polymer assembly. The idea here is to secure the polymer blob at the optimal position by continuously observing the resolution target from the camera.

FIG. 7f

SWEPT, CONFOCALLY-ALIGNED, PLANAR EXCITATION (SCAPE) MICROSCOPY USING A GRADED-INDEX (GRIN) LENS

CROSS REFERENCE TO RELATED APPLICATIONS

This Application is a continuation of International Application PCT/US2022/029444, filed May 16, 2022, which claims the benefit of U.S. Provisional Applications 63/189,195 (filed May 16, 2021), 63/189,797 (filed May 18, 2021), and 63/190,110 (filed May 18, 2021), each of which is incorporated herein by reference in its entirety.

STATEMENT REGARDING FEDERALLY-SPONSORED RESEARCH

This invention was made with government support under grants NS108213, NS094296, NS104649, and CA236554 awarded by the National Institutes of Health. The government has certain rights in the invention.

BACKGROUND

Existing approaches for imaging structures within a living animal's brain include imaging using 'mini-cam' head mounted recordings in freely moving animals and using point-scanning 2-photon (head-fixed) systems. Mini-cam images are 2D epi-fluorescence and can be blurry and challenging to interpret. And 2-photon images typically only capture a single 2D plane and not a 3D volume. 2D data is difficult to interpret, captures a limited volume of tissue, and makes cell identification challenging. The prior art approaches of capturing activity in a single 2D plane not only samples a fraction of the network, but it also precludes any analysis of interactions between cells that extend between multiple planes.

U.S. Pat. Nos. 10,061,111, 10,831,014, 10,835,111, 10,852,520, and 10,908,088, each of which is incorporated herein by reference, describe a variety of approaches for implementing Swept, Confocally-Aligned Planar Excitation (SCAPE) microscopy, which is a 3D imaging technique.

SUMMARY OF THE INVENTION

One aspect of this application is directed to a first imaging apparatus. The first imaging apparatus comprises a first set of optical components, a GRIN lens, a second set of optical components, a scanning element, and a third objective with an associated optical interface. The first set of optical components has a proximal end and a distal end. The first set of optical components includes a first objective disposed at the distal end of the first set of optical components. The GRIN lens is positioned distally beyond the first objective. The second set of optical components has a proximal end and a distal end. The second set of optical components includes a second objective disposed at the distal end of the second set of optical components.

The scanning element is disposed proximally with respect to the proximal end of the first set of optical components and proximally with respect to the proximal end of the second set of optical components. The scanning element is positioned to route a sheet of excitation light so that the sheet of excitation light will pass in a proximal to distal direction through the first set of optical components and through the GRIN lens, and project into a sample that is positioned distally beyond the GRIN lens. The sheet of excitation light is projected into the sample at an oblique angle with respect to an optical axis of the first objective, and the sheet of excitation light is projected into the sample at a position that varies depending on an orientation of the scanning element. The GRIN lens and the first set of optical components route detection light from the sample in a distal to proximal direction back to the scanning element. The scanning element is also positioned to route the detection light so that the detection light will pass through the second set of optical components in a proximal to distal direction and form an oblique intermediate image plane at a position that is distally beyond the distal end of the second set of optical components. The third objective with the associated optical interface are collectively positioned to route light that arrives at the oblique intermediate image plane towards a camera, wherein the third objective and the associated optical interface are collectively configured to provide a zero working distance to maximize detection NA.

Some embodiments of the first imaging apparatus further comprise a light source that generates a beam of excitation light; at least one optical component that expands the beam of excitation light into the sheet of excitation light and directs the sheet of excitation light towards the scanning element; and the camera.

Some embodiments of the first imaging apparatus further comprise an image splitter positioned between the third objective and the camera. The image splitter is configured to direct first wavelength light to a first portion of an image sensor within the camera and to direct second wavelength light to a second portion of the image sensor.

In some embodiments of the first imaging apparatus, the second objective is an air objective and the third objective is a non-air immersion objective, and the associated optical interface comprises a fluid chamber positioned so that the oblique intermediate image plane is formed at an interface of an immersion medium of the third objective.

In some embodiments of the first imaging apparatus, the second objective is an air objective and the third objective is a non-air immersion objective, and the associated optical interface comprises a cured polymer spacer having a refractive index that matches an immersion medium of the third objective. The cured polymer spacer is affixed directly to a front surface of the third objective, and the cured polymer spacer is positioned so that the oblique intermediate image plane is formed on a face of the cured polymer spacer.

In some embodiments of the first imaging apparatus, the second objective is an air objective and the third objective is a 1.0 NA water immersion objective, and the associated optical interface comprises a cured polymer spacer having a refractive index of 1.33. The cured polymer spacer is affixed directly to a front surface of the third objective, and the cured polymer spacer is positioned so that the oblique intermediate image plane is formed on a face of the cured polymer spacer. Optionally, in these embodiments, the third objective is not coverglass corrected.

In some embodiments of the first imaging apparatus, the third objective and the associated optical interface are integrated together into a single package.

Another aspect of this application is directed to a second imaging apparatus. The second imaging apparatus comprises a first set of optical components, a GRIN lens, a second set of optical components, a scanning element, a bundle of optical fibers, and a third objective. The first set of optical components has a proximal end and a distal end, and the first set of optical components includes a first objective disposed at the distal end of the first set of optical components. The GRIN lens is positioned distally beyond the first objective. The second set of optical components has a proximal end and a distal end, and the second set of optical components includes a second objective disposed at the distal end of the second set of optical components.

The scanning element is disposed proximally with respect to the proximal end of the first set of optical components and proximally with respect to the proximal end of the second set of optical components. The scanning element is positioned to route a sheet of excitation light so that the sheet of excitation light will pass in a proximal to distal direction through the first set of optical components and through the GRIN lens, and project into a sample that is positioned distally beyond the GRIN lens. The sheet of excitation light is projected into the sample at an oblique angle with respect to an optical axis of the first objective, and the sheet of excitation light is projected into the sample at a position that varies depending on an orientation of the scanning element. The GRIN lens and the first set of optical components route detection light from the sample in a distal to proximal direction back to the scanning element. The scanning element is also positioned to route the detection light so that the detection light will pass through the second set of optical components in a proximal to distal direction and form an oblique intermediate image plane at a position that is distally beyond the distal end of the second set of optical components.

The bundle of optical fibers has an optical axis, a first end, and a second end, and the first end is positioned at the oblique intermediate image plane so that light from the oblique intermediate image plane enters the first end of the bundle and is directed through the bundle to the second end of the bundle. The first end is positioned to both collect light and provide image rotation. The third objective is positioned to accept light that exits the second end of bundle and route the accepted light towards a camera, and the third objective has an optical axis that is aligned with the optical axis of the bundle.

Some embodiments of the second apparatus further comprise a light source that generates a beam of excitation light; at least one optical component that expands the beam of excitation light into the sheet of excitation light and directs the sheet of excitation light towards the scanning element; and the camera.

In some embodiments of the second apparatus, the first end is beveled with respect to the optical axis of the bundle. In some embodiments of the second apparatus, the bundle of optical fibers comprises a bundle of tapered fibers that are oriented so that the diameters of the tapered fibers are largest at the second end of the bundle.

In some embodiments of the second apparatus, the first end is beveled with respect to the optical axis of the bundle, the bundle of optical fibers comprises a bundle of tapered fibers that are oriented so that the diameters of the tapered fibers are largest at the second end of the bundle, and the first end of the bundle of optical fibers has an NA of 1.0.

Some embodiments of the second apparatus further comprise a wide-field camera, a second light source, and a first beam splitter. The first beam splitter is positioned within the first set of optical components, and is configured to route illumination light from the second light source towards the first objective so that the illumination light illuminates an outer surface of a region of tissue that surrounds the GRIN lens after the GRIN lens has been embedded in subject tissue. The first beam splitter is further configured to route light that arrives from the outer surface towards the wide-field camera.

Some embodiments of the second apparatus further comprise a wide-field camera, a second light source, and a first beam splitter. The first beam splitter is positioned within the first set of optical components, and is configured to route illumination light from the second light source towards the first objective so that the illumination light illuminates an outer surface of a region of tissue that surrounds the GRIN lens after the GRIN lens has been embedded in subject tissue. The first beam splitter is further configured to route fluorescence light that arrives from the outer surface towards the wide-field camera.

Optionally, the embodiments of the previous paragraph may further comprise a second beam splitter positioned and configured to route illumination light from the second light source towards the first beam splitter and route fluorescence light arriving from the first beam splitter towards the wide-field camera.

Another aspect of this application is directed to a third imaging apparatus that comprises a first set of optical components, a second set of optical components, a scanning element, and at least one additional optical component. The first set of optical components has a proximal end and a distal end, and the first set of optical components includes a first GRIN objective disposed at the distal end of the first set of optical components. The second set of optical components has a proximal end and a distal end, and the second set of optical components includes a second objective disposed at the distal end of the second set of optical components.

The scanning element is disposed proximally with respect to the proximal end of the first set of optical components and proximally with respect to the proximal end of the second set of optical components. The scanning element is positioned to route a sheet of excitation light so that the sheet of excitation light will pass in a proximal to distal direction through the first set of optical components and project into a sample that is positioned distally beyond the first GRIN objective. The sheet of excitation light is projected into the sample at an oblique angle with respect to an optical axis of the first GRIN objective, and the sheet of excitation light is projected into the sample at a position that varies depending on an orientation of the scanning element. The first set of optical components routes detection light from the sample in a distal to proximal direction back to the scanning element. The scanning element is also positioned to route the detection light so that the detection light will pass through the second set of optical components in a proximal to distal direction and form an oblique intermediate image plane at a position that is distally beyond the distal end of the second objective.

The at least one additional optical component is positioned distally beyond the oblique intermediate image plane. The at least one additional optical component is positioned and configured to (a) route light that arrives at the oblique intermediate image plane towards a camera, and (b) to correct for an angle of the oblique intermediate image plane.

Some embodiments of the third apparatus further comprise a light source that generates a beam of excitation light; and at least one optical component that expands the beam of excitation light into the sheet of excitation light and directs the sheet of excitation light towards the scanning element; and the camera.

In some embodiments of the third apparatus, the second objective is a GRIN objective. Optionally, in these embodiments, the first GRIN objective and the second objective have identical specifications.

In some embodiments of the third apparatus, the at least one additional optical component comprises a tapered bundle of optical fibers having a small end and a large end, and a polymer spacer with a refractive index of 1.33 having a front face and a rear face. The front face is positioned against the second objective and the rear face is positioned against the small end of the tapered bundle of optical fibers.

In some embodiments of the third apparatus, the at least one additional optical component comprises a bundle of optical fibers having a first end that is positioned at the oblique intermediate image plane. Optionally, in these embodiments, the first end is beveled with respect to the optical axis of the bundle of optical fibers.

In some embodiments of the third apparatus, the at least one additional optical component comprises a third objective having an optical axis that is perpendicular to the oblique intermediate image plane.

In some embodiments of the third apparatus, the at least one additional optical component comprises a third objective having an optical axis that is perpendicular to the oblique intermediate image plane. These embodiments further comprise a cured polymer spacer having a refractive index that matches an immersion medium of the third objective. The cured polymer spacer is affixed directly to a front surface of the third objective, and the cured polymer spacer is positioned so that the oblique intermediate image plane is formed on a face of the cured polymer spacer. The second objective is an air objective and the third objective is a non-air immersion objective.

In some embodiments of the third apparatus, the at least one additional optical component comprises a third objective having an optical axis that is perpendicular to the oblique intermediate image plane. These embodiments further comprise a cured polymer spacer having a refractive index of 1.33. The cured polymer spacer is affixed directly to a front surface of the third objective, and the cured polymer spacer is positioned so that the oblique intermediate image plane is formed on a face of the cured polymer spacer. The second objective is an air objective and the third objective is a 1.0 NA water immersion objective.

In some embodiments of the third apparatus, the at least one additional optical component comprises a third objective having an optical axis that is perpendicular to the oblique intermediate image plane, and the third objective and an associated optical interface are integrated together into a single package.

BRIEF DESCRIPTION OF THE DRAWINGS

FIGS. 5*a*-5*e* depict geometrical relationships between two objectives used to analyze a zero working distance approach.

FIGS. 5*f*-5*g* depict expected angle-dependent reflection losses for glass vs. water interfaces for ZWD lenses.

FIG. 7*f* depicts a set of steps for affixing an add-on spacer to the third objective.

Various embodiments are described in detail below with reference to the accompanying drawings, wherein like reference numerals represent like elements.

DESCRIPTION OF THE PREFERRED EMBODIMENTS

This application describes improvements to conventional SCAPE systems that incorporate a gradient index (GRIN)

lens. As used herein: O1, O2, and O3 respectively refer to the first, second, and third objectives in a SCAPE system from sample to detector, and NA refers to numerical aperture.

One of optical microscopy's biggest limitations is its limited ability to image deep into scattering tissue. Imaging the deeper layers of mouse cortex at cellular resolution remains a significant problem, and cellular imaging of deep brain regions such as hippocampus, thalamus and striatum is beyond the reach of conventional non-invasive microscopy from the cortical surface.

GRIN lenses are solid glass cylinders that can relay images from their distal to proximal tip. With diameters between 200 and 2000 microns and lengths over 8 mm, they can be carefully inserted into the living brain and provide optical access to almost any brain region with minimal disruption to the function of overlying tissues. GRIN lenses can therefore overcome the penetration depth limitations of prior art cortical imaging methods caused by the scattering properties of the brain, permitting observation of a wide range of deeper brain regions including hippocampus, thalamus, striatum, orbitofrontal cortex and brainstem. The GRIN lens base embodiments described herein can capture the activity and interactions of a wide range of cell types during behavior, including cellular activity patterns in freely moving awake animals.

The embodiments described herein build upon the inventor's development of high-speed 3D swept confocally aligned planar excitation (SCAPE) microscopy to develop GRIN-SCAPE, a technology for high-speed, high-resolution, optionally multispectral 3D imaging of cellular activity through implanted GRIN lenses. GRIN-SCAPE can provide the ability to image in a wide array of brain regions beyond the cortex to capture the 3D dynamics of large populations of multiple cell-types in awake, behaving animals. GRIN-SCAPE can enable the study of circuit dynamics within structures that have widely differing cellular compositions, architectures, dynamics and functions compared to cortex.

The inventor's preliminary data confirms the feasibility of GRIN-SCAPE, and shows that 1-photon excitation is sufficient for well-resolved 3D imaging in-vivo, greatly reducing complexity and improving affordability.

Figure 2:
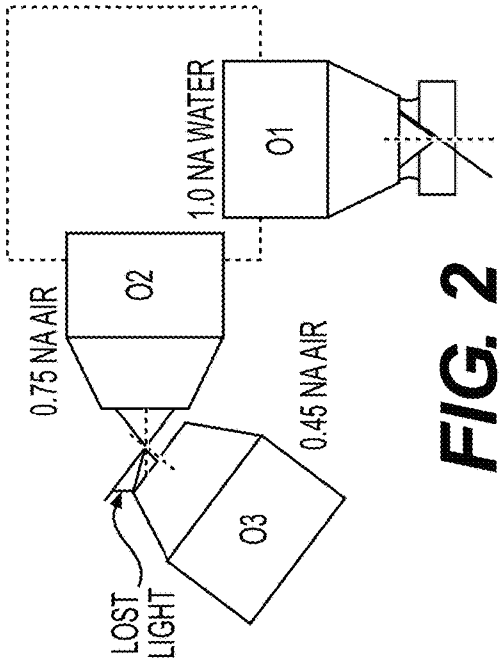
FIG. 2 depicts a conventional SCAPE system.
Figure 1:
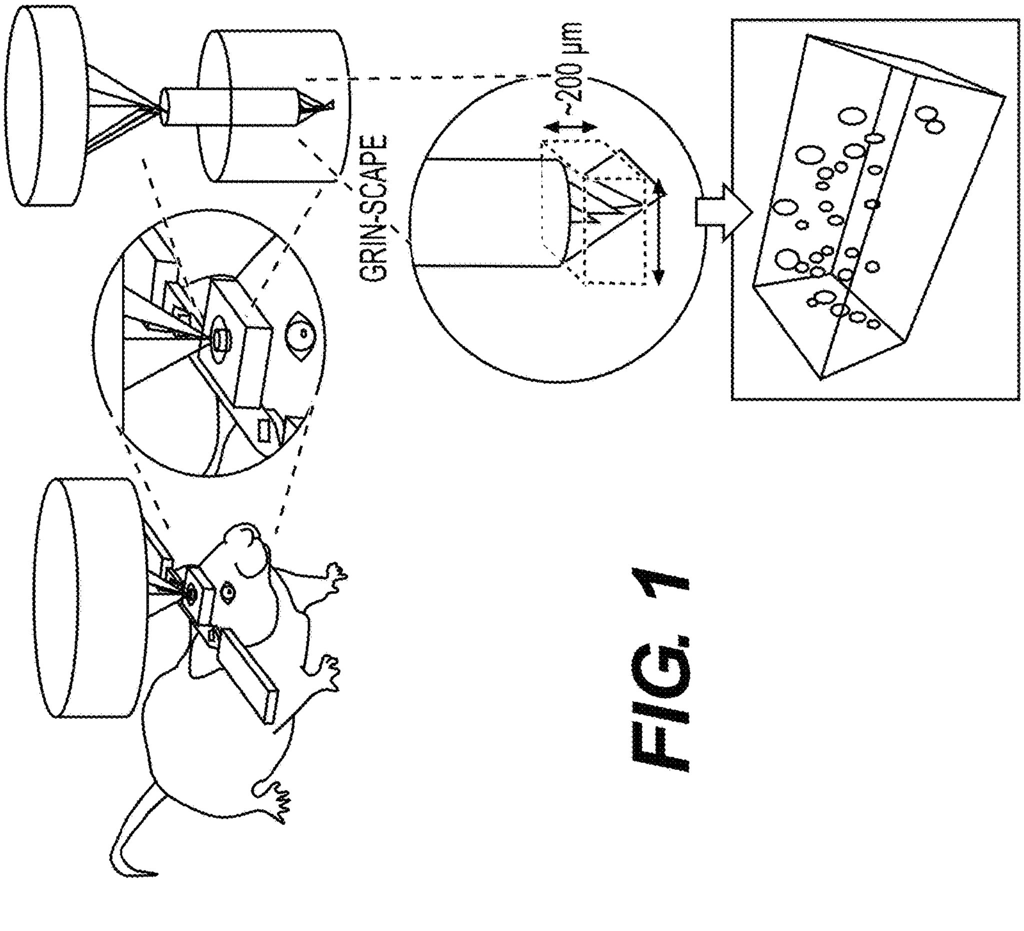
FIG. 1 depicts how a GRIN lens relays images of deep cells to the proximal side of the lens.

When a GRIN lens is inserted into the brain or other tissue, the GRIN lens relays images of deep cells to the proximal side of the lens, as depicted in FIG. 1. In view of this, one might initially expect that aiming a conventional SCAPE system into the proximal end of an implanted GRIN lens would provide 3D images of the tissue that is positioned immediately beyond the deep end of the GRIN lens. But this initial expectation would be wrong because conventional SCAPE systems like the one depicted in FIG. 2 use objectives O1 and O2 that have relatively high NAs (e.g., 1.0 for O1 and 0.75-1.0 for O2).

Figure 3:
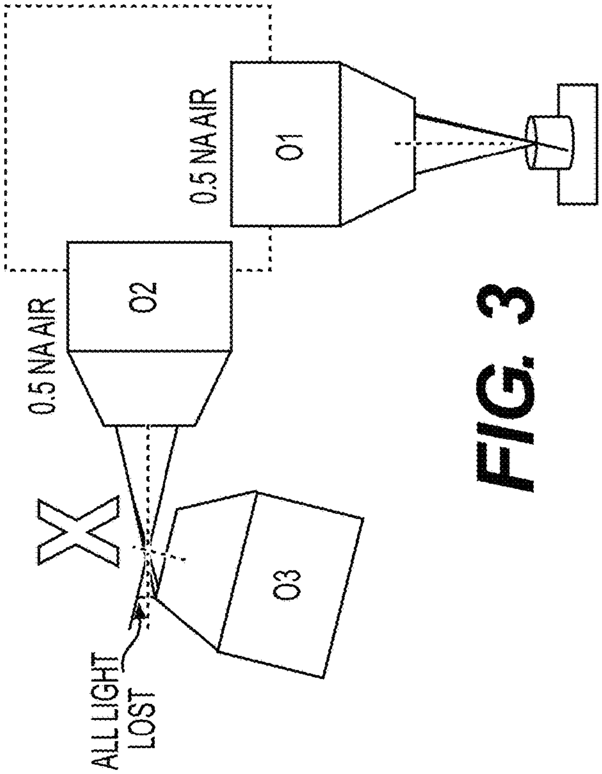
FIG. 3 depicts a conventional SCAPE system with the NAs of the objectives reduced to 0.5.

Because GRIN lenses typically have NAs on the order of 0.5, the NAs of the objectives O1 and O2 in a SCAPE system that is being used to capture images through a GRIN lens must be reduced to a similar level, as depicted in FIG. 3. But when the NAs of those objectives O1 and O2 are reduced to the vicinity of 0.5, *none* of the light that exits the second objective O2 will be captured by the third objective O3, which means that the FIG. 3 approach is not workable.

This application describes three approaches for overcoming this problem, and ensuring that the light that exits the second objective O2 is captured. These three approaches are referred to herein as GRIN-SCAPE-1, GRIN-SCAPE-meso, and GRIN-SCAPE-mini.

Figure 4:
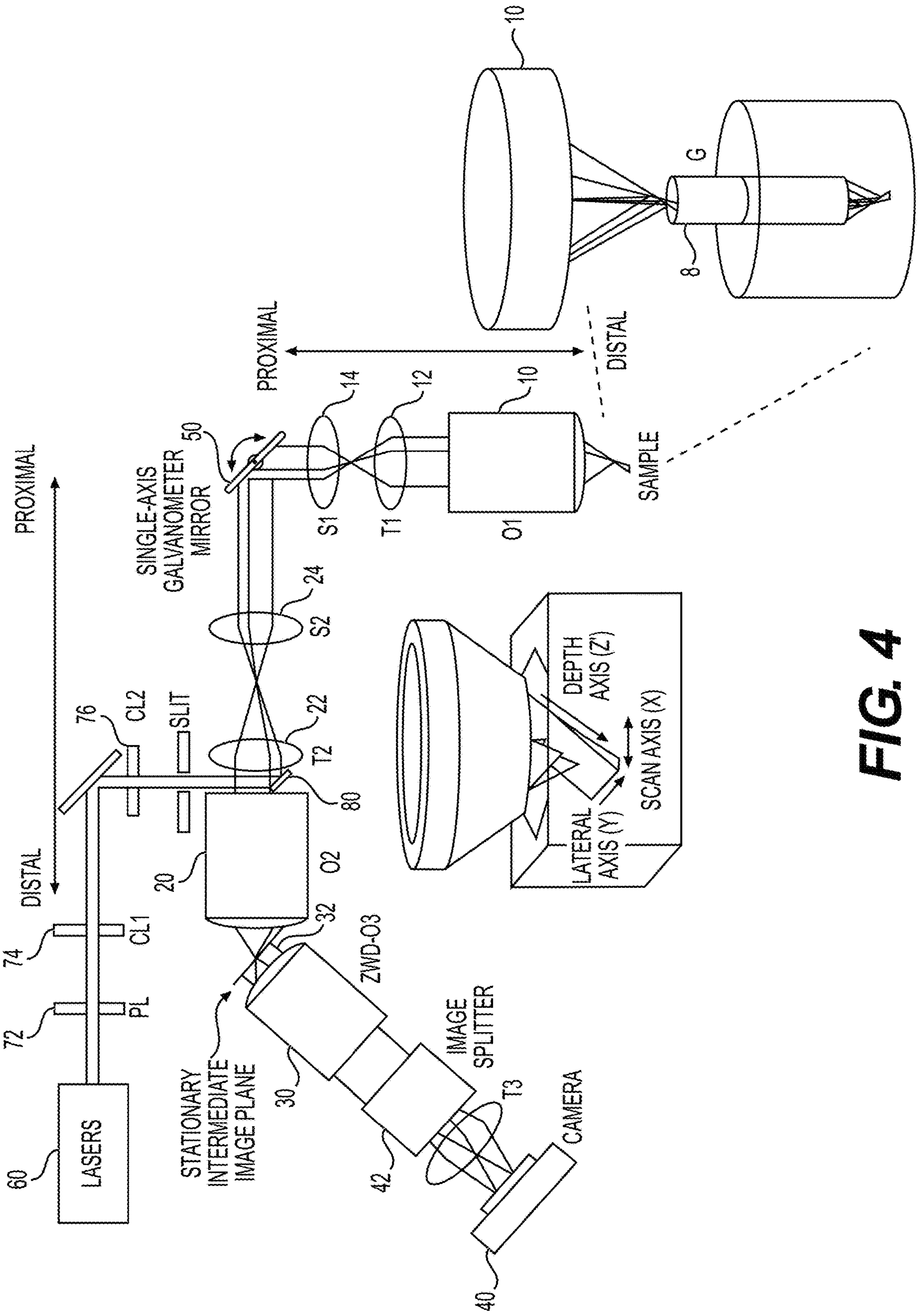
FIG. 4 depicts an embodiment of the GRIN-SCAPE-1 approach for ensuring that the light that exits the second objective O2 is captured.

FIG. 4 depicts an embodiment of the GRIN-SCAPE-1 approach for ensuring that the light that exits the second objective O2 is captured.

The FIG. 4 embodiment includes a first set of optical components 10-14 having a proximal end and a distal end. The first set of optical components includes a first objective 10 disposed at the distal end of the first set of optical components. In the illustrated embodiment, in addition to the first objective 10, the first set of optical components also includes a first telescope 12-14. A GRIN lens 8 is positioned distally beyond the first objective 10. A more detailed description of this GRIN lens 8 is provided below.

The FIG. 4 embodiment also includes a second set of optical components 20-24 having a proximal end and a distal end. The second set of optical components includes a second objective 20 disposed at the distal end of the second set of optical components. In the illustrated embodiment, in addition to the second objective 20, the second set of optical components also includes a second telescope 22-24.

The FIG. 4 embodiment also includes a scanning element 50 that is disposed proximally with respect to the proximal end of the first set of optical components 10-14 and proximally with respect to the proximal end of the second set of optical components 20-24. The scanning element 50 can be, for example, a galvanometer mirror that has a single degree of freedom (indicated by the double-headed arrow). The scanning element 50 is positioned to route a sheet of excitation light so that the sheet of excitation light will pass in a proximal to distal direction through the first set of optical components 10-14 and through the GRIN lens 8, and project into a sample that is positioned distally beyond the GRIN lens. The sheet of excitation light is projected into the sample at an oblique angle with respect to an optical axis of the first objective 10, and the sheet of excitation light is projected into the sample at a position that varies depending on an orientation of the scanning element 50.

The GRIN lens 8 and the first set of optical components 10-14 route detection light from the sample in a distal to proximal direction back to the scanning element 50. The scanning element 50 is also positioned to route the detection light so that the detection light will pass through the second set of optical components 20-24 in a proximal to distal direction and form an oblique intermediate image plane at a position that is distally beyond the distal end of the second set of optical components (i.e., to the left the second objective 20 in FIG. 4).

In the embodiment illustrated in FIG. 4, a third objective 30 and an associated optical interface 32 are collectively positioned to route light that arrives at the oblique intermediate image plane towards a camera 40. Notably, the third objective 30 and the associated optical interface 32 are collectively configured to provide a zero working distance (the details of which are described below) to maximize detection NA.

The FIG. 4 embodiment also includes a camera 40 and a light source 60 that generates a beam of excitation light. At least one optical component 72-80 expands the beam of excitation light into the sheet of excitation light and directs the sheet of excitation light towards the scanning element 50. The light source 60 can be implemented using one or more of lasers coupled into the system via single mode fiber, providing broader compatibility, permitting laser boxes to be located safely away from the rig and ensuring co-alignment of different laser lines for multi-spectral acquisition.

In the illustrated embodiment, the expansion of the beam of excitation light into the sheet of excitation light is accomplished using a Plossl lens 72 and two cylindrical lenses 74, 76, and the sheet of excitation light is directed towards the scanning element 50 by a small mirror 80. But in alternative embodiments, these two functions could be implemented using different components. For example, instead of expanding the beam of excitation light into a sheet of excitation light using lenses, the expansion of the beam into the sheet could be implemented using an additional galvanometer (not shown). And if that additional galvanometer is positioned at the location of the small mirror 80 in FIG. 4, the additional galvanometer can also perform the function of directing the sheet of excitation light towards the scanning element 50.

The illustrated embodiment in FIG. 4 includes an image splitter 42 positioned between the third objective 30 and the camera 40, and this image splitter 42 is configured to direct first wavelength light to a first portion of an image sensor within the camera 40 and to direct second wavelength light to a second portion of the image sensor. This feature is useful when the system uses multiple lights sources operating at different frequencies. But in embodiments that use only a single light source operating at a single frequency, the image splitter 42 is omitted.

When the second objective 20 is an air objective and the third objective 30 is a non-air immersion objective, the associated optical interface 32 can be a fluid chamber positioned so that the oblique intermediate image plane is formed at an interface of an immersion medium of the third objective 30.

Alternatively, when the second objective 20 is an air objective and the third objective 30 is a non-air immersion objective, the associated optical interface 32 can be a cured polymer spacer with a refractive index that matches an immersion medium of the third objective 30. In these embodiments, the cured polymer spacer is affixed directly to a front surface of the third objective 30, and the cured polymer spacer is positioned so that the oblique intermediate image plane is formed on a face of the cured polymer spacer. For example, the associated optical interface 32 could be a cured polymer spacer having a refractive index of 1.33 that is affixed directly to a front surface of the third objective 30, positioned so that the oblique intermediate image plane is formed on a face of the cured polymer spacer. In these embodiments, the third objective 30 will typically not be coverglass corrected.

As yet another alternative, the third objective and the associated optical interface can be integrated together into a single package, e.g., as in the AMS-AYG v1.0 objective, which has an NA of 1.0, a working distance of 0, and an effective focal length of 5 mm.

The GRIN-SCAPE-1 approach depicted in FIG. 4 utilizes an oblique, swept light sheet geometry that is relayed through the GRIN lens 8, to achieve 3D imaging at high speeds in deep brain regions. Some embodiments of this approach are bench-top and are designed to work in head-fixed, awake behaving animals in a similar way to 2-photon point scanning through a GRIN lens. These embodiments can provide 2-4 color imaging of 600×600×250 micron volumes at 10 volumes per second. Notably, the scanning of the oblique sheet of light that occurs at the upper surface of the GRIN lens 8 is relayed through the GRIN lens 8 into the brain.

Multi-spectral detection is possible using the GRIN-SCAPE-1 approach, e.g., using retro-orbital delivery of dual color viruses. This may be used to leverage new labelling strategies to capture the activity of specific cell types, and interactions between multiple cell types in real time (excitatory/inhibitory neuron, astrocytes, microglia etc.). Being able to do this in any brain region (rather than just cortex) could greatly enhance our understanding of the structure—function relationships between specialized cell types in mammalian brain. If penetration depth into scattering brain is limiting, red and near infrared fluorescent indicators may be used to permit access to much larger fields of view in combination with different GRIN lenses.

We shall now digress to describe the optical theory of how the third objective 30 and the associated optical interface 32 (e.g., the cured polymer spacer in the FIG. 4 embodiment) are collectively configured to provide a zero working distance to maximize detection NA. This theory relies on having two different immersion mediums between O2 20 and O3 30 to permit acceptance of a much larger cone of light into O3, and incorporating a zero working distance (ZWD) length lens into the design as O3.

FIG. 5*a-e* derive the basis of this ZWD approach, showing that if O2 is air and O3 is a 1.0 NA (non-air) immersion lens, then in principle, 100% of light coming from O1 can be detected, irrespective of the NA of O1 or O2 (as long as O2 has sufficient NA to relay all of O1's NA and ignoring incidental losses).

Figure 5A:
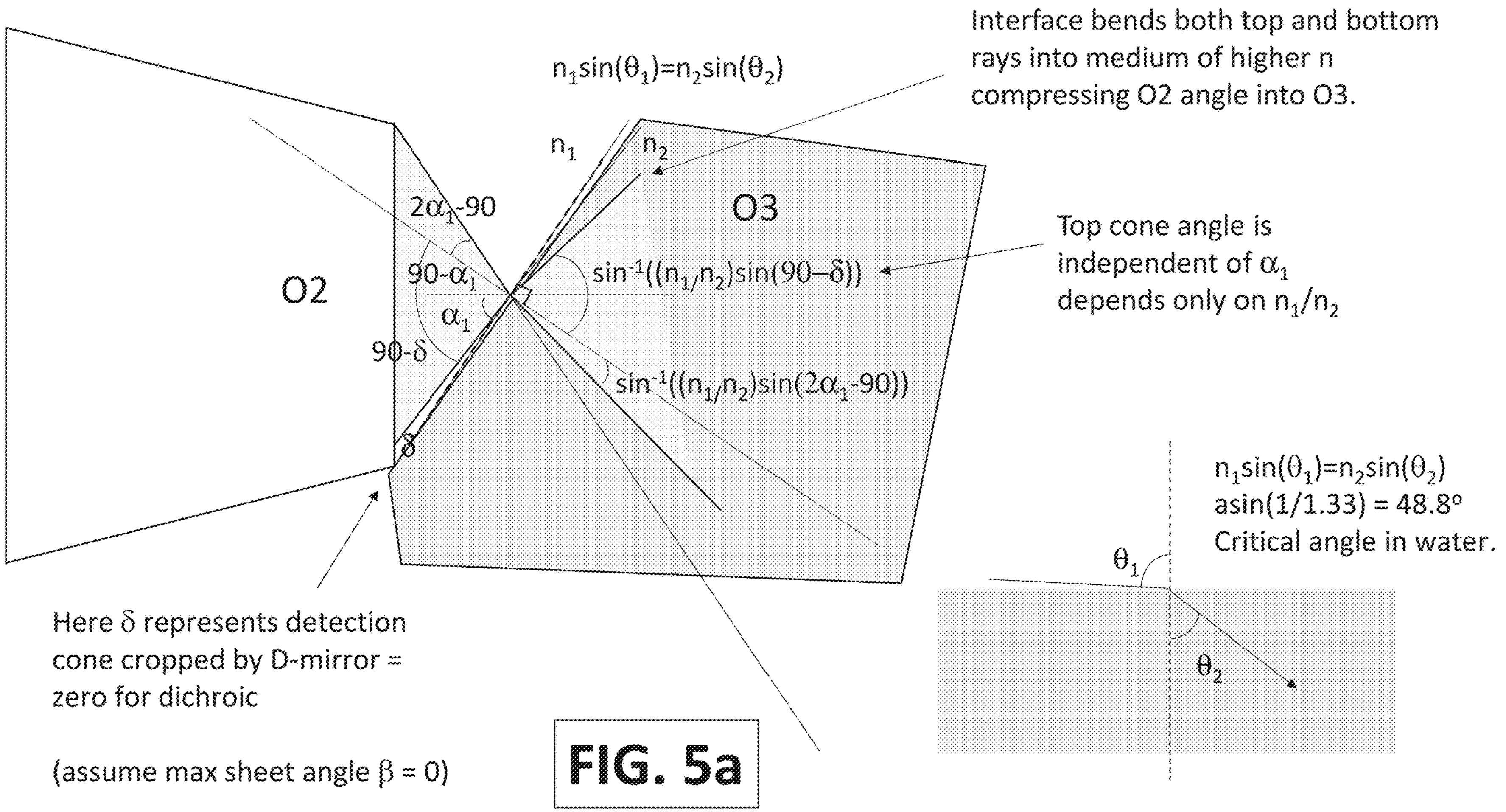
Figure 5B:
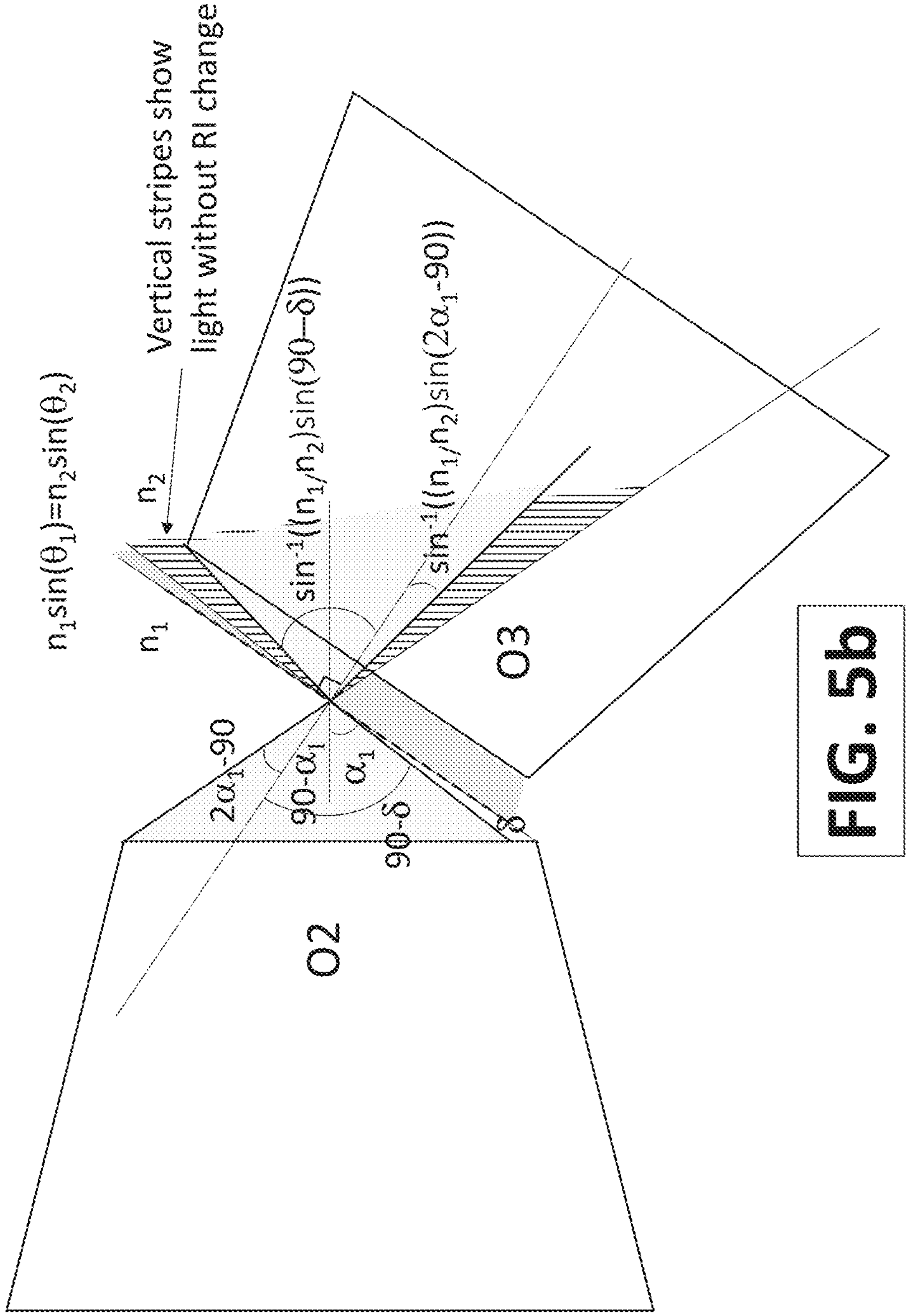
Figure 5C:
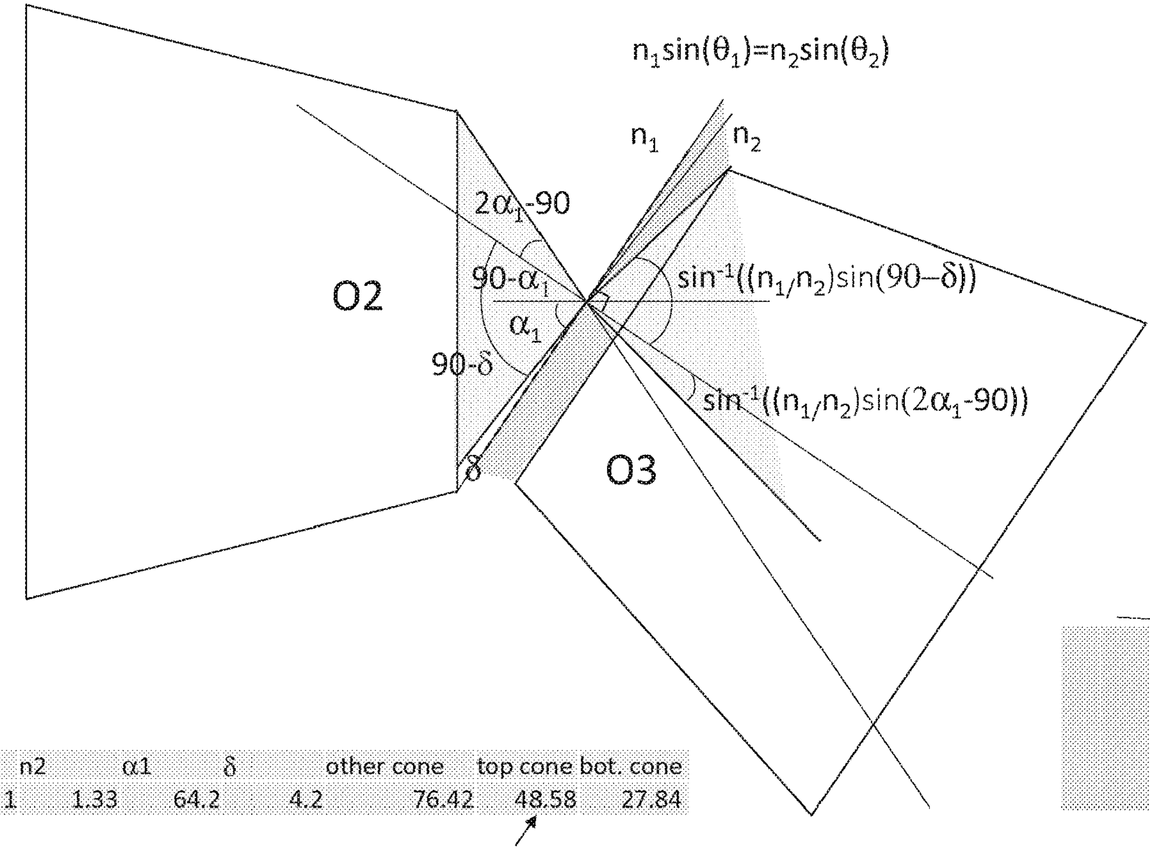
Figure 5C:
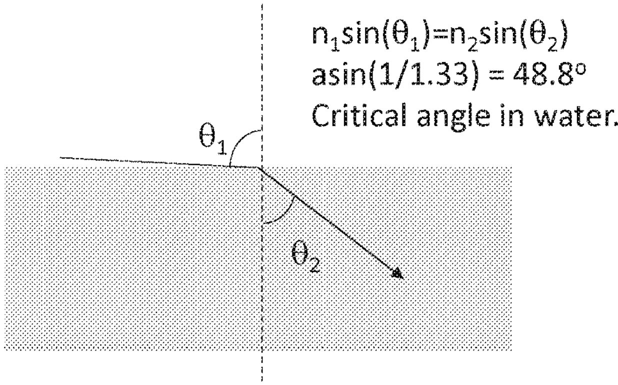
Figure 5D:
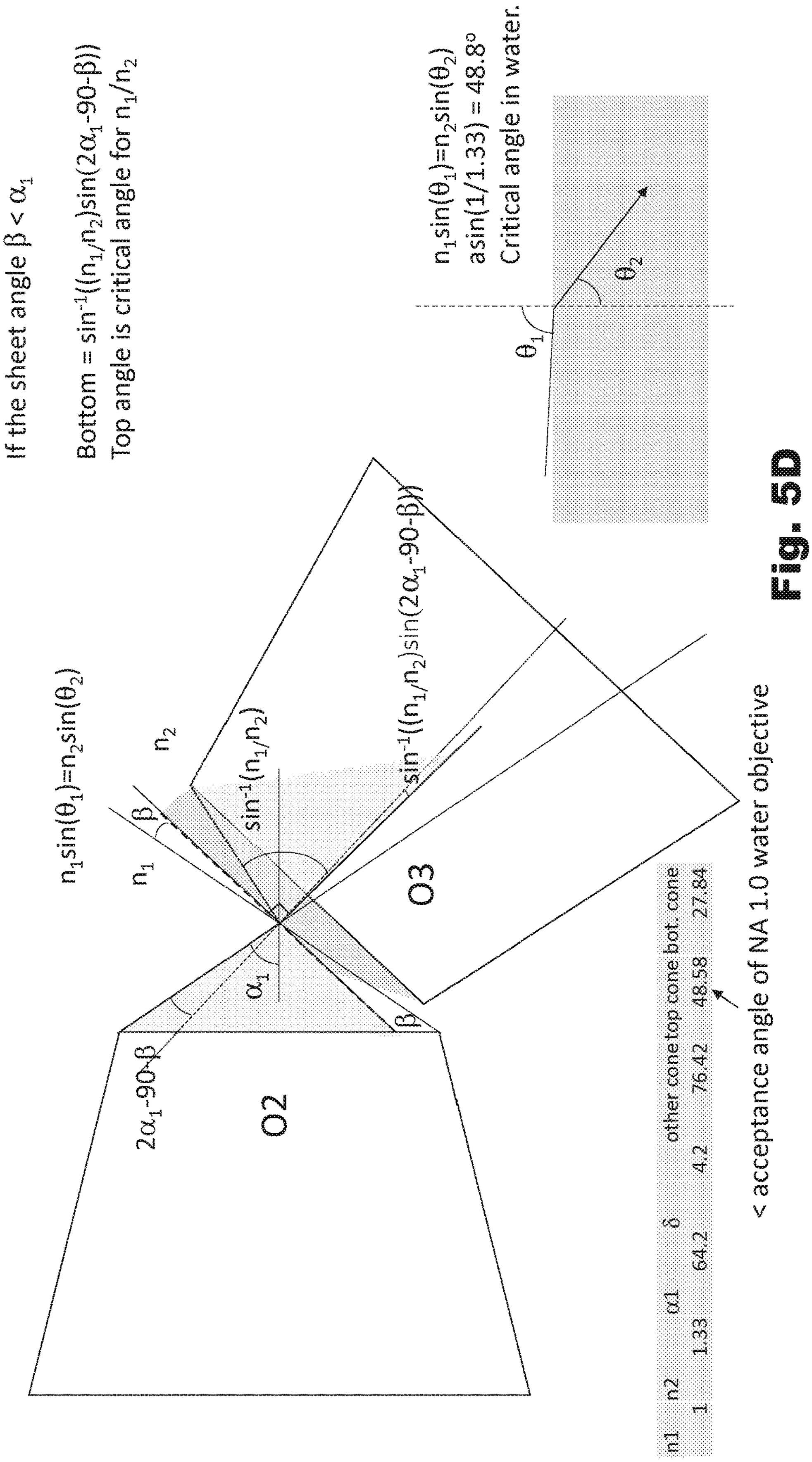
Figure 5F:
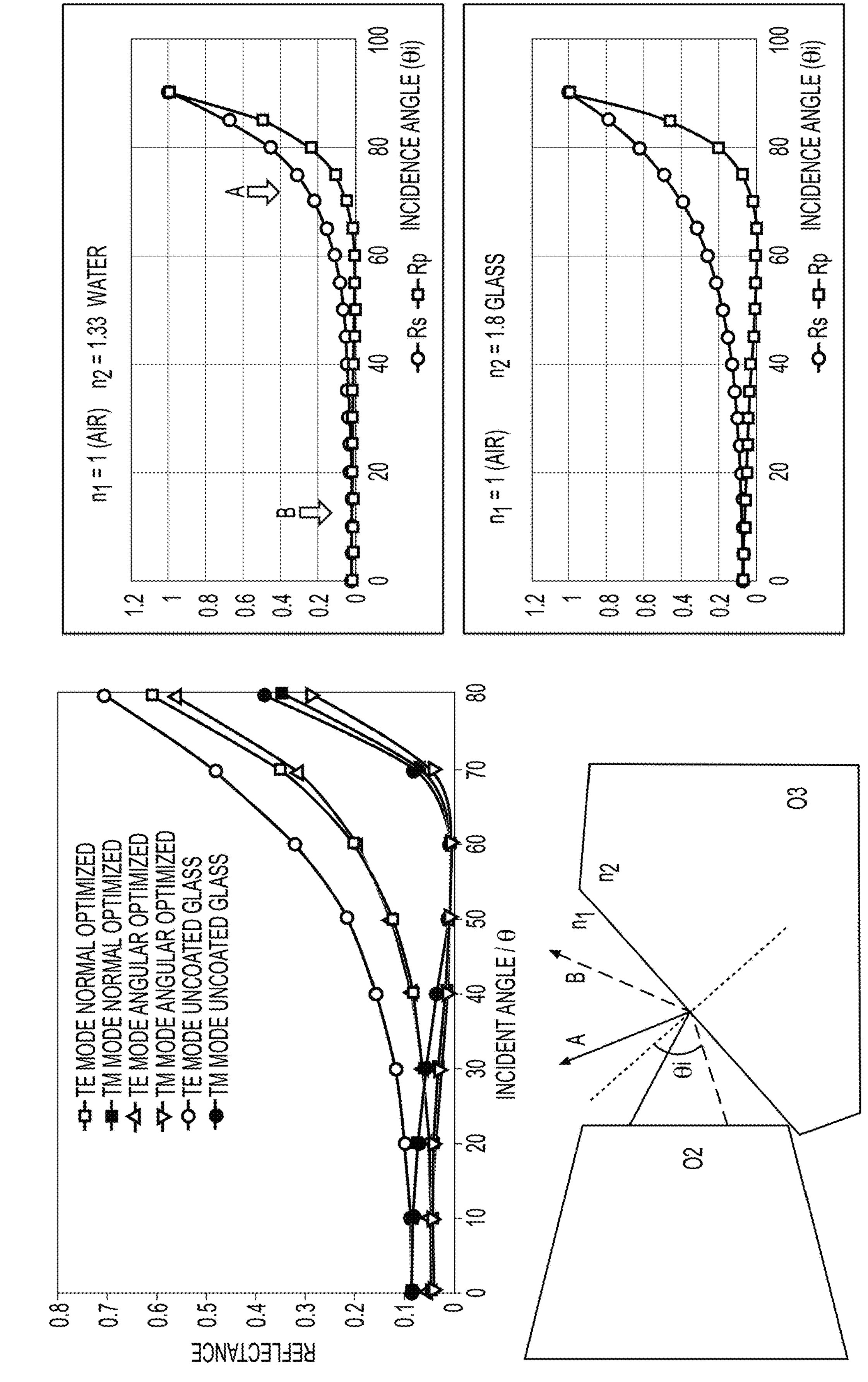

Expected angle-dependent, polarization-dependent reflection losses for $n_1$ to $n_2$, air-to-glass vs. air-to-water refractive indices are shown in FIG. 5*f-g*, with significant reflection expected for higher refractive index materials. This reflection will reduce the amount of light entering O3 dependent on the refractive index ($n_2$) of the material forming the ZWD interface, with highest loss for higher refractive indices (e.g., glass) and for rays with high angles of incidence (e.g., the ray labelled B).

Considering O1, O2, and O3 NAs and RIs, and referring to FIG. 5*a-e*, traditional SCAPE designs have typically used a 1.0 NA water immersion lens as O1. Using a 0.75 NA air O2 preserves the full detectable angle of 48.59° after O2. Thus, a 1.0 NA water immersion lens as O3 (with water up to the focal plane, aligned with the image of the oblique light sheet) would capture 100% of the light collected from the sample by O1. This is because a 1.0 NA in air=90°, and thus any 1.0 NA objective as O3, paired with an air objective as O2 will capture ~100% of the light from O2. This means that a standard water immersion 1.0 NA objective lens can be modified with the addition of a 'water spacer' to meet this need.

A benefit to moving to non-air immersion lenses as O2 could be to leverage higher NA from O1. But a 1.1 NA water lens at O1 would generate 55.7° at O2 which could be accommodated by a 40×0.95 NA air at O2 (barring WD constraints). Increasing the NA of O1 and O2 would increase resolution and throughput—but increase oblique angle, reflection losses and, in general, would decrease FOV.

Even for cases where O1 and O2 are low NA (e.g., 0.5 in air) as is the case in the FIG. 4 embodiment, the ZWD effect will significantly improve light detection efficiency. This avoids the problem described above in connection with FIG. 3, that when $\alpha_1$ is small and O2 and O3 are both air objectives, the amount of light detected by O3 could be zero (e.g., when $45+\beta-\alpha_1>\alpha_2/2$). Using a ZWD lens at O3 can greatly increase light collection efficiency in this case, permitting use of low magnification (and generally low NA) lenses as O1, for example for large field of view, long working distance, air immersion of gradient index (GRIN) lens applications.

We have devised an alternative ZWD approach building on seminal work by Yang et al. entitled Epi-illumination SPIM for volumetric imaging with high spatial-temporal resolution, Nature methods, 2019; 16 (6):501-4. Yang et al demonstrated that if a 1.0 NA ZWD lens is used as O3, positioned such that the intermediate image plane exactly aligns with the front surface of the lens, almost all incident light can be accepted into the objective lens. This approach leverages the critical angle property of refraction where a beam incident at 90° will bend into a medium of higher refractive index n at an angle of asin(1/n). In water (n=1.33) this angle is 48.8° which naturally corresponds to the acceptance angle of a 1.0 NA water immersion objective lens. Although commercial ZWD objective lenses with solid glass 'snouts' are now being manufactured, they have limited fields of view (150/450 um) and cost $15,000/$30,000 respectively. We recently developed a versatile and low cost alternative ZWD approach that simply casts a precise 'blob' of optical grade 1.33 refractive index UV curable polymer onto the tip of a standard 2 mm WD 1.0 NA water immersion objective. The resulting lens provides >1 mm fields of view, while increasing system throughput and NA by a factor of 2-3× for high NA systems, and more for low NA configurations that would otherwise be intangible. This simple approach greatly improves the resolution and throughput of conventional SCAPE systems, but is a key component of our GRIN-SCAPE-1 design to enable imaging through low NA GRIN lenses.

Figure 6:
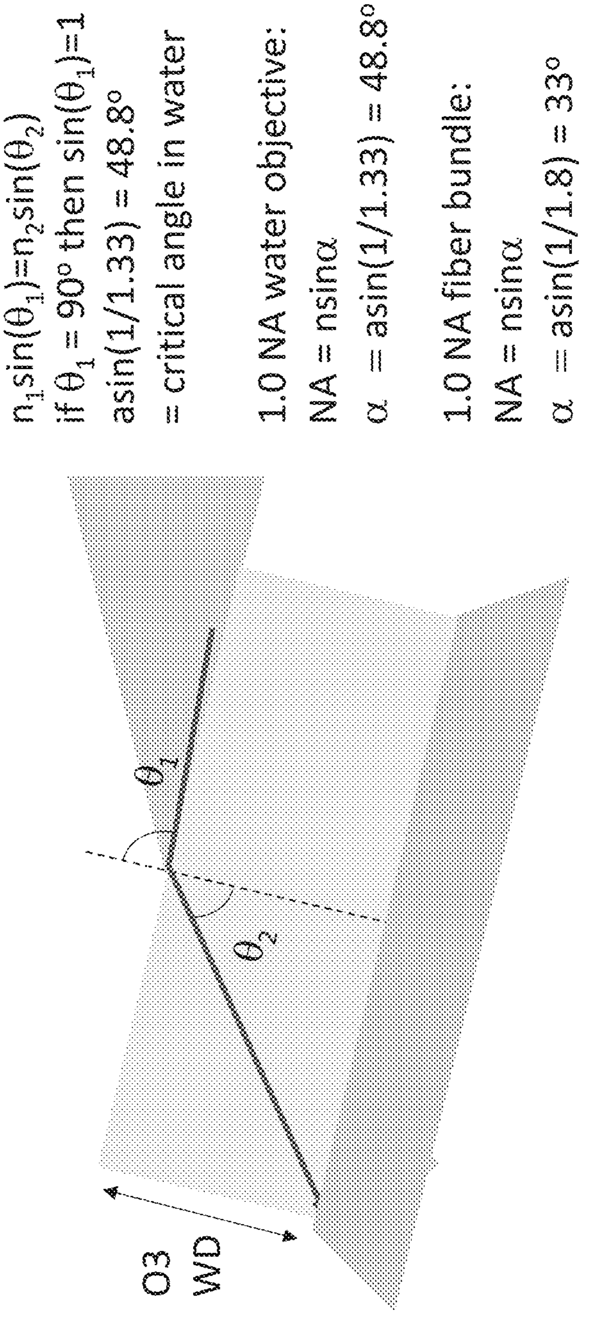
FIG. 6 depicts another example of the geometry of the ZWD theory.

FIG. 6 depicts another example of the geometry of the ZWD theory. A suitable lens for use as O2 20 for this example is a commercially available 20× infinity corrected air objective such as the Excelitas 28-20-46-000, which has an NA of 0.6. Two of these lenses could be used—matched as O1 and O2 to provide 1× magnification. This makes coupling on the mouse side easier than using water. It also leaves plenty of room for the polymer spacer that is affixed to O3 to convert O3 into a ZWD lens without colliding with O2. Alternatively, a 20×0.6 NA infinity corrected air objective at O2 can be matched to a spacer-modified water objective for a ~0.7 NA multi-immersion primary objective lens.

We shall now digress further to describe a suitable technique for fabricating the cured polymer spacer and for affixing the cured polymer spacer to the third objective 30.

The spacer has an appropriate refractive index that can be attached to the front of an immersion 1.0 NA lens that is used as the third objective (O3) to convert it to a ZWD lens to maximize detection NA. This has been achieved using a 1.0 NA, 2 mm WD 20× water immersion objective lens and a UV curable polymer with 1.33 refractive index. This lens is not coverglass corrected and thus the spacer was formed as a single unit without a glass coverslip or other material at the focal plane. The material used also has low autofluorescence. Details in FIG. 7*a*-*i* show fabrication, attachment, and alignment procedures for this approach (which is referred to herein as the 'blob' approach), including marked advantages of this approach over using a glass frustrum-based ZWD lens as O3.

Figure 7A:
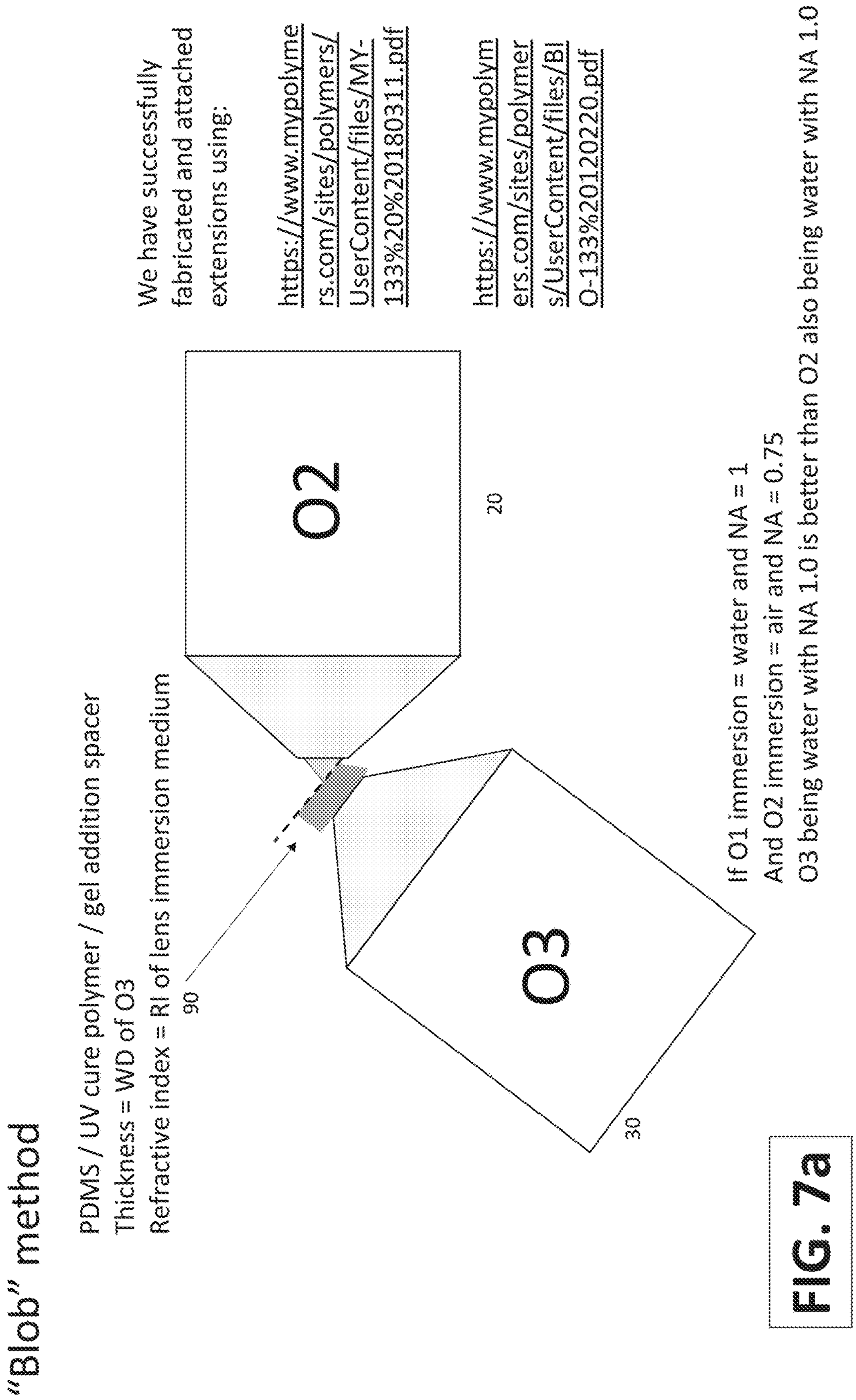
FIG. 7*a* depicts an add-on spacer attached to the front of an immersion lens that is used as the third objective in a SCAPE system.
Figure 7B:
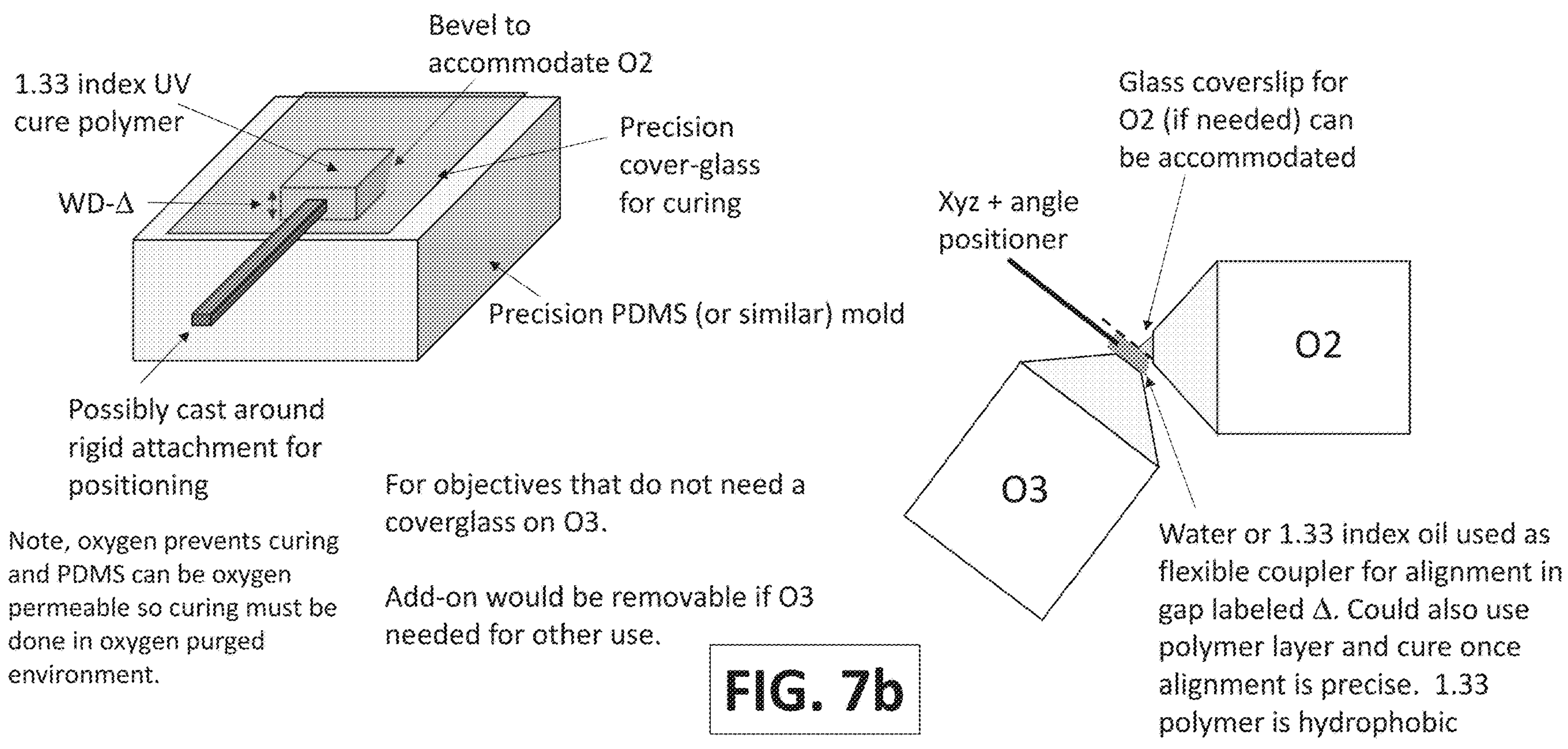
FIGS. 7*b*-7*c* depict methods of casting and positioning the add-on spacer depicted in FIG. 7*a*.
Figure 7C:
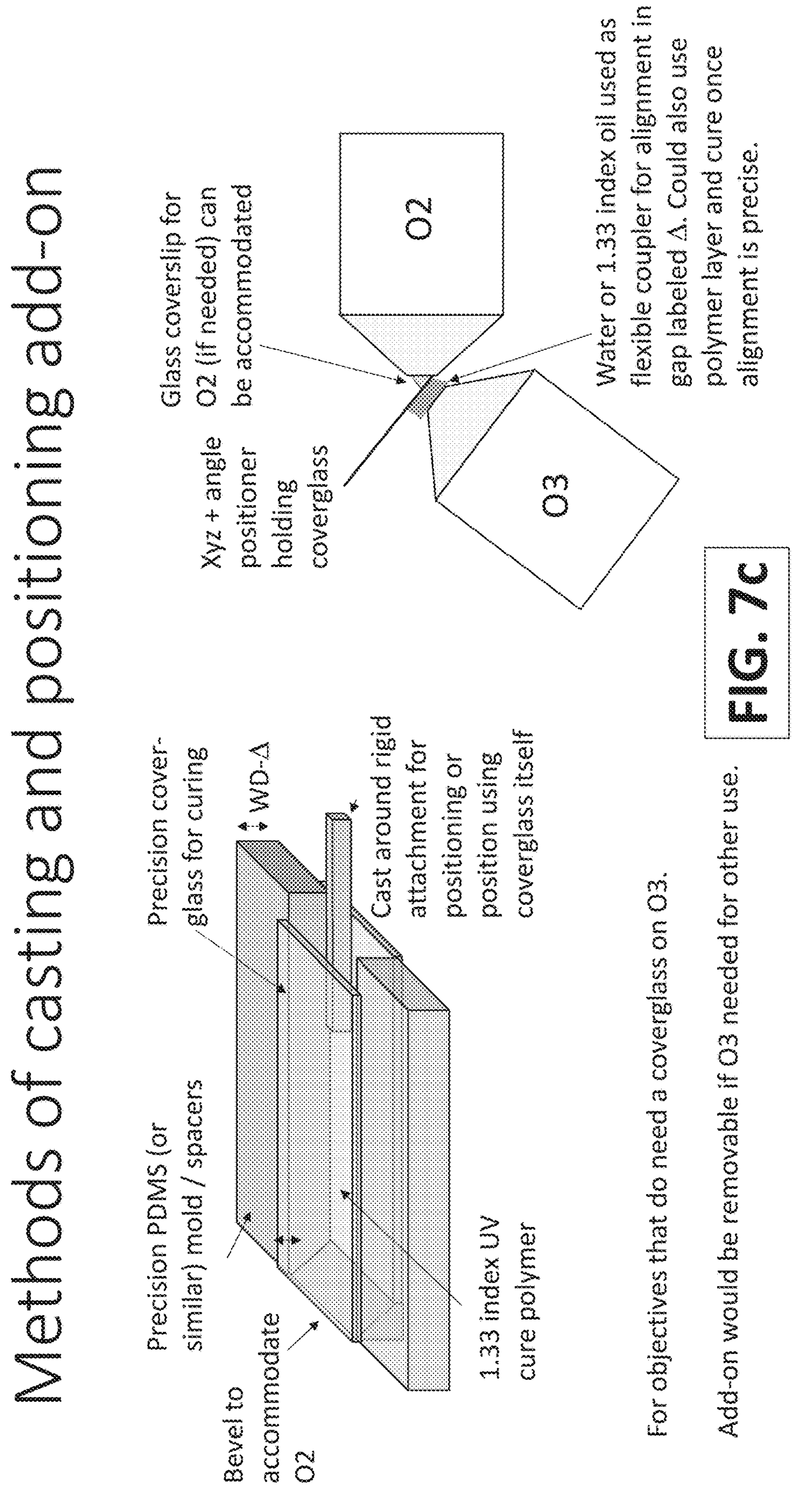
Figure 7D:
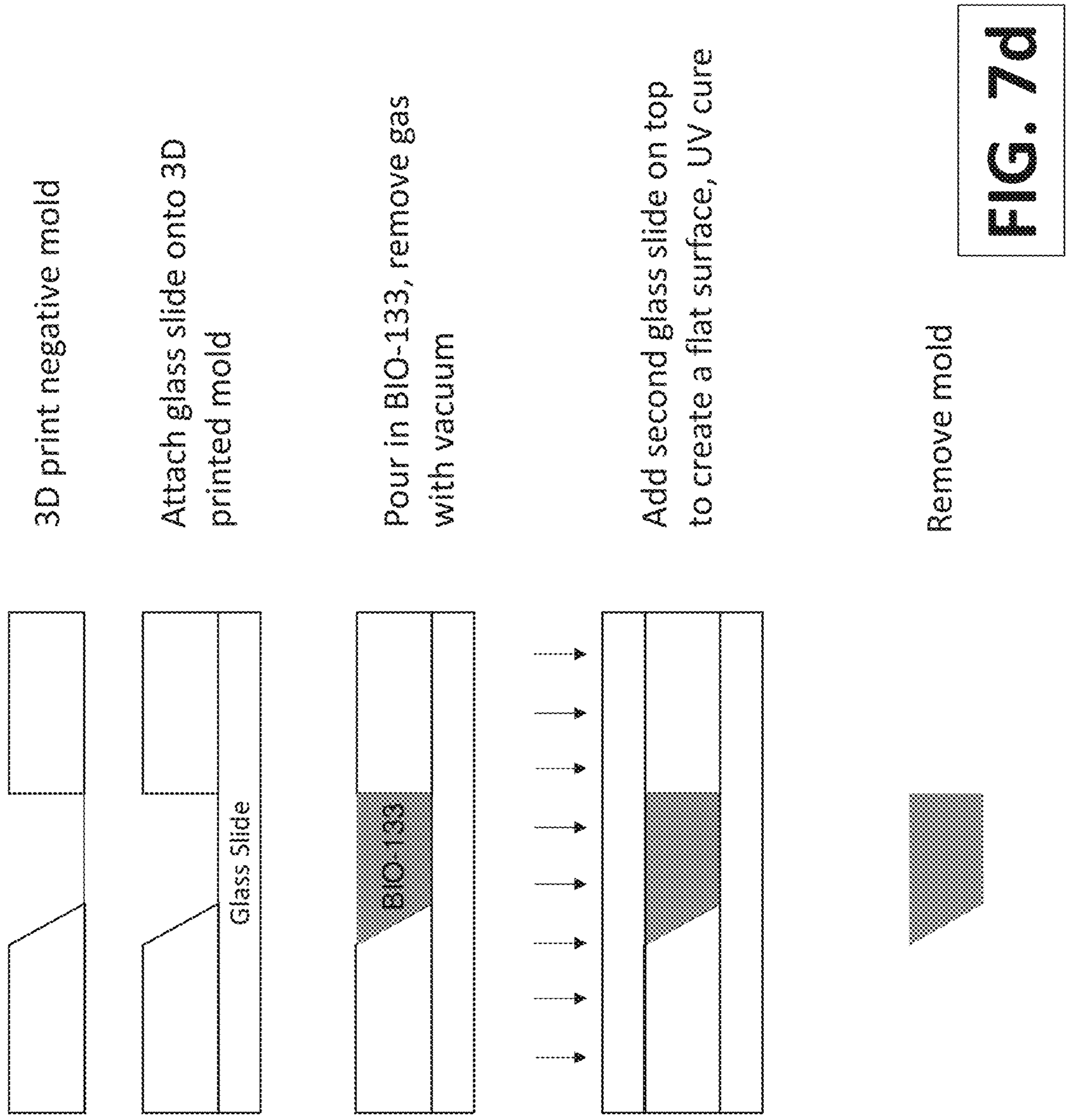
FIG. 7*d* depicts a set of steps for fabricating an add-on spacer.

FIG. 7*d* depicts the steps of a first approach for using BIO-133 (a UV-curable polymer with the same refractive index as water) to fabricate what the inventors refer to as the "blob" in this section. The first step is to 3D print a negative mold. The next step is to attach a glass slide onto the 3D printed mold. The next step is to pour in the BIO-133, and then remove gas with a vacuum. The next step is to add a second glass slide on top to create a flat surface, and subsequently to UV cure the polymer. Note, however, that this first approach has a drawback because BIO-133 is not accessible from the side, which makes it hard to release (because touching the top and bottom surface should be avoided.)

Figure 7E:
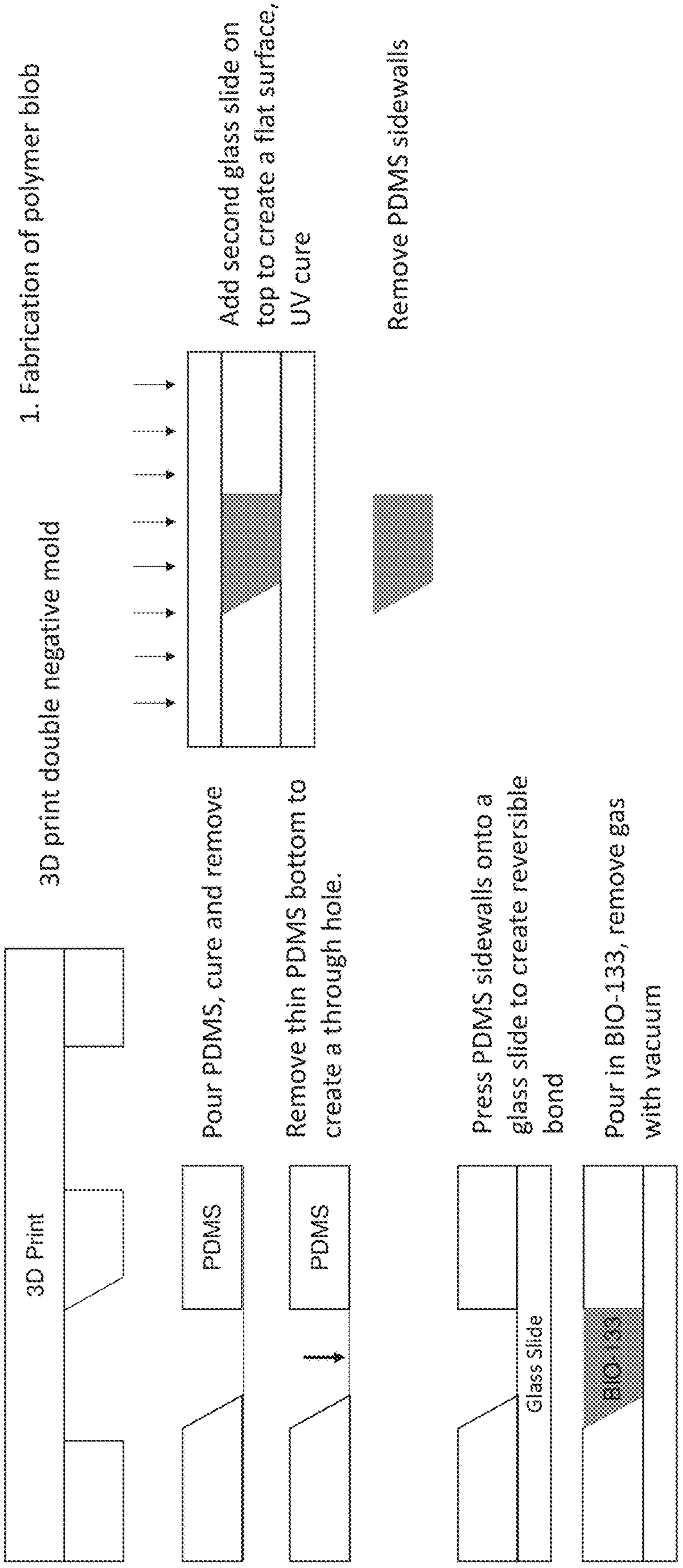
FIG. 7*e* depicts another set of steps for fabricating an add-on spacer.
Figure 7G:
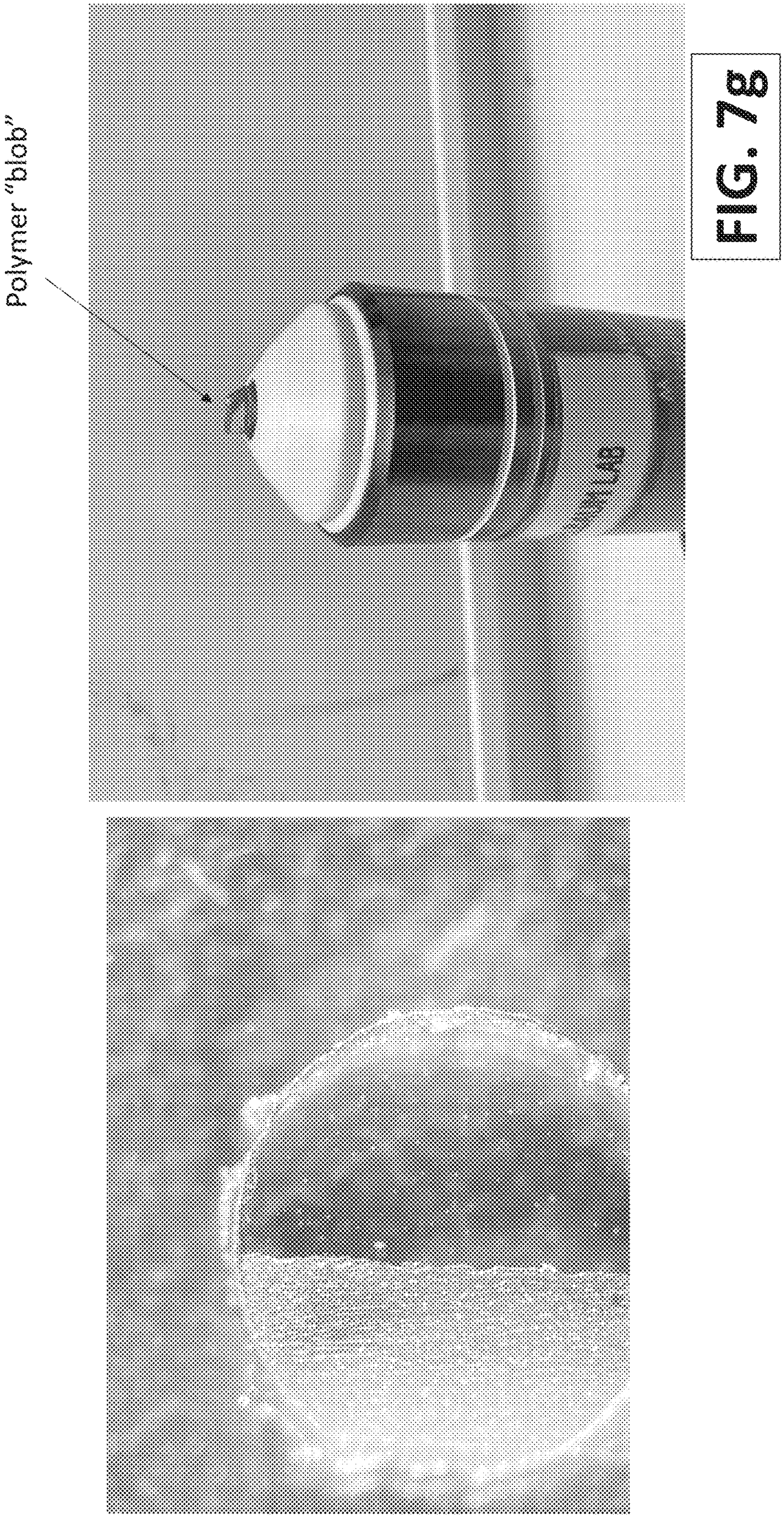
FIG. 7*g* depicts an add-on spacer affixed to the third objective.

FIG. 7*e* depicts the steps of a second approach for fabricating the "blob" discussed in this section. The first step is to 3D print a double negative mold. The next step is to pour in PDMS, then cure and remove it from the first mold. At this point the negative mold made from PDMS has a thin bottom. The next step is to remove the thin PDMS bottom to create a set of sidewalls surrounding a through hole. The set of sidewalls can include a plurality of surfaces (e.g., 4 sidewalls in the case of a square) or only a single continuous surface (in the case of a cylinder). The next step is to press the PDMS sidewalls onto a high-flatness glass slide. The PDMS sidewalls will adhere with a reversible bond. The next step is to pour in the BIO-133, and remove gas with a vacuum. The next step is to add a second glass slide on top to create a flat surface, and subsequently UV cure. The last step is to remove the PDMS sidewalls and the glass slides, leaving the cured BIO-133 polymer. Oxygen reduces UV curing of the polymer, and PDMS is oxygen permeable, so the use of PDMS here results in a layer of uncured polymer between PDMS-BIO133 interface, which facilitates removal.

Turning now to FIG. 7*f*, whichever approach was used to fabricate the "blob" (including but not limited to the two approaches described above in connection with FIG. 7*d*-*e*), the blob and the third objective O3 are assembled to form an assembly using, for example, the steps depicted in FIG. 7*f*. More specifically, the first step of this example is to bring the polymer blob in contact with a clean, patterned glass slide (e.g., resolution target). The next step is to gently bring a 3D printed support in contact with the polymer. This is intended to support the polymer later and avoid polymer buckling. The support and the polymer can be bonded together with UV glue. The next steps are to place the assembly under O3 and fill in the gap with water, and to focus O3 until there is a focused image on the camera with a tube lens at infinity. The next step is to attach a second 3D printed device to the polymer assembly. The idea here is to secure the polymer blob at the optimal position by continuously observing the resolution target from the camera. Note, however, that when the FIG. 7*f* procedure is used, it can be difficult to ensure that the added blob is precisely aligned with its (very smooth) front surface exactly aligned with the objective's focal plane.

Figure 7H:
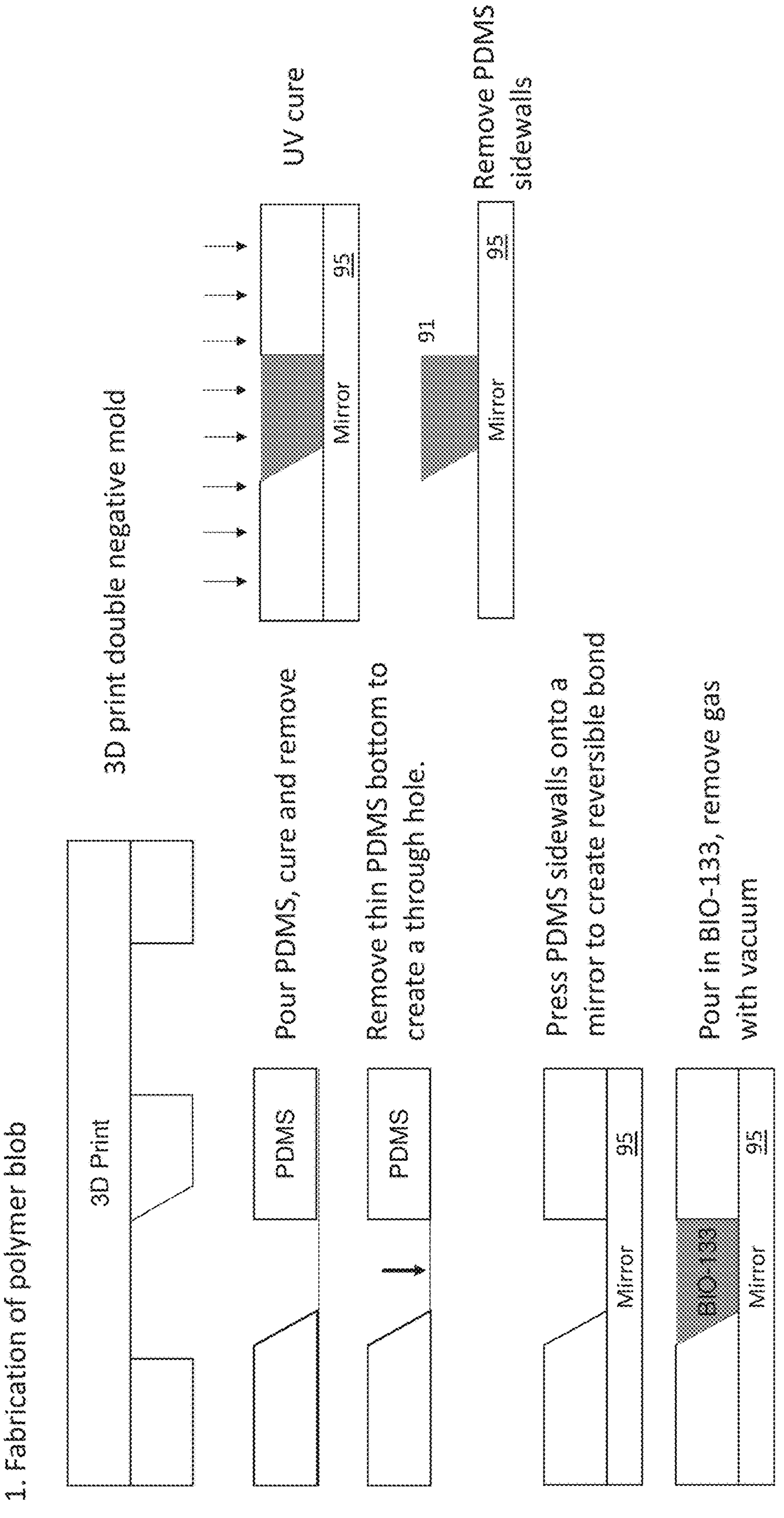
FIGS. 7*h*-7*i* depict a different set of steps for fabricating an add-on spacer and affixing that spacer to a third objective.

FIG. 7*h* depicts the steps of a third approach for fabricating the blob discussed in this section, which has resulted in very good performance, and facilitates precise alignment of the blob's front surface with the third objective's (O3) focal plane. This approach is similar in many respects to the approach described above in connection with FIG. 7*e*, except that a high flatness mirror 95 is used in place of the lower glass slide and the second glass slide is not added on top of the blob prior to UV curing. Thus, the steps of this third approach are as follows: The first step is to 3D print a double negative mold. The next step is to pour the PDMS, press in the double negative mold then cure and remove the PDMS. At this point we have a negative mold made from PDMS with a thin bottom. The next step is to remove the thin PDMS bottom to create a set of sidewalls surrounding a through hole. The set of sidewalls can include a plurality of surfaces (e.g., 4 sidewalls in the case of a square) or only a single continuous surface (in the case of a cylinder). The next step is to press the PDMS sidewalls onto the mirror 95. The PDMS sidewalls will adhere to the mirror 95 with a reversible bond. The next step is to pour in the BIO-133, and remove gas with a vacuum. The next step is to UV cure. And the last step is to remove the PDMS sidewalls, leaving a 'blob' of cured BIO-133 polymer that is at this point still affixed to the mirror 95. In some embodiments, the cured blob has a thickness between 75 and 95% of the working distance of the objective lens to which the blob will ultimately be attached. For example, if the working distance of the objective lens is 2 mm, the cured blob can have a thickness of 1.8 mm.

In this third approach, the blob's front surface is cast onto a very flat mirror 95 rather than a coverglass or microscope slide. Dielectric front surface mirrors are manufactured with ultra-flat surfaces—precise to within around a quarter wavelength. It will therefore be flat to a tolerance of less than 250 nm. Not only does this make them ideal for casting an ultra-flat focal plane of the blob, but the fact that the front surface of the blob contacts a mirror is used for the alignment process as detailed below.

Figure 7I:
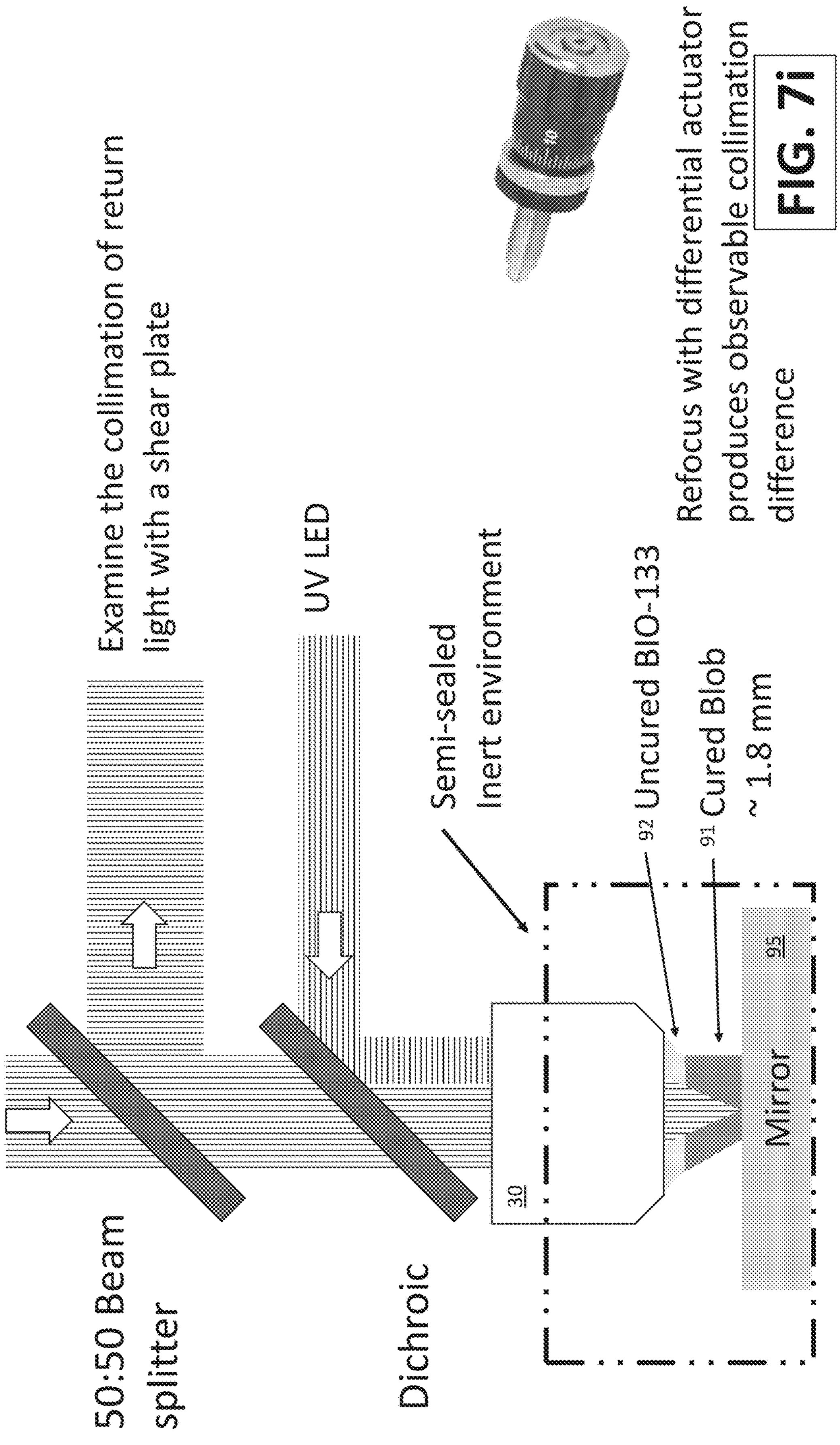

Referring now to FIG. 7*i*, the whole rig is first aligned with a digital clinometer. As shown, the initially cast ~1.8 mm thick blob 91, still attached to the mirror 95 on which it was cast, is then positioned at the front of the objective 30 with a quantity of uncured BIO-133 polymer 92 between the objective's clean glass front and the cured blob 91 of BIO-133. The light path marked with vertical stripes in FIG. 7*i* represents collimated laser light, which was expanded and launched into the objective lens via a 50:50 beam splitter. This light reflects off the mirror 95 (through the blob) and comes back through the objective lens 30. The position of the mirror 95 (which still has the blob 91 attached) is then adjusted both in distance and 2D tilt) while the collimation properties of the returning light are monitored e.g., using a sheer plate which checks for precise collimation. Only when the mirror (and thus the front surface of the 'blob') is precisely aligned with the focal plane of the objective lens 30 will the light coming back be collimated. Once this condition is reached, the environment around the blob 91 of polymer is purged of oxygen (which ensures proper curing of the polymer) and UV light (represented by horizontal stripes) is projected down through the objective lens (via the dichroic beam splitter) to cure the liquid polymer 92 between the previously cured 'blob' 91 and the glass surface of the objective lens 30, providing a permanent bond. The mirror 95 is then peeled off the front surface of the 'blob' 91. Additional UV light can then be used to ensure full curing of the polymer.

The most important steps of the approach depicted in FIG. 7*h-i* for fabricating a spacer for an immersion objective lens 30 are as follows: First as seen in FIG. 7*h*, the sidewalls of the negative mold are pressed onto the mirror 95 so that the portion of the mirror positioned between the set of sidewalls serves as a bottom of the negative mold, and so that the set of sidewalls cooperate with the bottom of the negative mold to form a liquid-tight cavity. Next, the liquid-tight cavity is filled with a first quantity of a UV-curable polymer. The first quantity of the UV-curable polymer is then cured into a first solid mass 91. The lower surface of the first solid mass 91 adheres to the mirror 95. Next, the set of sidewalls are removed from the mirror 95 without disturbing the adherence between the lower surface of the first solid mass 91 and the mirror. Next, the upper surface of the first solid mass 91 is positioned near the objective lens, with a second quantity 92 of a UV curable polymer occupying the space between the upper surface of the first solid mass 91 and the objective lens 30. Subsequent to the positioning, the position of the first solid mass 91 is adjusted until the lower surface of the first solid mass (which is in direct contact with the upper surface of the mirror 95) arrives at a final position with respect to the objective lens 30. After the first solid mass 91 has arrived at the final position, the second quantity 92 of the UV curable polymer is cured.

An excellent way to obtain precise adjustment of the position of the first solid mass 91 is to project collimated light through the objective lens 30 towards the mirror 95, while detecting collimation properties of light reflected by the mirror 95. A determination that the first solid mass 91 has arrived at the final position is made when the light reflected by the mirror 95 is precisely collimated. This can be accomplished, for example, using a shear plate.

A preferred approach for curing of the second quantity 92 of the UV curable polymer is to project UV light through the objective lens 30 into the second quantity of the UV curable polymer. Optionally, subsequent to the projecting of the UV light through the objective lens into the second quantity 92 of the UV curable polymer, additional UV light is applied to further cure the second quantity of the UV curable polymer.

After curing of the second quantity of the UV curable polymer, the mirror 95 is removed from the lower surface of the first solid mass 91 so that the objective lens 30 can be used.

The zero working distance approach can be extended beyond the example provided above. Any type of solid material (or constrained liquid) with appropriate refractive index could be used to modify existing immersion lenses. There exist many UV-curable (or otherwise curable/activatable e.g., via time, heat, radiation or chemical) compounds or glues that have precise refractive indices that could be used to cast permanent extensions to immersion lenses (not just water immersion lenses, and not necessarily 1.0 NA lenses). See, e.g., https://www.mypolymers.com/products. RI matching gels with varying viscosity and minimal evaporation are also available. See, e.g., https://www.cargille.com/optical-gels/and https://www.thorlabs.com/thorproduct.cfm?partnumber=G608N3.

Another option is to use PDMS (refractive index ~1.43) in combination with lenses designed for cleared tissue imaging (clarity RI ~1.4), some of which have correction collars to permit precise matching for the refractive index of the 'blob' material. A precision cast spacer could provide a permanent modification to these high NA, long WD lenses to capture more light at O3.

Cover-glass corrected immersion lenses could also be used, with a glass-fronted chamber, as described herein with the space filled with liquid or, e.g., curable polymers. FEP-based front surface water chambers could be used for water immersion dipping lenses without coverglass correction. Certain other plastics or silicone materials could also be made into solid blocks or chambers to match common silicone or oil immersion refractive indices. Multi-immersion and refractive index adjustable lenses could also be employed for ease of material selection.

It is advantageous to add a protecting tube or housing around the completed modified lens, optionally with a removable cap, to protect the 'blob' component from dust and other environmental factors which could alter is optical properties, shape or material or optical integrity. This case could take the form of capped chambers depicted (without addition of immersion liquid) enabling adjustment of both lenses for alignment.

The benefits of this 'blob' approach on objective lenses such as the NA 1.0 water objective as ZWD O3 include the following: (1) It is a simple and inexpensive modification of a common ~$6,000 objective lens (e.g., water immersion 1.0 NA lenses). (2) Using a deformable polymer material prevents damage during alignment and can be shaped to accommodate different O2 geometries. (3) The blob can be removed/replaced/refreshed as needed. (4) Large (i.e., >1 mm) fields of view are achievable, with well characterized performance of the O3 lens used. (5) Reduced surface reflection for the air:1.33 interface, compared to high NA glass. (6) The same 100% acceptance angle of light from O2 is achievable. And there is better tolerance of defocus at the image plane owing to smaller refractive index mismatch between air and water compared to air and glass. This is important because remote focus mapping of the oblique plane will generally introduce small curvature of oblique plane. Note, however, that this could be a limiting factor in depth range available for the ZWD approach.

We shall now digress yet again to describe the optical theory of how the GRIN lens 8 that is positioned below the first objective O1 10 operates.

Figure 8:
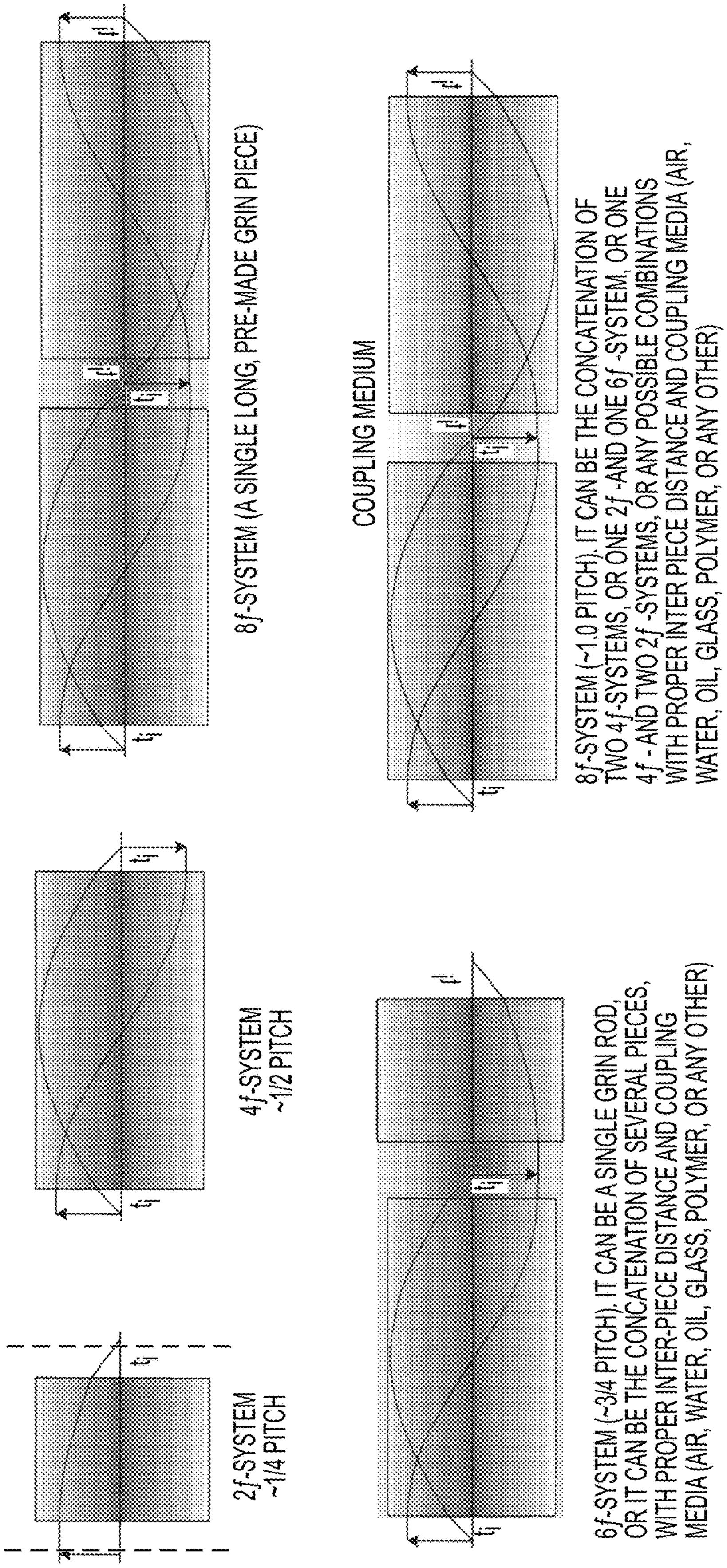
FIG. 8 depicts how a GRIN lens can be regarded as a 2n-f system.

Turning now to FIG. 8, a GRIN lens, depending on its pitch, can be regarded as a 2n-f system, with n=1, 2, 3, . . . Therefore, it can be used to relay the light sheet for excitation, and also to relay the image back for detection.

Figure 9B:
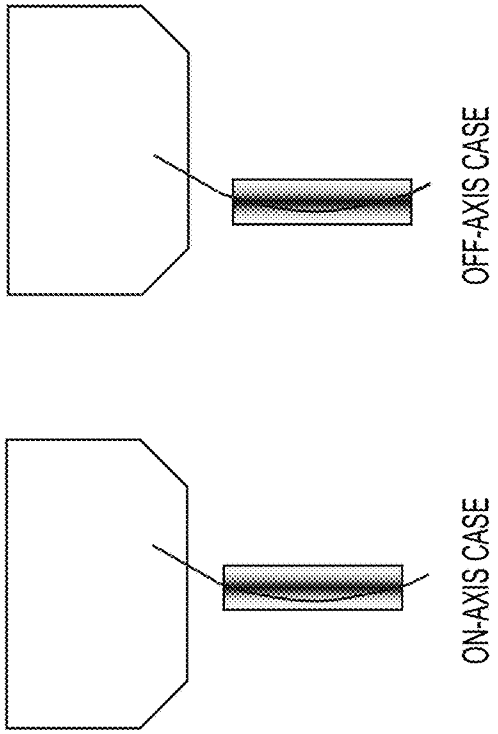
FIGS. 9A-9B depict ways to couple a GRIN lens with the primary objective to access internal tissues or deep brain in a minimal invasive fashion.
Figure 9A:
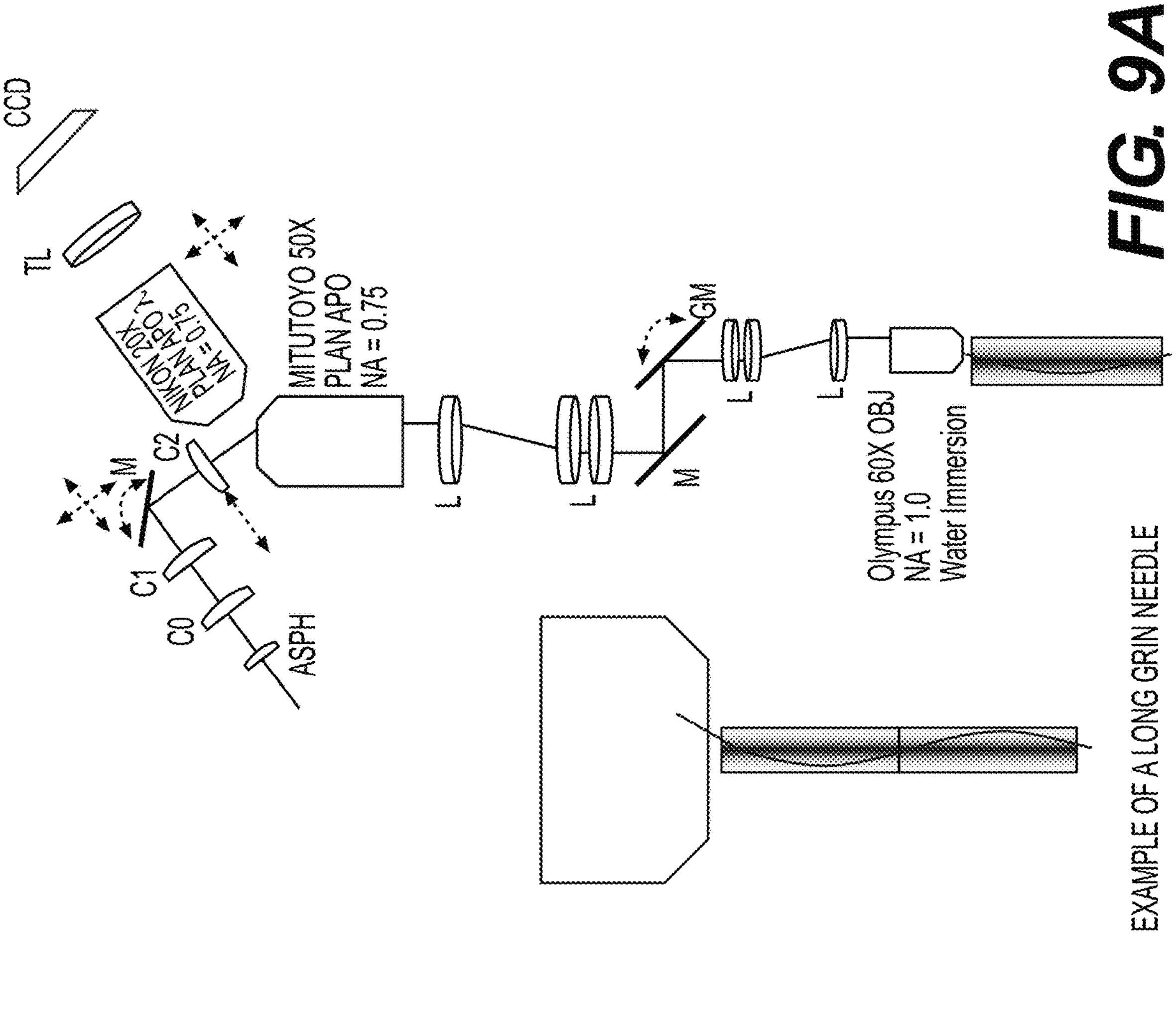

Turning now to FIGS. 9A-B, a first category of GRIN-based SCAPE is to couple a GRIN lens with the primary objective to access internal tissues or deep brain in a minimal invasive fashion. An example diagram is shown in FIG. 9A, where a 4f-equivalent GRIN lens relays the light sheet; this GRIN lens can also be of any pitch, working as any 2n*f*-system. The GRIN piece doesn't need to be co-axial with respect to the primary objective O1. It can be located at any on- or off-axis position within the imaging field of view of the primary objective, as shown in FIG. 9B.

Figure 10:
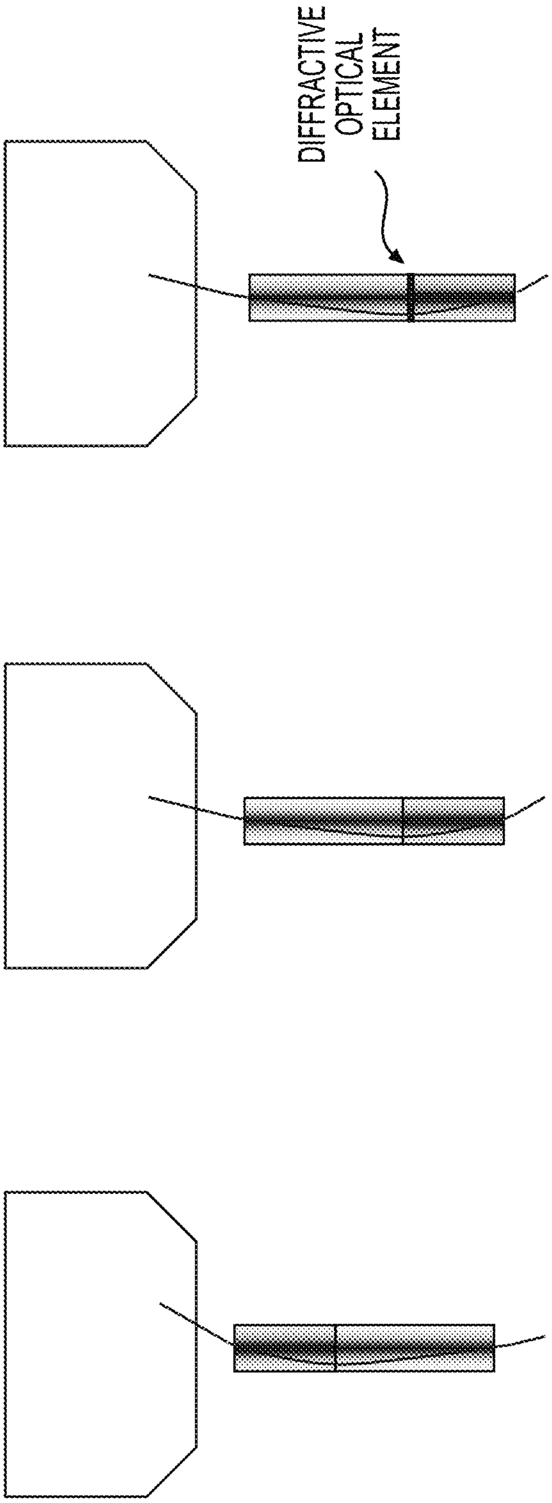
FIG. 10 depicts that a GRIN relay need not be made of identical GRIN elements.

Turning now to FIG. 10, the GRIN relay does not need to be made of identical GRIN elements. The magnification of the entire GRIN relay does not need to be ±1 either. It can magnify or minify the light sheet while relaying it. Note, however, that proper mapping of sample to intermediate image plane still requires overall magnification to be n1/n2 where n1 is sample RI and n2 is O2 immersion RI.

One example embodiment where the GRIN relay is made from two GRIN pieces of different focusing power (equivalently, different NA) is shown. This GRIN relay has a higher-NA top half and a lower-NA bottom half, so that oblique sheet angle will decrease (i.e., be more straight with respect to the optical axis), but the sheet width will increase. The second example shows a reversed case, where the lower-NA half is on the top, so that the sheet angle will increase, while the sheet width shrinks at the output, sample-facing side.

There could also be other optical components, such as a specially designed diffractive optical element or phase mask, sandwiched between the GRIN elements, to help correct optical aberrations such as spherical aberration, or chromatic focal shift, etc. An example GRIN relay that incorporate a diffractive optical element for chromatic correction is shown.

Figure 11:
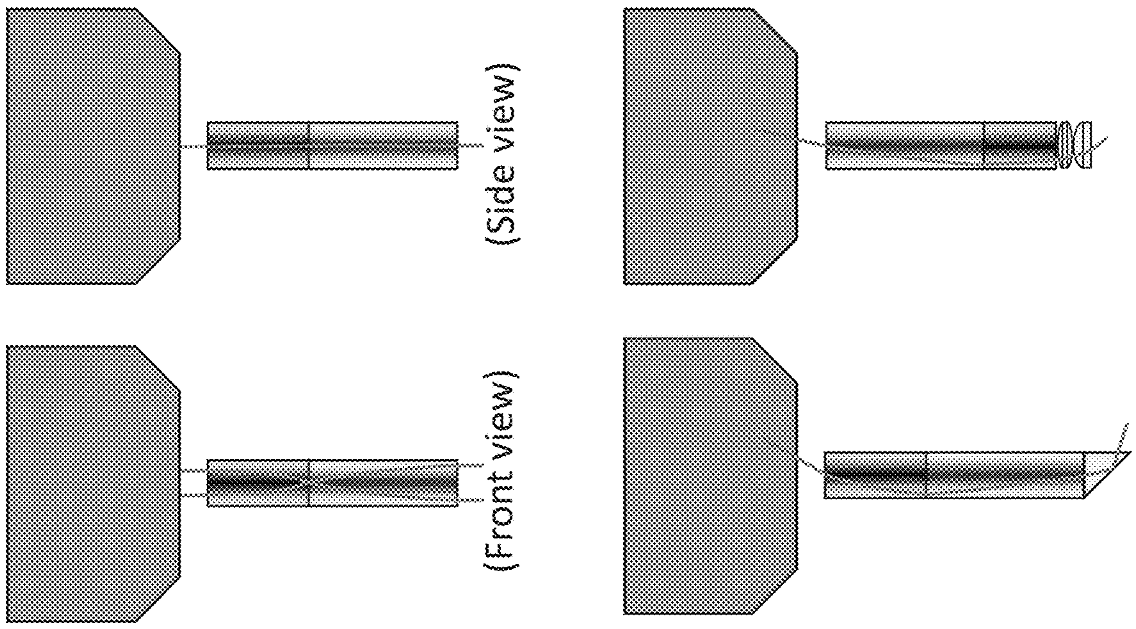
FIG. 11 depicts how the light sheet relayed by the GRIN piece does not need to be oblique.

Turning now to FIG. 11, The light sheet relayed by the GRIN piece does not need to be oblique. A straight light sheet is also feasible. Front view and side view of a straight light sheet, no longer oblique, are shown in FIG. 11. There could also be a micro-prism at the tip of the GRIN relay, to reflect and fold the beam path by any angle (90 degree typically though), so as to form a side-viewing geometry. An example with micro-prism is shown in FIG. 11. The prism can face any direction, i.e., taking any azimuthal angle with respect to the optical axis. There could also be one or multiple other light bending components, such as singlet or doublet micro-lenses, incorporated with GRIN elements, to achieve higher imaging NA, and/or to correct for aberrations. An example which incorporates an achromatic doublet and a singlet is shown in FIG. 11. Such combination provides more freedom for aberration correction while achieving higher NA than the ~0.5 NA that a typical GRIN rod lens can afford.

Having completed our digressions, we shall now return to our original train of thought, and will describe additional ways to avoid the situation in which none of the light that exits the second objective O2 is captured by the third objective O3.

Figure 12:
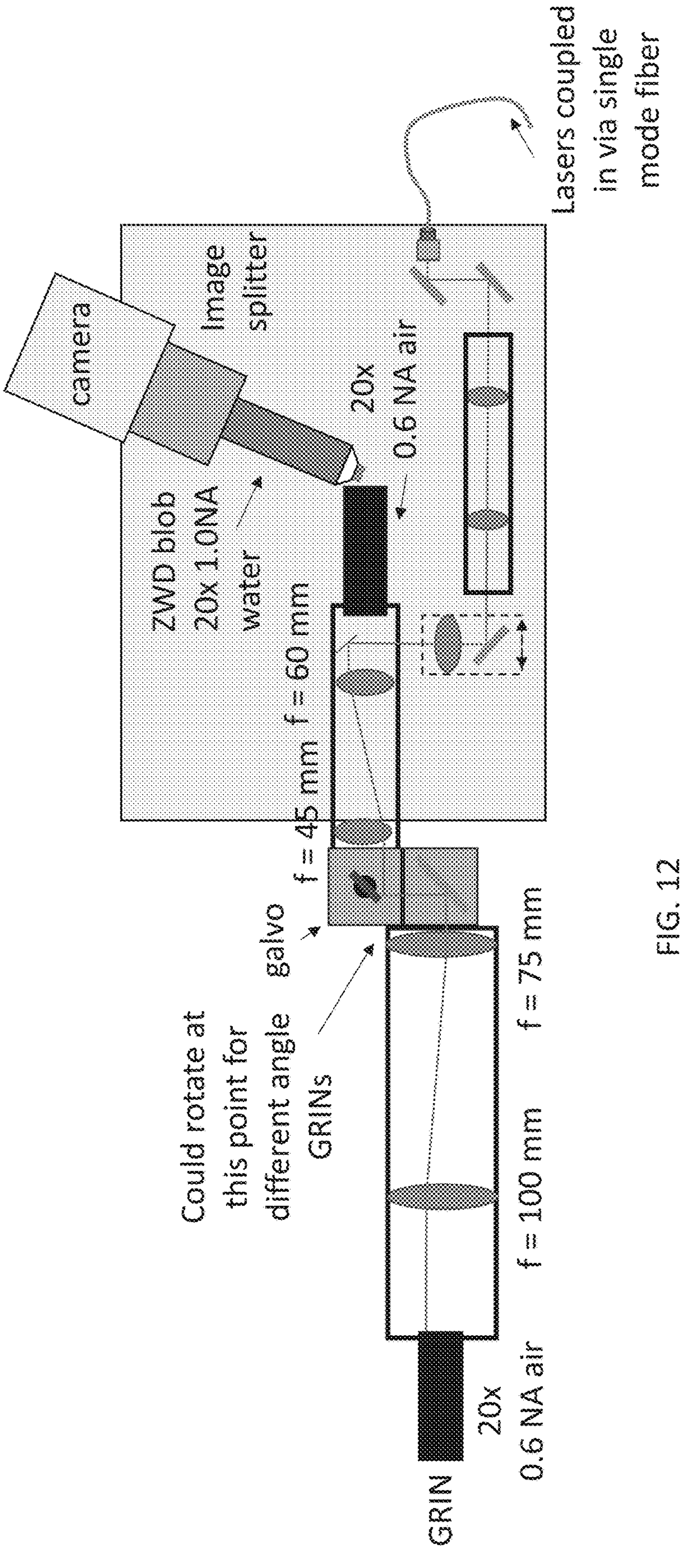
FIG. 12 depicts an alternative layout that can be used to implement the GRIN-SCAPE-1 approach.

FIG. 12 depicts another set of components and an alternative layout that can be used instead of the FIG. 4 embodiment to implement the GRIN-SCAPE-1 approach.

Figure 13:
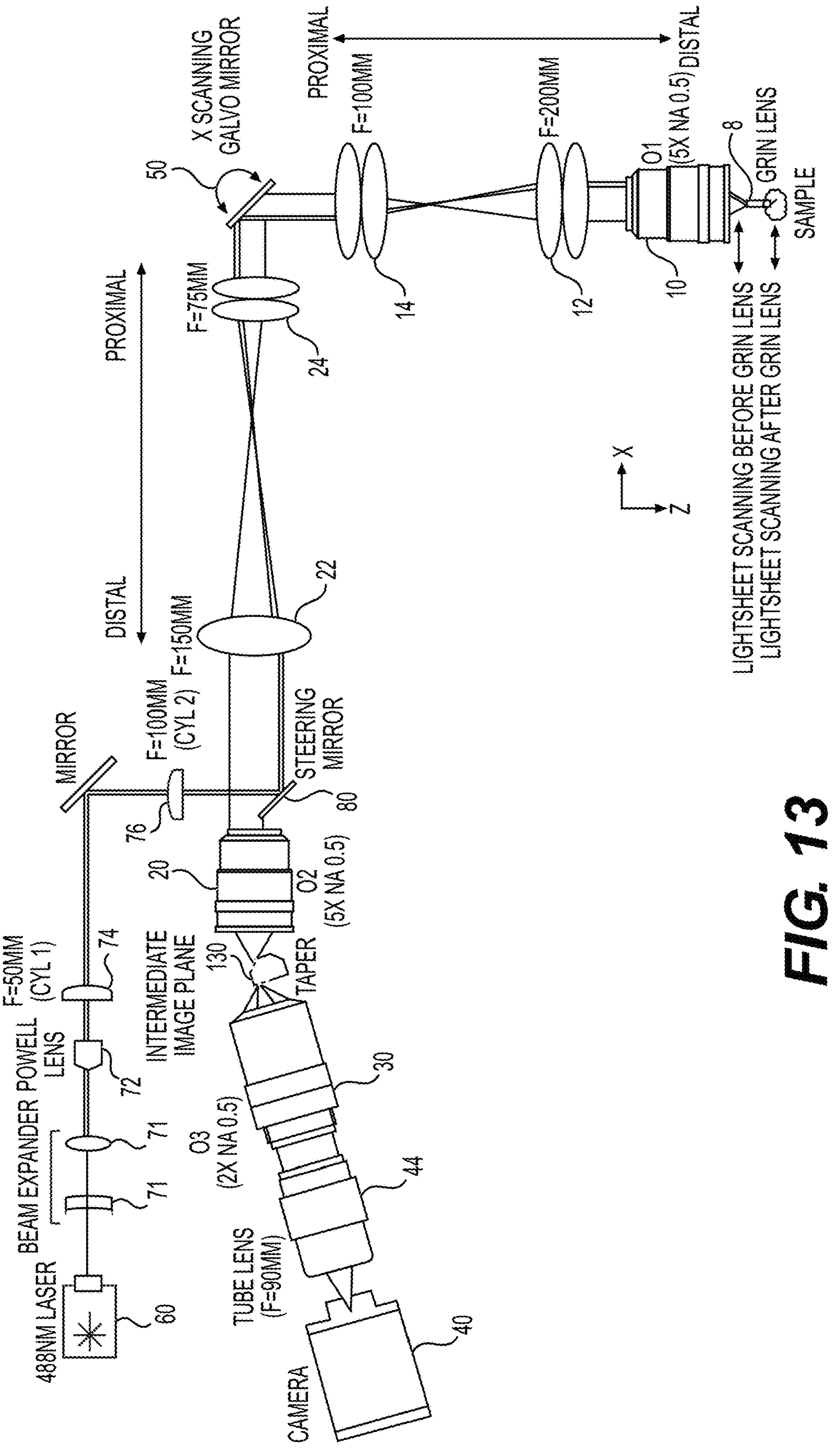
FIG. 13 depicts an embodiment of the GRIN-SCAPE-meso approach for ensuring that the light that exits the second objective O2 is captured.

FIG. 13 depicts an embodiment of the GRIN-SCAPE-meso approach for ensuring that the light that exits the second objective O2 is captured. The FIG. 13 embodiment includes a first set of optical components 10-14 having a proximal end and a distal end. The first set of optical components includes a first objective 10 disposed at the distal end of the first set of optical components. In the illustrated embodiment, in addition to the first objective 10, the first set of optical components also includes a first telescope 12-14. A GRIN lens 8 is positioned distally beyond the first objective 10. The details of this GRIN lens 8 in this FIG. 13 embodiment are similar to those described above in connection with FIG. 4.

The FIG. 13 embodiment also includes a second set of optical components 20-24 having a proximal end and a distal end. The second set of optical components includes a second objective 20 disposed at the distal end of the second set of optical components. In the illustrated embodiment, in addition to the second objective 20, the second set of optical components also includes a second telescope 22-24.

The FIG. 13 embodiment also includes a scanning element 50 that is disposed proximally with respect to the proximal end of the first set of optical components 10-14 and proximally with respect to the proximal end of the second set of optical components 20-24. The scanning element 50 can be, for example, a galvanometer mirror that has a single degree of freedom (indicated by the double-headed arrow). The scanning element 50 is positioned to route a sheet of excitation light so that the sheet of excitation light will pass in a proximal to distal direction through the first set of optical components 10-14 and through the GRIN lens 8, and project into a sample that is positioned distally beyond the GRIN lens. The sheet of excitation light is projected into the sample at an oblique angle with respect to an optical axis of the first objective 10, and the sheet of excitation light is projected into the sample at a position that varies depending on an orientation of the scanning element 50.

The GRIN lens 8 and the first set of optical components 10-14 route detection light from the sample in a distal to proximal direction back to the scanning element 50. The scanning element 50 is also positioned to route the detection light so that the detection light will pass through the second set of optical components 20-24 in a proximal to distal direction and form an oblique intermediate image plane at a position that is distally beyond the distal end of the second set of optical components (i.e., to the left the second objective 20 in FIG. 13).

The embodiment illustrated in FIG. 13 also includes a bundle of optical fibers 130 having an optical axis, a first end, and a second end. The first end of the bundle 130 is positioned at the oblique intermediate image plane so that light from the oblique intermediate image plane enters the first end of the bundle and is directed through the bundle to the second end of the bundle. The first end of the bundle 130 is thus positioned to both collect light and provide image rotation.

A third objective 30 is positioned to accept light that exits the second end of bundle 130 and route the accepted light towards a camera 40. The third objective can have an optical axis that is aligned with the optical axis of the portion of the bundle 130 that is being used. The optical theory of how the GRIN lens 8 operates in this FIG. 13 embodiment is similar to the theory described above in connection with the FIG. 4 embodiment.

The FIG. 13 embodiment also includes a camera 40 and a light source 60 that generates a beam of excitation light. At least one optical component 72-80 expands the beam of excitation light into the sheet of excitation light and directs the sheet of excitation light towards the scanning element 50. The operation of these components 40, 60, and 72-80 are similar to those described above in connection with the FIG. 4 embodiment. And the alternatives described above in connection with the FIG. 4 embodiment can also be used in the FIG. 13 embodiment.

The first end of the bundle 130 can be beveled with respect to the optical axis of the bundle as depicted in FIG. 13. But bundles with non-beveled first ends can also be used. The bundle of optical fibers 130 can comprise a bundle of tapered fibers that are oriented so that the diameters of the tapered fibers are largest at the second end of the bundle as depicted in FIG. 13. But bundles with non-tapered fibers can also be used.

In some preferred implementations of the FIG. 13 embodiment, the first end of the bundle 130 is beveled with respect to the optical axis of the bundle, the bundle comprises a bundle of tapered fibers that are oriented so that the diameters of the tapered fibers are largest at the second end of the bundle, and the first end of the bundle of optical fibers 130 has an NA of 1.0.

The embodiment depicted in FIG. 13 has a tapered optical element (e.g., a tapered bundle of optical fibers) with the taper aligned to angle ground edge. This embodiment uses a low magnification O1. The Highest NA, low magnification objective lens we could find was the 5×0.5 NA lens from Nikon, and the acceptance angle for most imaging GRIN lenses available/in use currently is 0.5 NA. A long working distance (~15 mm) air interface for this lens also proved very useful as it could accommodate an awake, behaving mouse without the need for immersion media or precise positioning. This embodiment provides relatively low resolution imaging over a larger field of view, but this is acceptable because GRIN lenses introduce quite a lot of aberrations which limit resolution. Thus the sampling density of this FIG. 13 embodiment is sufficient to see a lot of cellular detail down the GRIN lens, even if not perfect.

Figure 14:
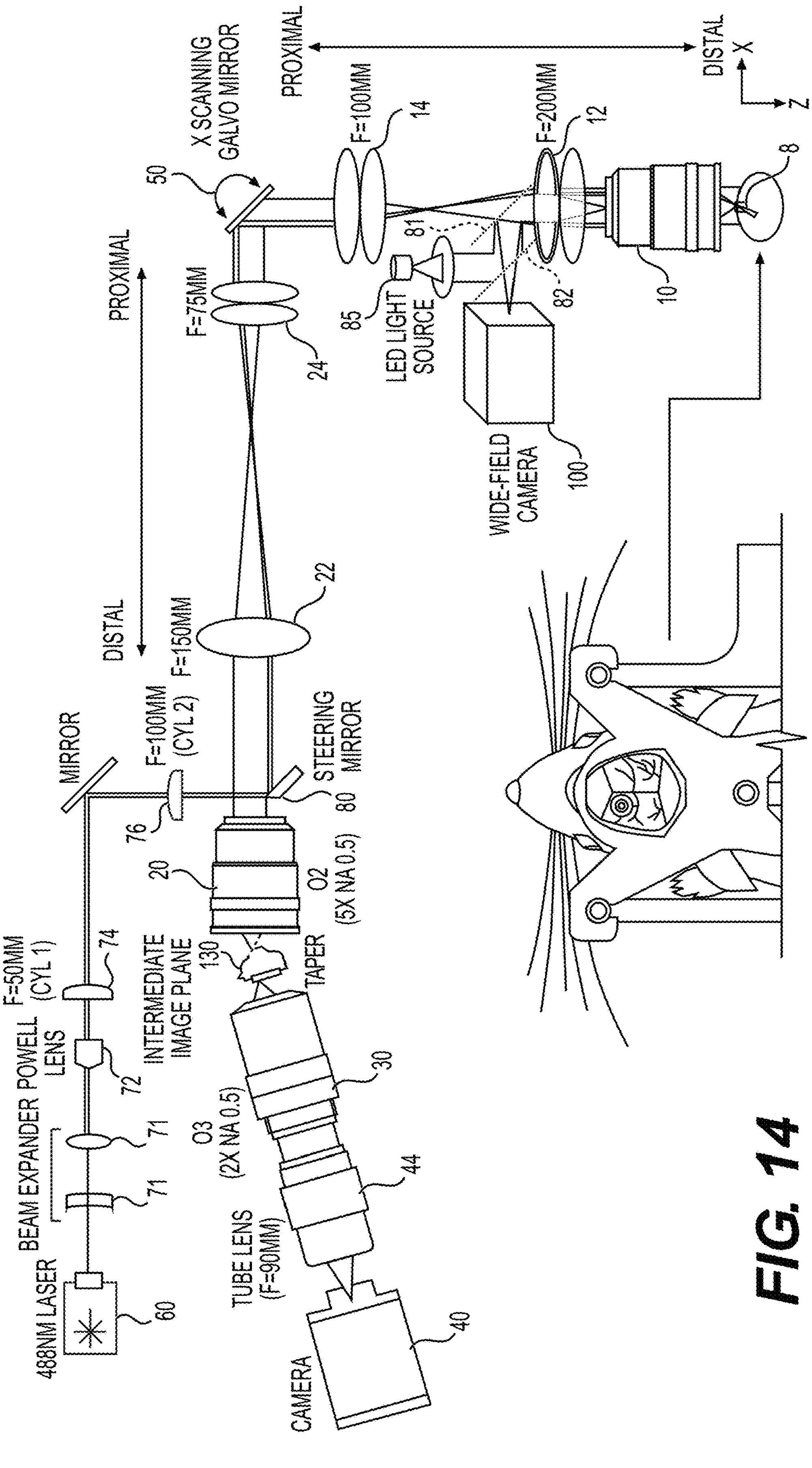
FIG. 14 depicts another an embodiment of the GRIN-SCAPE-meso approach for ensuring that the light that exits the second objective O2 is captured.

FIG. 14 depicts another an embodiment of the GRIN-SCAPE-meso approach for ensuring that the light that exits the second objective O2 is captured. This embodiment is based on the architecture of the FIG. 13 embodiment, but adds an additional feature. More specifically, the large field of view and air interface of the FIG. 14 embodiment opens up an opportunity to implement multi-modal imaging using a wide field camera 100 to, through the same objective lens 10, image the entire surface of the cortex, and also selectively image deeper parts of the brain by scanning a sheet of light through the GRIN lens 8.

In this FIG. 14 embodiment, reference numbers 8-80 operate as described above in connection with the FIG. 13 embodiment. But this FIG. 14 embodiment also includes a wide-field camera 100, a second light source 85, and first and second beam splitters 81, 82. The first beam splitter 81 is positioned within the first set of optical components, and the first beam splitter 81 is configured to route illumination light from the second light source 85 towards the first objective 10 so that the illumination light illuminates an outer surface of a region of tissue that surrounds the GRIN lens 8 after the GRIN lens has been embedded in subject tissue. The first beam splitter 81 is also positioned and configured to route light that arrives from the outer surface of the brain towards the wide-field camera 100.

The light that arrives from the outer surface of the brain could be reflected light (i.e., light at the same wavelength of the second light source 85) or fluorescence light (i.e., light at a different wavelength than the second light source 85). In the latter case, the wide-field imaging of the whole cortex can be accomplished with epi-fluorescence (e.g., using jRGECO1a exciting in green and emitting in red), while obtaining a narrower view down the GRIN lens (e.g., using GCaMP exciting in blue and emitting in green).

Note that in the embodiment depicted in FIG. 14, a second beam splitter 82 is positioned and configured to route illumination light from the second light source 85 towards the first beam splitter 81 and to route fluorescence light arriving from the first beam splitter 81 towards the wide-field camera 100. But in alternative embodiments, a different approach to routing the various wavelengths to their desired destinations can be used.

The large field of view of this FIG. 14 embodiment (e.g., 5 mm×5 mm) means that if the GRIN lens is located in different places relative to the cortex, the system can still be steered to image through the GRIN even if not centered. Optionally, one can image down multiple GRIN lenses located in different brain regions if desired (if focal planes can be maintained). All this works well because the SCAPE sweeping architecture doesn't require movement of the O1 lens to get 3D images, so the wide-field data can be acquired at the same time as the data from the deeper portions of the brain.

The FIGS. 13 and 14 embodiments can advantageously facilitate the following: (a) One can add more complexity by performing optogenetic or other manipulation of the sample during imaging. (b) Patterns of light could be projected down the GRIN lens to activate or silence cells to look at their effect on behavior or on cortical activity. Patterns could flood fill, target sub-regions of the GRIN field of view, or could use holographic or other shaping to precisely target single cells in the 3D space at precise times. This beam steering/shaping could be readily introduced to the light path. (c) One could also apply flood or patterned illumination to activate and silence parts of the cortex to manipulate the system, or give drugs or other perturbations. Note that these benefits may require careful matching of wavelengths and power densities to separate excitation from imaging wavelengths.

Note that in the FIGS. 13 and 14 embodiments: (a) the field of view is much larger than it needs to be if it is only going to be used for imaging a 0.5-1 mm NA objective lens. (b) The fiber taper implementation limits resolution to 2.5 micron pitch size. And (c) It is possible to get somewhat higher NA GRIN lenses that would be under-filled by 0.5 NA.

Figure 15:
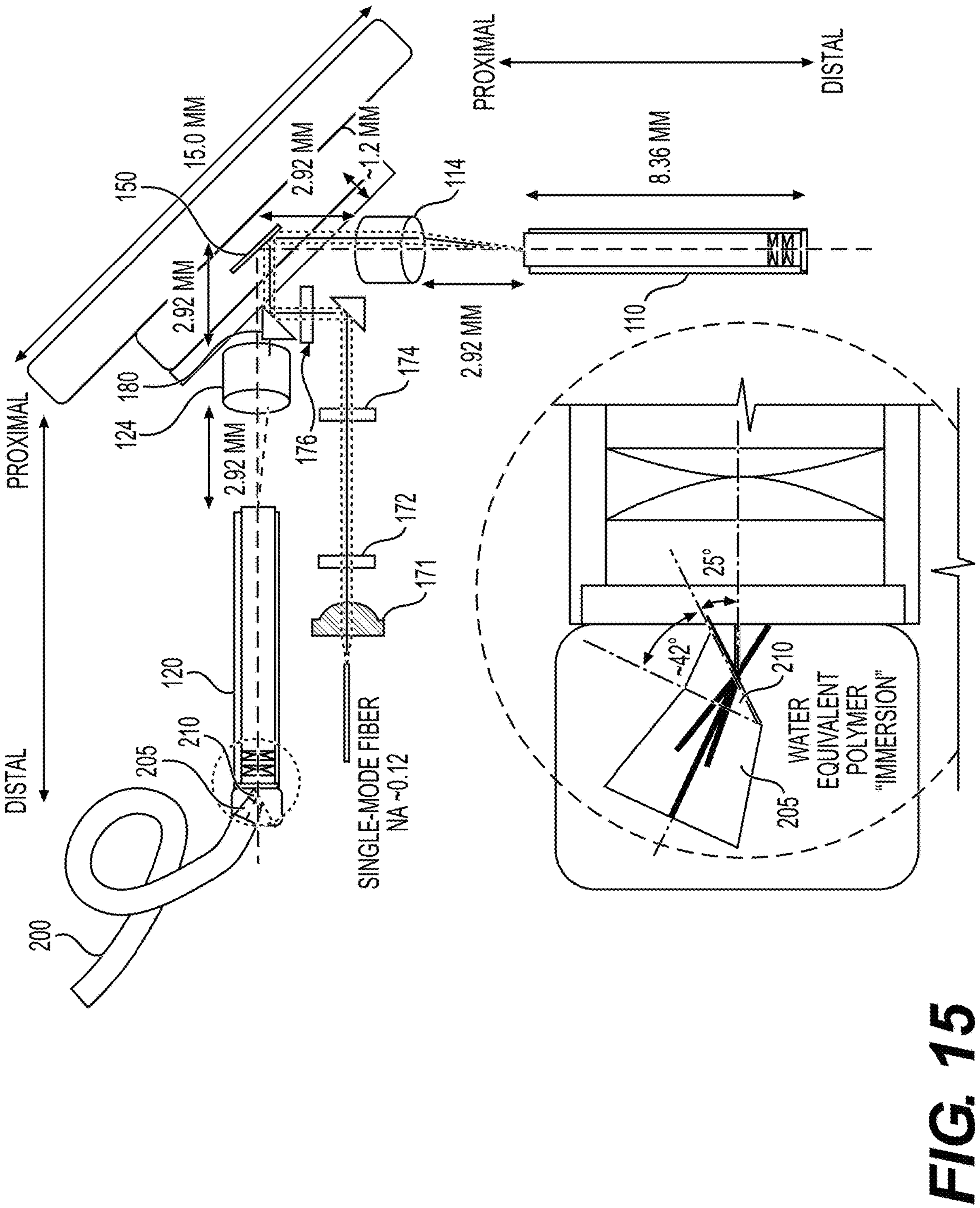
FIG. 15 depicts an embodiment of the GRIN-SCAPE-mini approach for ensuring that the light that exits the second objective O2 is captured.

FIG. 15 depicts an embodiment of the GRIN-SCAPE-mini approach for ensuring that the light that exits the second objective O2 is captured.

The FIG. 15 embodiment includes a first set of optical components 110-114 having a proximal end and a distal end. The first set of optical components includes a first GRIN objective 110 disposed at the distal end of the first set of optical components. In the illustrated embodiment, the GRIN objective 110 is a GRINTECH GT-MO-070-016-ACR-VISNIR-30-20, which features 0.7 NA in water (31.6° semi-cone angle), and 0.16 NA on the other side. It is a quasi-4f system. Assuming a sheet angle of 25°, the air-side angle will be to) asin(sin(25°)×1.333×0.16/0.7)=7.4°. This GRIN objective 110 incorporates both the primary objective and a tube lens in a single GRIN-based component. But in alternative embodiments, a different GRIN objective 110 could be used.

Returning to FIG. 15, in addition to the first GRIN objective 110, the first set of optical components in the illustrated embodiment also includes another lens 114, which is an Edmunds #84-128, VIS-NIR, EFL=4.0 mm, Diam=2.0 mm, BFL=2.92 mm. Beam offset behind scan lens #1 is 4.0×sin(7.4°)=515 μm. But in alternative embodiments, a different lens 114 could be used.

The FIG. 15 embodiment also includes a second set of optical components 120-124 having a proximal end and a distal end. The second set of optical components includes a second objective 120 disposed at the distal end of the second set of optical components. In the illustrated embodiment the second objective 120 is also a GRIN objective, and the same part number is used for the second objective 120 as the GRIN objective 110. But in alternative embodiments a different GRIN objective could be used as the second objective 120, or even a non-GRIN objective. In addition to the second objective 120, the second set of optical components in the illustrated embodiment also includes another lens 124, which matches the lens 114. But in alternative embodiments, the lens 124 may not match the lens 114.

The FIG. 15 embodiment also includes a scanning element 150 that is disposed proximally with respect to the proximal end of the first set of optical components 110-114 and proximally with respect to the proximal end of the second set of optical components 120-124. In the illustrated embodiment, the scanning element 150 is Mirrorcle S46105 MEMS element, mirror diam=2.0 mm, mirror is ~1.2 mm beneath the glass surface. Based dimension is ~15 mm×15 mm. But in alternative embodiments, a different MEMS element can be used. In other alternative embodiments, the scanning element 150 can be, for example, a galvanometer mirror.

The scanning element 150 is positioned to route a sheet of excitation light so that the sheet of excitation light will pass in a proximal to distal direction through the first set of optical components 110-114, and project into a sample that is positioned distally beyond the first GRIN objective 110. The sheet of excitation light is projected into the sample at an oblique angle with respect to an optical axis of the first GRIN objective 110, and the sheet of excitation light is projected into the sample at a position that varies depending on an orientation of the scanning element 150.

The first set of optical components 110-114 route detection light from the sample in a distal to proximal direction back to the scanning element 150. The scanning element 150 is also positioned to route the detection light so that the detection light will pass through the second set of optical components 120-124 in a proximal to distal direction and form an oblique intermediate image plane at a position that is distally beyond the distal end of the second set of the second objective (i.e., to the left the second GRIN objective 120 in FIG. 15).

At least one additional optical component 200-210 is positioned distally beyond the oblique intermediate image plane, and the at least one additional optical component is positioned and configured to (a) route light that arrives at the oblique intermediate image plane towards a camera (not shown), and (b) to correct for an angle of the oblique intermediate image plane.

The excitation beam in this FIG. 15 embodiment can be collimated by a Thorlabs 354140-A aspheric lens, EFL=1.45 mm, diam.=2.4 mm, resulting a beam diameter of ~0.12×1.45×2=350 μm. It is further folded and guided into the system via two micro-prism reflector. As for the sheet width, assuming the central ~200 μm is more or less uniform, a custom ~4.5× cylindrical beam expander expand it to be ~900 μm wide, then another customized 4.0-mm-EFL Cyl pairs with scan lens #1 to relay it to the back side of O1, leading to ~200 μm usable sheet width on the front side. The sheet NA can be estimated to be 0.12×1.45/4.0×0.7/0.16=0.19, which can be reduced by a slit if needed. For collection, this embodiment could employ the water equivalent polymer spacer 210 (also referred to herein as a "blob") to "glue" the output of the second objective O2 120 to a fiber optic taper 205. The taper 205 should be beveled by ~42° (assuming core NA=1.8), so that the fiber axis will be bent to be parallel to the O2 axis. Note that the two extreme rays will be bent to ~18° and ~5.6° with respect to the fiber axis, corresponding to 0.56 NA into the small end of the taper 205. The output NA from the big end of the taper 205 will be even smaller, thus well collected by the fiber bundle 200 (NA<0.4).

The pros of this embodiment include: minimal customization, except grinding the taper and customizing three cylindrical/Powell lenses 171-176; excellent O1 NA and collection efficiency; cm-level package size; how much the primary GRIN inserts into brain can be decided when mounting it. Cons of this embodiment include that the sampling density is limited by the taper 205 to be ~2.8 μm.

A variety of approaches may be used to implement the at least one optical component. For example, in the embodiment illustrated in FIG. 15, the at least one additional optical component comprises a tapered bundle of optical fibers 205 having a small end and a large end, and a polymer spacer 210 with a refractive index of 1.33 having a front face and a rear face. The front face is positioned against the second objective 120 and the rear face is positioned against the small end of the tapered bundle of optical fibers 205.

In other embodiments, the at least one additional optical component comprises a bundle of optical fibers having a first end that is positioned at the oblique intermediate image plane. Optionally, in these embodiments, the first end is beveled with respect to the optical axis of the bundle of optical fibers.

In other embodiments, the at least one additional optical component comprises a third objective having an optical axis that is perpendicular to the oblique intermediate image plane. Optionally, these embodiments can further comprise a cured polymer spacer having a refractive index that matches an immersion medium of the third objective (e.g., 1.33), wherein the cured polymer spacer is affixed directly to a front surface of the third objective (e.g., a 1.0 NA water immersion objective), and the cured polymer spacer is positioned so that the oblique intermediate image plane is formed on a face of the cured polymer spacer. In these embodiments, the second objective 20 can be an air objective and the third objective can be a non-air immersion objective.

Figure 16:
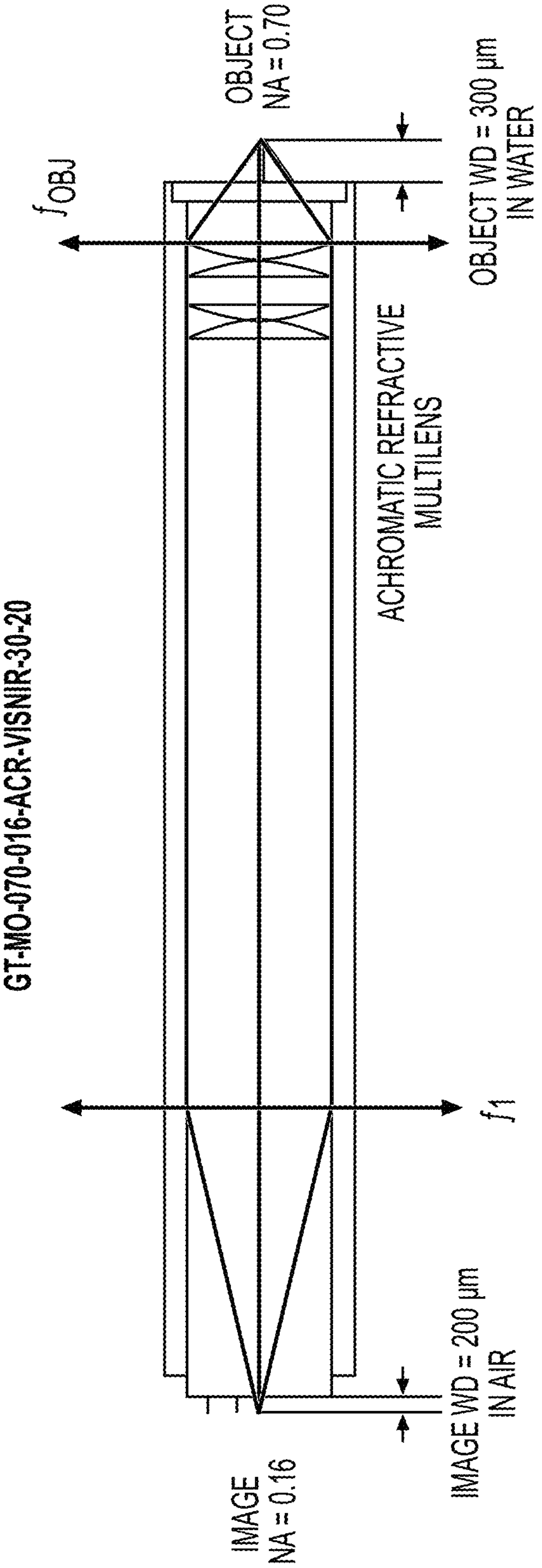
FIG. 16 is a schematic representation of a GRIN objective.

FIG. 16 is a schematic representation of the GRINTECH GT-MO-070-016-ACR-VISNIR-30-20 that serves as the first GRIN objective 110 and the second objective 120 in the FIG. 15 embodiment. This component is one of the high-NA GRIN objectives from GRINTECH, with 0.7 NA on the sample side (water-immersion), with good achromaticity and field-correction. Diameter is 1.3 mm, so the optical part diameter is ~1.0 mm. This micro objective can be modeled as a telescope, and one can estimate that:

the EFL of the virtual primary objective is $$f_{obj} = \frac{D/2}{NA} = \frac{0.5}{0.7} \approx 0.71 \text{ mm};$$

the EFL of the virtual tube lens is $$f_1 = f_{obj}\frac{NA_{obj}}{NA_1} = 3.125 \text{ mm}$$

The total length of the GRIN objective is 8.36 mm, so the telescope is roughly a 4f-system (probably designed for telecentric fiber scan). Assuming this will be inserted into the mouse brain, we can then bridge it with a scan lens, MEMS scanner, etc., as shown in FIG. 17.

Figure 17:
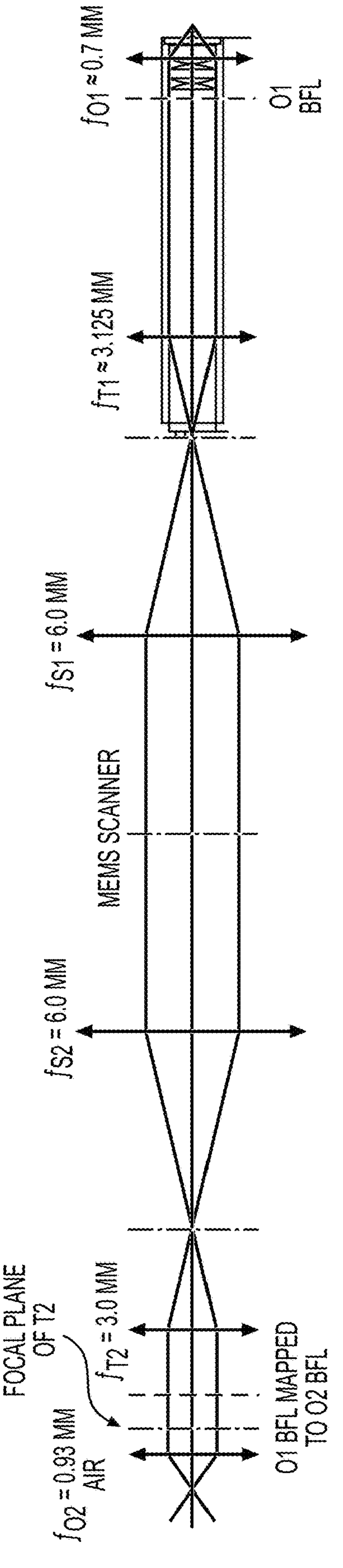
FIG. 17 depicts that a scan lens is selected to provide 2× magnification.

In FIG. 17, for simplicity, the scan lens is selected to provide 2.0× magnification from the BFL of virtual O1 to the galvo, since the back aperture of the virtual O1 is 1 mm (or less) in diameter, and the MEMS scanner can be larger than 3 mm in diameter (3×sin(45°)>2 when viewed from 45 deg).

One example choice is the micro plano-convex lens Edmunds #49-176 (3.0 mm in diameter), or the small achromat Edmunds #63-714 (4.0 mm in diameter), both VIS-NIR coated and 6 mm EFL.

In the detection arm, another telescope can be added to map the O1 BFL, for simplicity, to O2 BFL with 1:1 ratio, and $f_{O2}$ set to $n_W \cdot f_{O1} \approx 0.93$ mm EFL, working in air. Potential choices include a single Edmunds #43-394 of 1.0 mm EFL (although it is only a plano-convex lens), or a Plossl comprising two Edmunds #65-300 (2.0 mm EFL), or a customized high-NA micro-objective.

The BFL of O1 might not coincide with the front focal plane of the virtual T1 (as the original GRIN objective might not be exactly 4f), so its image formed by the T1-S1-S2-T2 telescope might not overlap with focal plane of T2, but we can simply shift O2 to match it.

Figure 18:
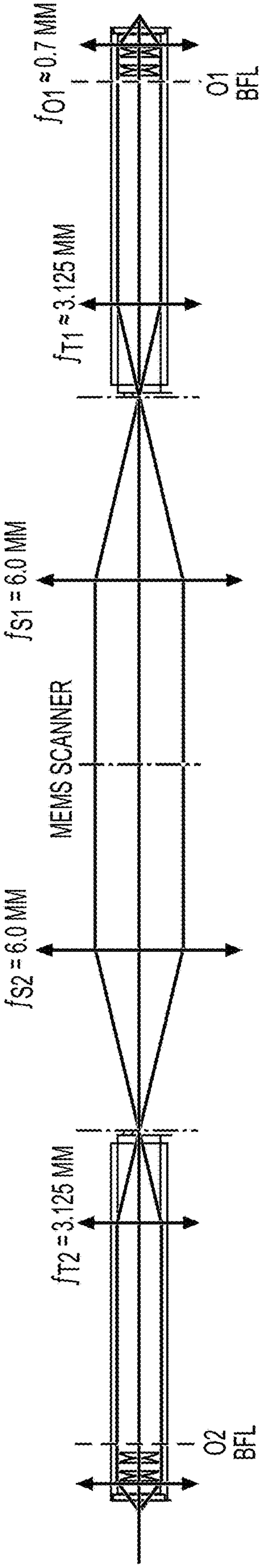
FIG. 18 depicts using the same GRIN objective as virtual T2 and virtual O2.

Turning now to FIG. 18, one potential solution is to just use the same GRIN objective as virtual T2 and virtual O2. This solution is simple, but has potential accumulation of spherical aberration from O1 BFL to O2 BFL.

For this embodiment and the FIG. 17 embodiment, the mechanical scan angle of the MEMS needed to cover a 200 μm diameter field (x direction) is $\pm 100\ \mu m / f_{O1} \times f_{T1} / f_{S1} / 2 \approx \pm 2°$, easily covered by MEMS scanner from Mirroracle Inc.: https://www.mirrorcletech.com/wp/products/mems-mirrors/

Figure 19:
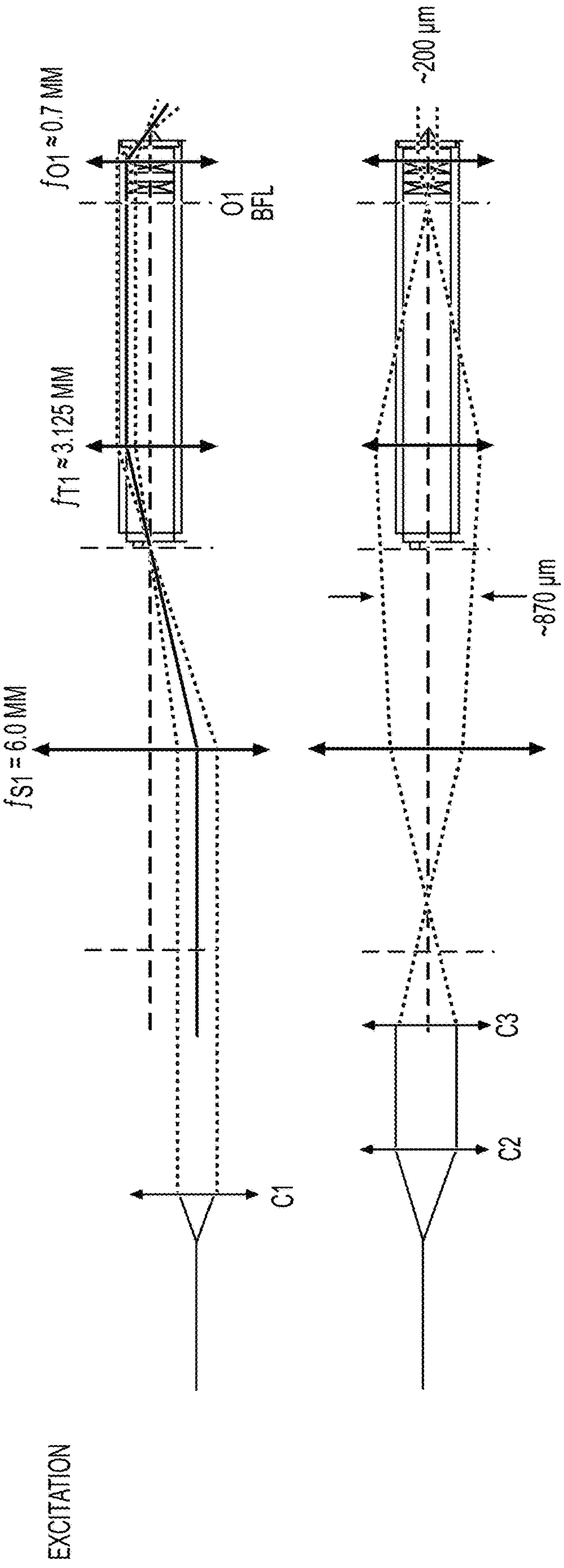
FIG. 19 depicts the cone angle of a 0.7-NA water GRIN objective.

Turning now to FIG. 19, The cone angle of this 0.7-NA water GRIN objective is 31.6°. If we target an oblique sheet angle of ~24°, the offset at the O1 back aperture will be ~380 μm, and thus ~760 μm between the galvo and S1 (top drawing). Along the y-direction, however, the BFL of the virtual O1 might not overlap with focal plane of T1, so the waist of the injected sheet might not match the focal plane of scan lens 1 (bottom drawing). Quantitatively, for the GRIN objective with 1 mm optical diameter, the achievable sheet width is roughly 200 μm. So the incoming sheet from the back end is ~870 μm in width. The excitation sheet can be injected anywhere appropriate in the beam path. If the excitation laser comes from a fiber, then three micro-cylindrical lenses can be used to transform the fiber output into the desired Gaussian sheet.

Figure 20:
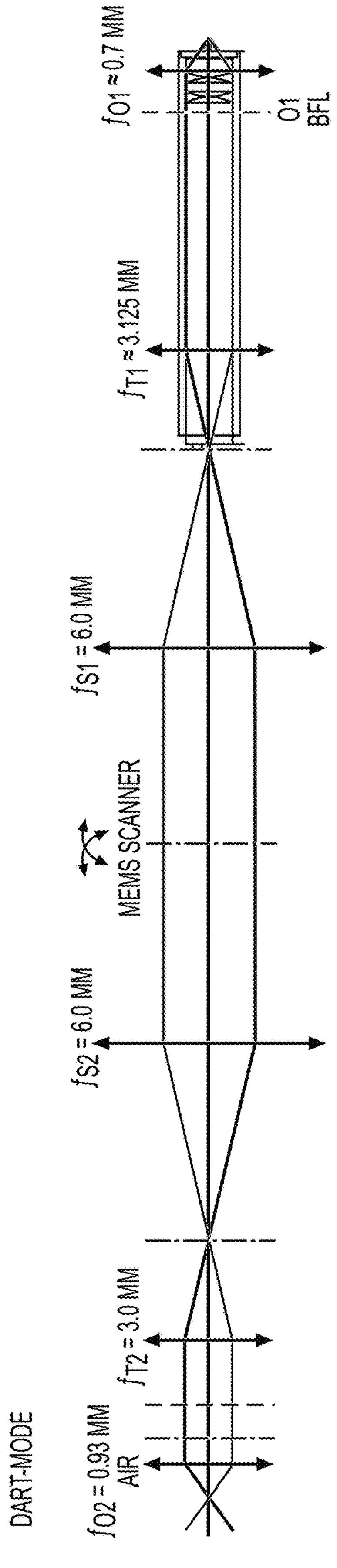
FIG. 20 depicts the operation of a MEMS scanner that can scan two axes.

Turning now to FIG. 20, since the MEMS scanner can typically scan both axes, one can also employ the digitally synthesized light sheet, as in a DART system. This time it is easier to introduce the excitation beam from, again, anywhere in the beam path (upper trace in the middle) prior to the scanner. In this mode, one axis of the MEMS can potentially work in the resonant mode, to maximize the achievable volumetric frame rate. In this mode, the return beam can easily be collected using a high-NA fiber taper, and we do not need to worry much about the limited sampling density. A line detector can be used in this mode to measure the returning fluorescence guided back through a fiber bundle.

Figure 21:
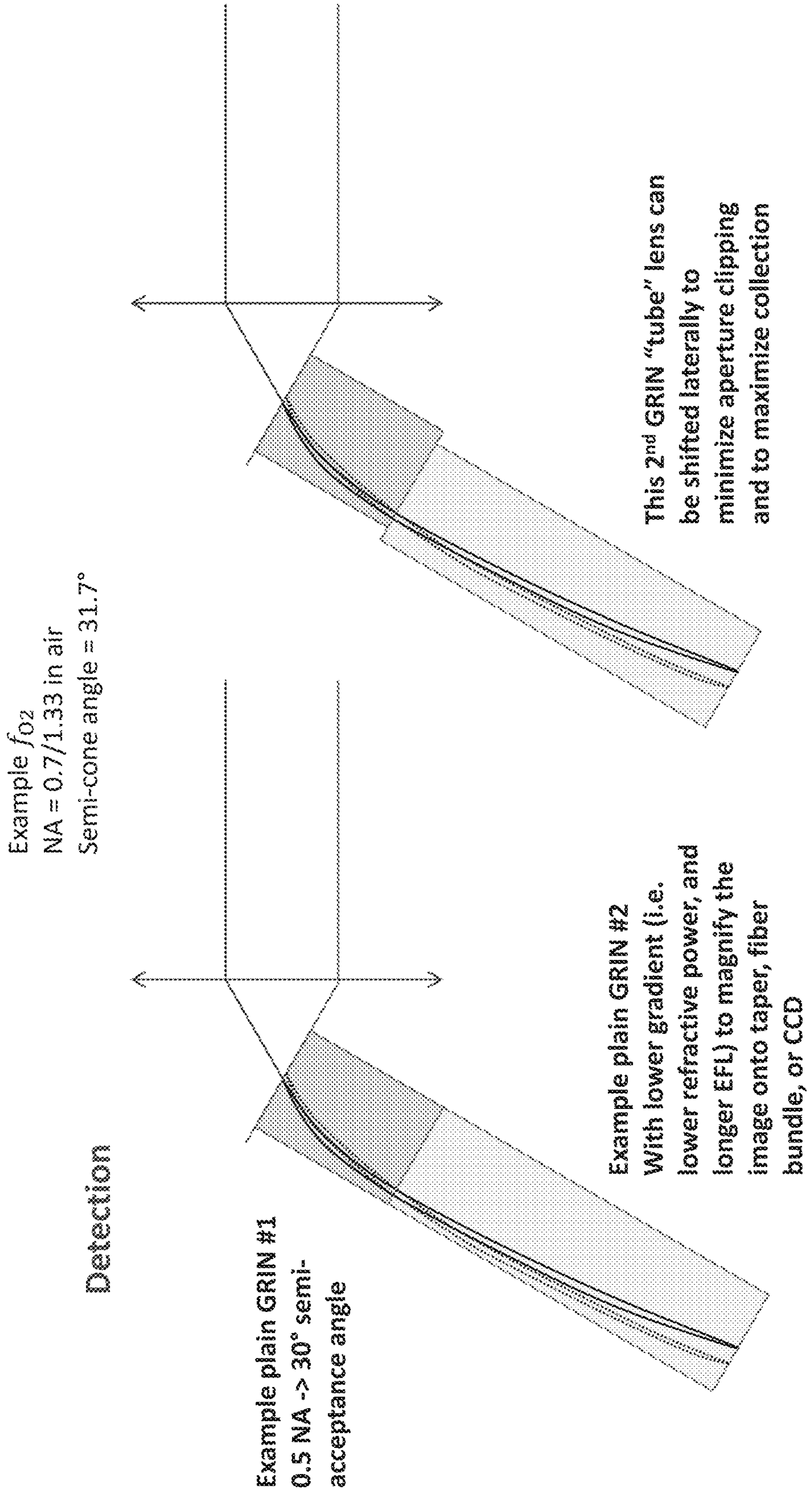
FIG. 21 depicts examples of detection for different optical layouts.

FIG. 21 depicts examples of detection for different optical layouts. Note that overall, the limited NA of common GRIN element can limit the collection angle.

Figure 22:
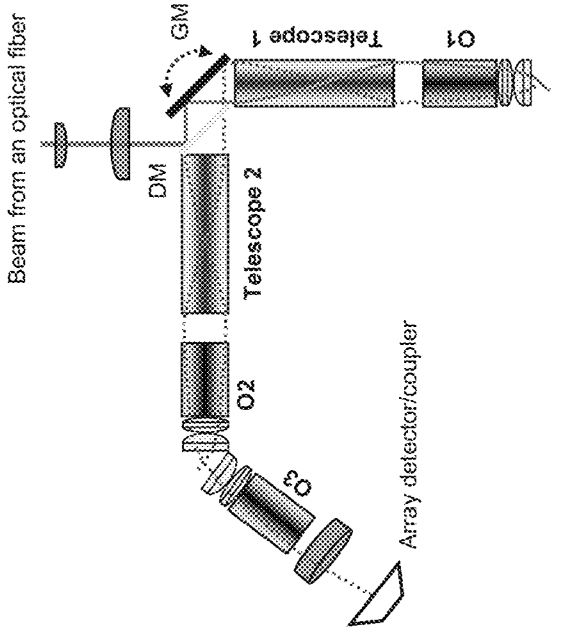
FIG. 22 depicts another embodiment of the GRIN-SCAPE-mini approach for ensuring that the light that exits the second objective O2 is captured.

FIG. 22 depicts another embodiment of the GRIN-SCAPE-mini approach for ensuring that the light that exits the second objective O2 is captured. The GRIN lens can function as the primary objective, or scan or tube lens or telescope. So the entire SCAPE system can be miniaturized using GRIN lenses and GRIN-based objectives. In the FIG. 22 embodiment, All objectives (primary, secondary, and tertiary) are replaced by GRIN-based miniature objectives that have high enough focusing NA. The scan and tube lenses are also replaced by a single GRIN lens. They can also be composed of multiple GRIN lenses or micro-singlet or micro-doublet lenses, or a mixture of them.

The scanner (GM) could be a MEMS mirror (working under either non-resonant or resonant mode), or a micro-polygon driven by some micro-motor, or other miniature mirror system or deflector. The dichroic mirror (DM) is used to couple the excitation sheet. It can be replaced by a micro reflective mirror, or micro-prism with reflective surface, which will occlude the collection aperture a little, but can potentially reduce the footprint.

The third objective O3 here can have zero working distance, realized via customization, or by combining it with a polymer-based "blob" to couple the intermediate image more efficiently (e.g., as described above in connection with the FIG. 4 embodiment). The third objective can be paired with a micro tube lens (as shown), or a GRIN-based tube lens, to magnify the intermediate image onto an array detector or coupler like tapered fiber faceplate. The excitation beam can be injected via an optical fiber. The fiber tip can be lensed to provide collimated output along one or both axes. One or multiple micro cylindrical lenses or Powell lenses can be employed to further condition the excitation sheet.

Figure 23:
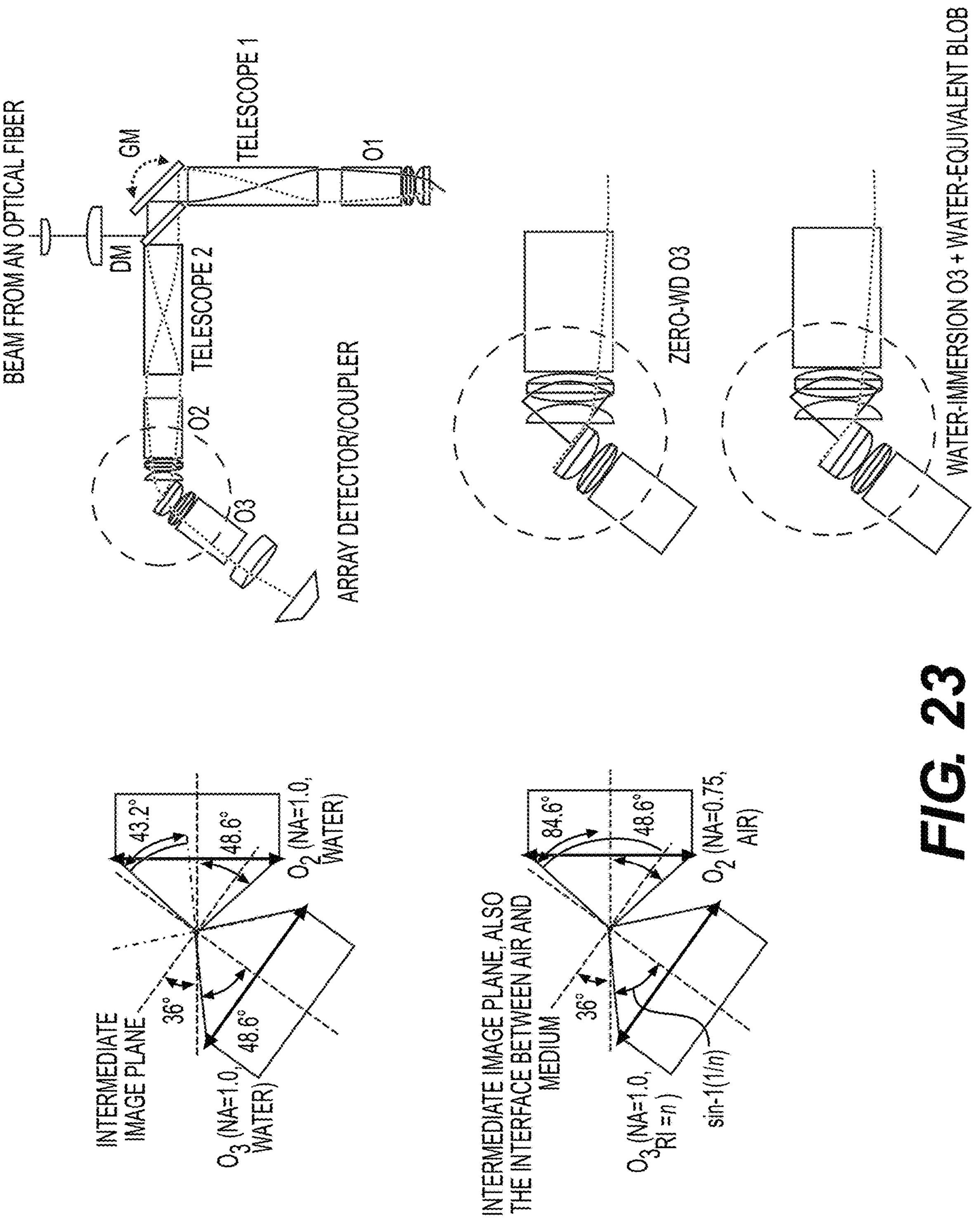
FIG. 23 depicts other embodiments of the GRIN-SCAPE-mini approach for ensuring that the light that exits the second objective O2 is captured.

FIG. 23 depicts other embodiments of the GRIN-SCAPE-mini approach for ensuring that the light that exits the second objective O2 is captured, with a zero-working distance O3 (trans-medium intermediate image coupling). In this embodiment, to maximize the collection efficiency of epi-fluorescence, trans-medium intermediate image coupling can be utilized, i.e., the second objective O2 can be designed to be dry, and the third objective O3 can be a water-, oil-, or glass-immersion objective, thereby forming the intermediate image on the interface of the immersion medium of O3.

To illustrate this, the two examples on the left of FIG. 23 feature the same cone angle out of O2, corresponding to 1.0 NA in water (left), or 0.75 NA in air (right). If O3 is also 1.0 NA water-immersed (left), then the collection angle (projected onto the paper plane) is only 43.2°. If O3 maintains the same 1.0 NA, but O2 works in air, the collection angle almost doubles to 84.6°. There are several options here: 1) One option is to design O3 directly to have zero WD and high NA (purple indicates an example collection angle); 2) design O3 to be non-zero WD, but still, say water-immersed, and then augment O3 with a blob made of polymer or other material that features the same refractive index as water, thereby forming an equivalently zero-WD combination.

To improve the collection NA of GRIN lens, one option is to combine it with a high-index half-ball lens, e.g., a 2.0-mm-diameter S-LAH79 half-ball lens from Edmunds (#90-858). The refractive index of S-LAH79 is n≈2.0, so the EFL of this half-ball lens can be estimated to be R/(n−1) 1.0 mm, then the collection NA approaches 1.0, ideally. In reality, this concept design has severe aberrations. Careful design is preferably used to optimize the performance. For example, the half-ball lens can be split into multiple pieces to gradually bend the beams, and the gradient profile of the GRIN pieces can also be tweaked to have special fourth-order profiles to minimize aberration.

A zero-WD GRIN-based high-NA composite objective is practically feasible, as described in https://doi.org/10.1117/3.934997. ch51 and Barretto, R. P., B. Messerschmidt, and M. J. Schnitzer, (2009), 'In vivo fluorescence imaging with high-resolution microlenses', Nat Methods, 6: 511-2. , each of which is incorporated herein by reference.

Figure 24:
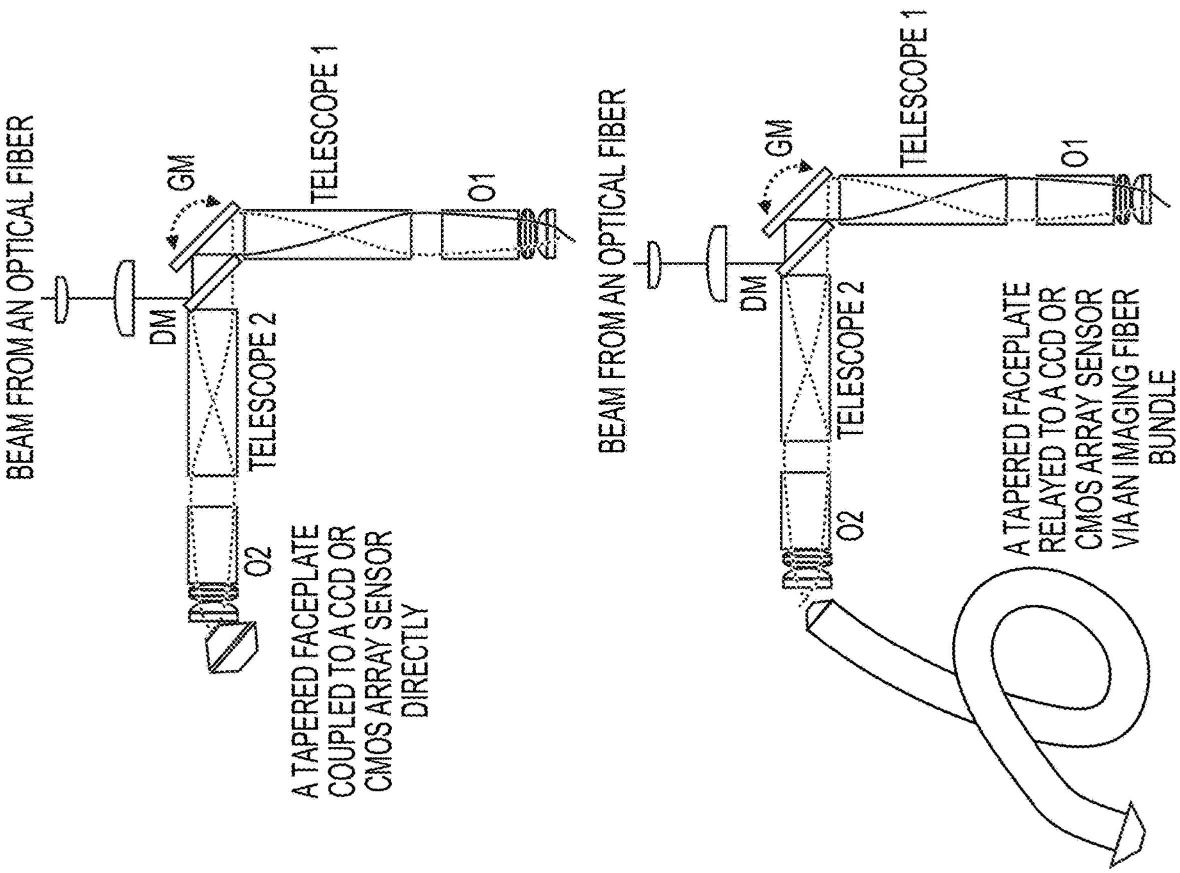
FIG. 24 depicts additional embodiments of the GRIN-SCAPE-mini approach for ensuring that the light that exits the second objective O2 is captured.
Figure 25:
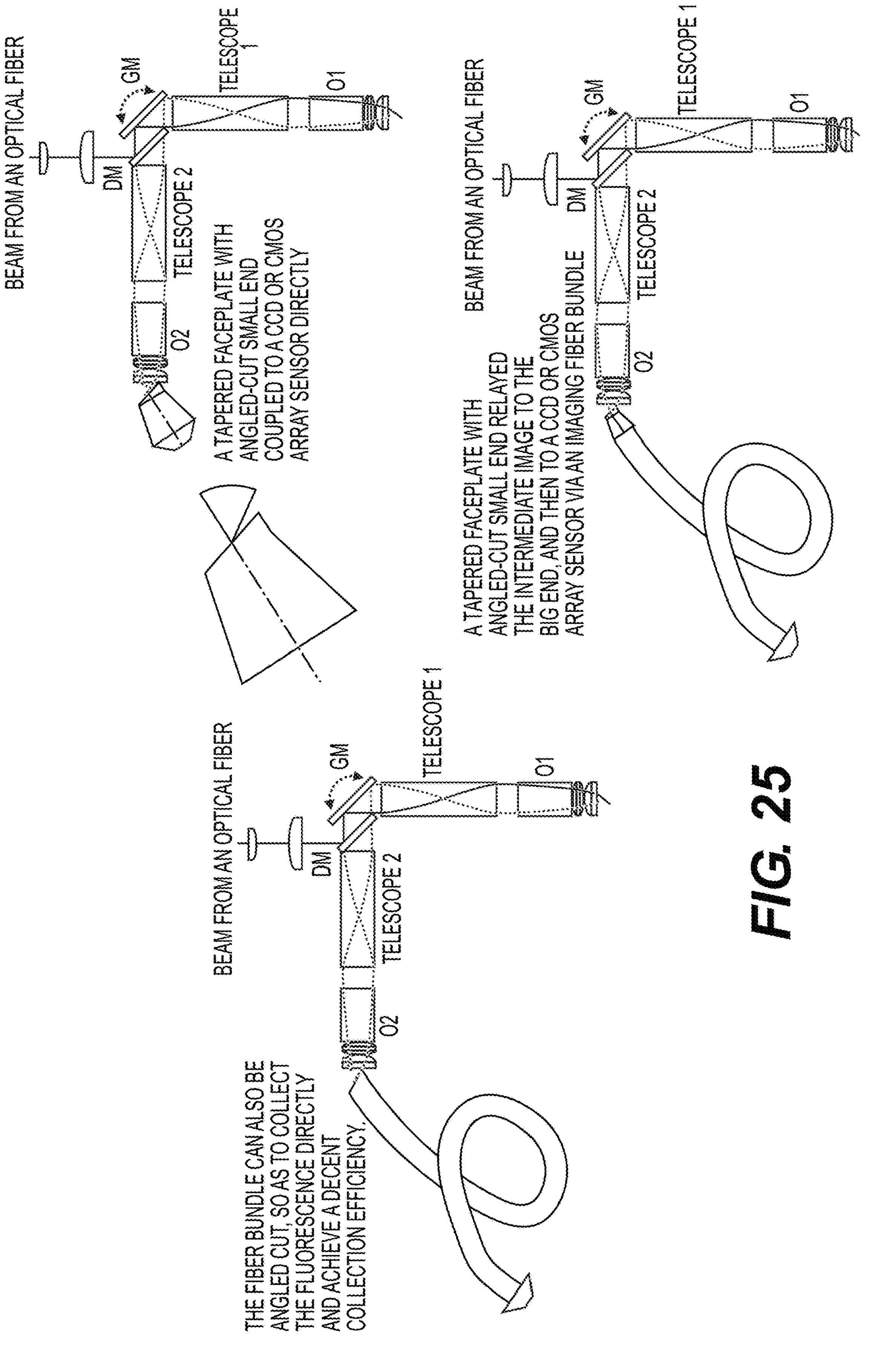
FIG. 25 depicts additional embodiments that rely on direct detection without a third objective.

FIG. 24 depicts additional embodiments of the GRIN-SCAPE-mini approach for ensuring that the light that exits the second objective O2 is captured that relies on direct detection without O3 (i.e., the third objective). Direct detection without O3 is another major variant to get rid of a refractive O3, by placing an array detector or coupler behind O2, matching and capturing the intermediate image directly. The array detector can be a CCD/CMOS chip, in which case the intermediate image will be recorded directly. The detector can be a back-illuminated (BSI) sensor for maximal collection efficiency and minimal equivalent WD). A microlens array could be integrated with the detector (especially if it is not BSI), so as to enlarge the collection cone angle of each individual pixel. The array detector can be a tapered fiber-optic faceplate configured so that the small end faces the intermediate image to maximize the sampling density. Such discretized intermediate image is then relayed and magnified onto the big end, where it gets 1) either directly recorded by a CCD or CMOS sensor, 2) or further relayed through a flexible imaging fiber bundle with thousands of cores to a proximal end CCD, CMOS, or any other type of sensor. Both the fiber bundle and the tapered fiber-optic faceplate preferably have as high acceptance NA and as small inter-core cross-talk as possible FIG. 25 depicts additional embodiments that rely on direct detection without O3 (i.e., the third objective). Note that in these embodiments, the axis of the tapered faceplate, or of the fiber bundle, does not need to be perpendicular to the intermediate image plane. In other words, the end surface that accepts the intermediate image can be angled cut. In this way, the acceptance cone of each individual fiber, be it in a taper or in a fiber bundle, can be tilted towards the cone of light out of O2, thus enhancing the collection efficiency on the small end. Furthermore, for a tapered faceplate, this also leads to decreased emission NA from the big end, making the subsequent collection by CCD or coupling by fiber bundle (typical NA~0.4) easier, thus enhancing the overall collection efficiency. The optimal cut angle depends on the refractive index of the fiber core, the intermediate image plane angle, and the angle of beam cone out of O2.

When a MEMS mirror is used as the scanning element in the GRIN-SCAPE-mini embodiments, the MEMS mirror diameter needs to be big enough to match the aperture of the primary GRIN-based objective. Typical commercial products from, for example, Mirrorcle Technologies, can fabricate an integrated mirror 2.4 mm in diameter, and a bond mirror (i.e., a mirror fabricated separately and bond to the scanner later) even bigger. The entire package with a 2-mm-diameter mirror can be smaller than 2.5 cm. MEMS scanner from Mirrorcle are typically 2-axis. Single-axis scanner from Fraunhofer IPMS can be even smaller.

Figure 26:
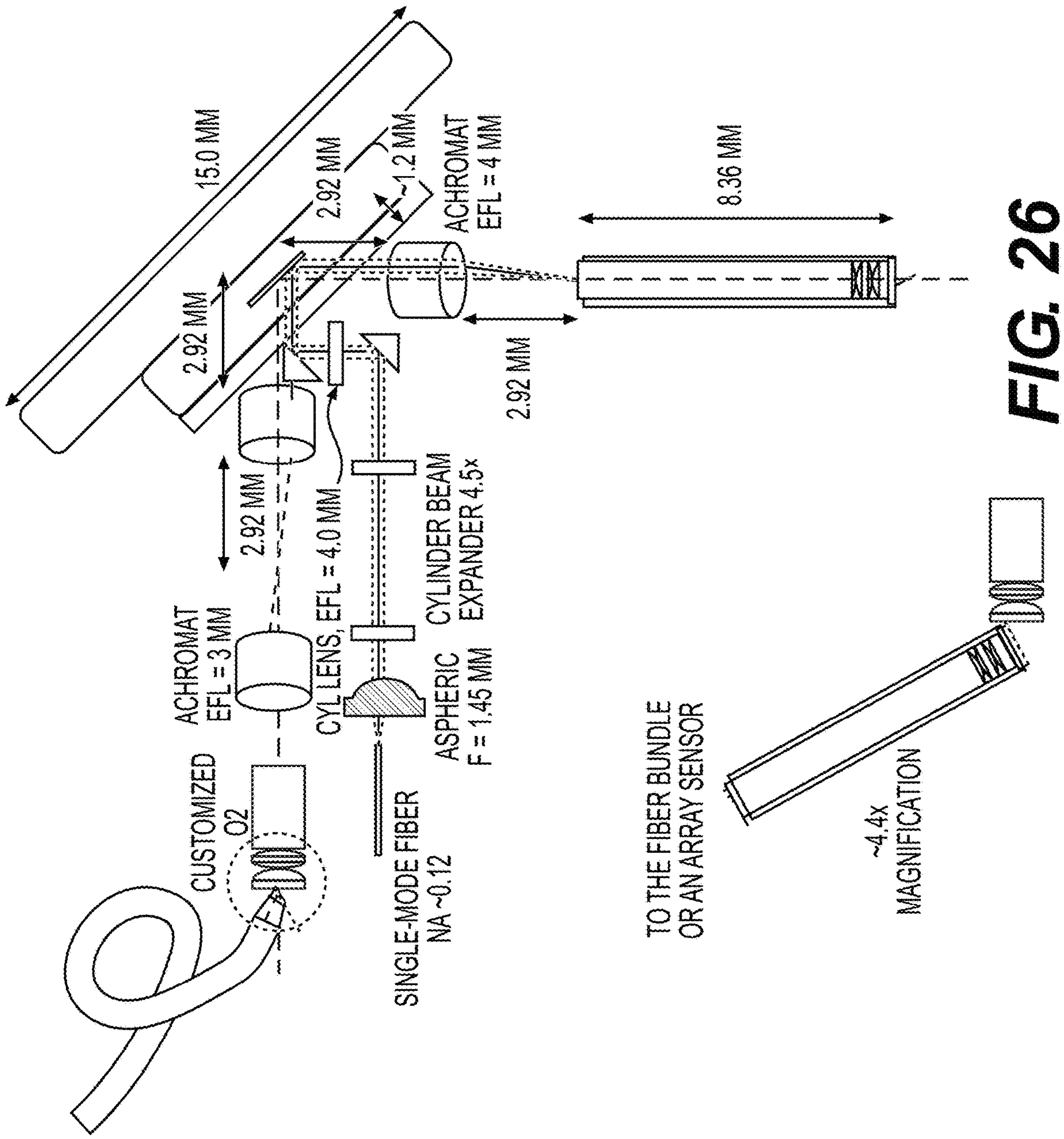
FIG. 26 depicts another embodiment in which the primary objective and tube are implemented in a single component.

FIG. 26 depicts another embodiment in which the primary O1+tube lens is implemented by the GRINTECH GT-MO-070-016-ACR-VISNIR-30-20, which features 0.7 NA in water (31.6° semi-cone angle), and 0.16 NA on the other side. It is a quasi-4f system. Assuming a sheet angle of 25°, the air-side angle will be to asin(sin(25°×1.333×0.16/0.7) =7.4°. The scan lens is an Edmunds #84-128, VIS-NIR, EFL=4.0 mm, Diam=2.0 mm, BFL=2.92 mm. The beam offset behind scan lens #1 is 4.0×sin(7.4°)=515 μm. The MEMS is a Mirrorcle 546105, mirror diam=2.0 mm, mirror is ~1.2 mm beneath the glass surface. Based dimension is ~15 mm×15 mm.

The O2 arm uses the same scan lens (EFL=4 mm), then an Edmunds #84-127 achromat (EFL=3.0 mm). O2 itself should be a customized air/dry objective with 0.9 mm EFL and 0.5 NA, so that the total mag from O1 to O2 will be 0.7/0.16×4/4×0.9/3.0=1.31, ensuring quasi-isotropic magnification. This customized O2 can be made from combining multiple singlets and/or doublets, or combining GRIN lens with refractive lens like shown.

Then O3 can be either 1) a beveled tapered faceplate coupled to a fiber bundle as described before, or 2) say the ~4.4×0.7-NA O1-tube lens (i.e., the GT-MO-070-016-VIS-NIR-30-20) bound with a water-equivalent polymer blob to enhance collection. The latter design magnifies the intermediate image, thereby allowing dense sampling even using a fiber bundle or small CCD/CMOS directly behind O3 and tube lens. And O3 can be customized to other magnification and higher NA also to better match the collection device, and to enhance the overall collection efficiency.

Figure 27B:
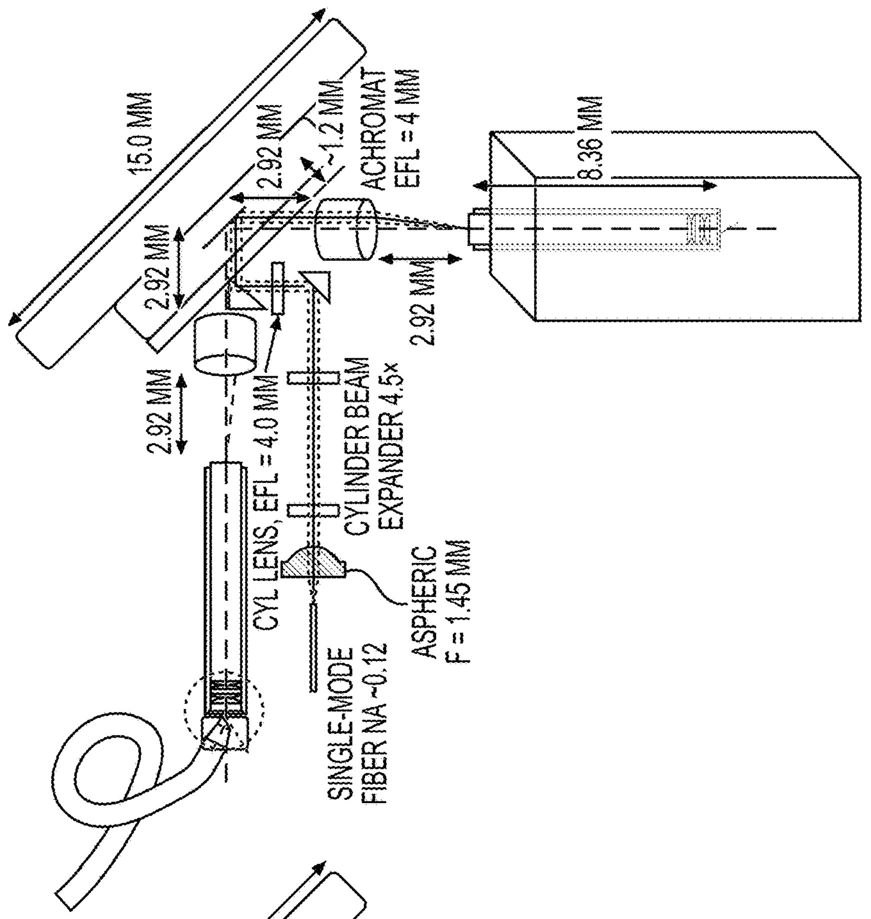
FIGS. 27A-27B depict two additional embodiments of the GRIN-SCAPE-mini approach.
Figure 27A:
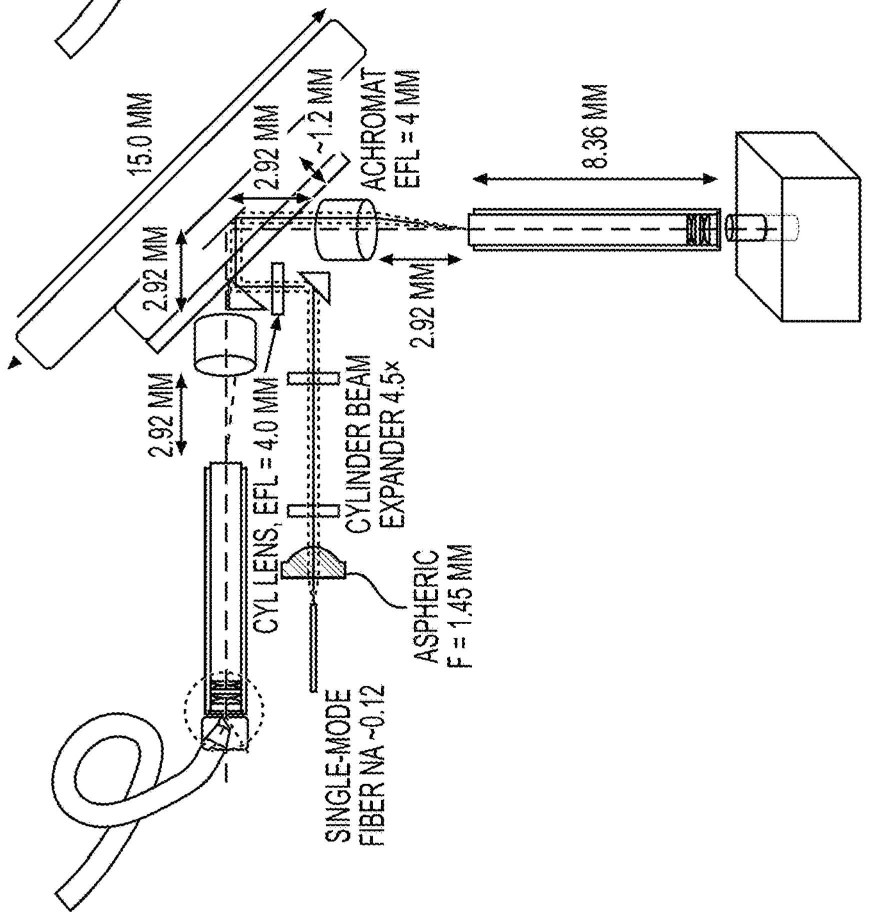

FIGS. 27A-B depict two additional embodiments of GRIN-SCAPE-mini. The FIG. 27A embodiment could use mini system as microscope and couple to another implanted GRIN. In the FIG. 27B embodiment, the final GRIN could be the implanted GRIN itself, so the microscope directly scans onto its distal end embodiment.

The following fabrication methods can be appropriate for the embodiments described herein: Positioning of components can be facilitated by precision machined aluminum casing, or high quality 3D printed casing. Components can be glued in place, positioned by a second system such as a precision alignment translation stage or robotic arm. 2-3 points for fine adjustment may be needed to ensure alignment. If components can be fully encased in index matching UV cure polymer, stability, dust and moisture resistance could be significantly improved. Expensive components can be connectorized to the scanning head.

Figure 28:
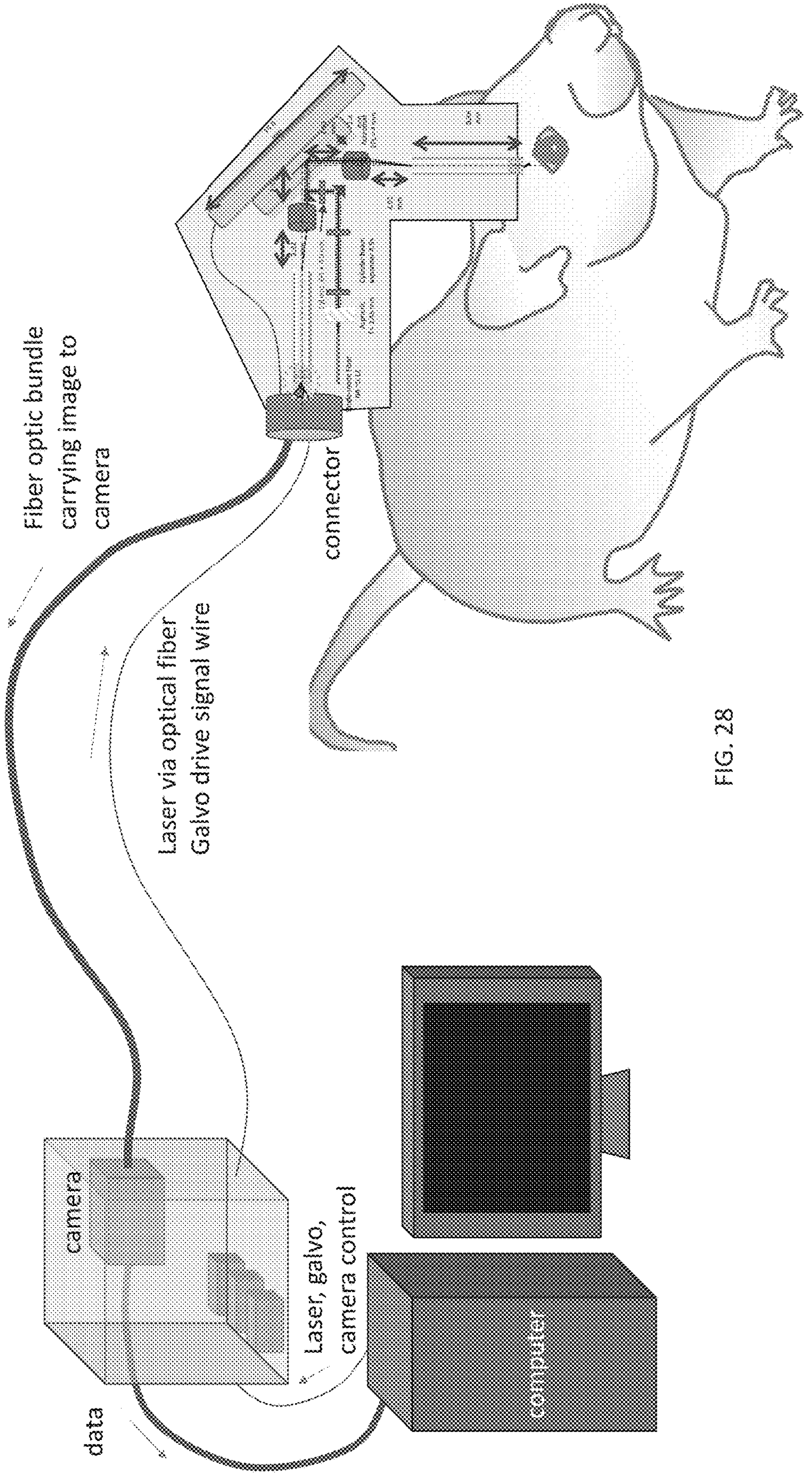
FIG. 28 is a schematic diagram showing how the GRIN-SCAPE-mini optical configurations can be used.

Finally, FIG. 28 is a schematic diagram of an overall system in which the GRIN-SCAPE-mini optical configurations described above can be used. The requirement for SCAPE microscopy to use well-collimated light, and the need for a fast, sensitive camera means that this miniaturized system can be tethered to a base station housing a full sized camera and laser launch. Due to the miniaturization, the mice can carry the imaging system with them during free behavior such as navigation or social interaction with other animals. The tether connecting to the miniature head-mounted imaging head would include the galvo drive signal, a single mode fiber to deliver laser light and a flexible, dense fiber bundle to map the image to the camera. One advantage of this modular approach is that the most expensive and energy consuming components of each system will be separate from the miniaturized scan head, which can include only one moving part and require minimal local electrical control. It should thus be possible to test many different ‘scan head’ prototypes using the same base camera and laser components, while data rates and data visualization will not be a bottleneck.

Using a fiber bundle to relay GRIN-SCAPE-mini’s images to a higher quality camera does not need to limit the spatial resolution of this system. First, the ZWD and/or fiber taper methods detailed above perform image rotation and would permit the resultant image to be magnified onto a connectorized flexible imaging fiber bundle whose fiber size (e.g., 3.3 micron, 0.4 NA) could be equivalent to >½ the required optical resolution of the system and would thus over-sample. This bundle could then be imaged onto the fast camera, again matching pixel sizes for minimal loss of image integrity. Moreover, SCAPE’s image formation captures Y-Z projections of the sample, which can be much smaller in size than the full desired X-Y field of view, with X resolution and field of view determined by galvo scanning range and imaging speed. For example, a 600×600×200 micron volume could be sampled by a rectangular fiber bundle with 200×600 fibers for 1 micron sampling density. Such imaging fiber bundles are very affordable compared to the kinds used for high fidelity endoscopy applications requiring dense sampling over large fields of view.

Optionally, in any of the embodiments described above, adding multi-color imaging to a GRIN SCAPE system provides a major advantage to permit imaging of multiple cell types. This could incorporate strategies for image splitting, spectral unmixing and multiplexed laser illumination. Utilizing red-shifted or near infrared single-photon fluorophores, or two-photon excitation could permit deeper imaging of the tissue at the distal tip of the GRIN lens and thus a larger population of neurons. Note, however, that it may be important to consider chromatic aberration more carefully in GRIN lens systems compared to conventional SCAPE systems.

GRIN-specific improvements include the following: (a) GRIN lenses all introduce aberrations including field curvature. (b) Methods could be used to correct this curvature either in software as post-hoc analysis (after determining the geometric properties of the 3D distortion between the image volume and the object volume). This could utilize a uniform 3D phantom. Or imaging of the same structured shape with and without the GRIN lens in place. (c) Distortion could also be corrected in hardware such as by using a spatial light modulator or DMD to alter the applied and returning wavefronts. This could greatly enhance resolution and uniformity of imaging, although corrections may be needed to adjust with the scanning sheet.

The GRIN systems described herein can incorporate methods for repeatedly aligning small cameras and illuminators to the GRIN lens. These can be 3D printed and can include magnets for secure repositioning. GRIN lenses can be implanted into the brain and secured to the skull. After recovery, based mounts can be glued onto the skull while checking an image to ensure alignment. The imaging part is then removed and a cover used to protect the GRIN lens. A similar approach could be used to make alignment of the mouse under our bench-top GRIN lens systems more repeatable and reliable. A top plate aligned to the SCAPE system could be fixed in place, and made compatible with existing skull-base hardware. For fixation the animal could be clipped into the SCAPE-secured mount. Secondary fixation of the mouse via a skull mounted bar can optionally be used to minimize motion artifacts during imaging.

Head-fixed GRIN-SCAPE embodiments can: a) image awake, behaving mice with existing GRIN-implants (e.g., implants compatible with Inscopix and mini-cam); b) establish performance in phantoms and by comparing data between modalities in the same mice for validation of cell-specific activity pattern extraction; and c) explore extensions to simultaneous GRIN-SCAPE+pan-cortical wide-field, multi-GRIN imaging and parallel optogenetic manipulation.

Multi-color cell type recordings can: a) extend GRIN-SCAPE to multi-spectral recordings of functional indicators in different cell types (astrocytes, interneurons, neurons, microglia, neuronal sub-populations); and b) validate labelling strategies and algorithms for cell-type specific extraction of activity patterns during behavior.

With the growing recognition of cell type diversity throughout the brain, the embodiments described herein go beyond imaging only excitatory neurons, and can be used to capture dynamic interactions between many cell types simultaneously (e.g., inhibitory neurons and astrocytes). To capture these interactions, multi-spectral labelling and imaging with high enough speed and 3D resolution to observe activity in the entirety of cells (rather than just their soma) is helpful. The combined ability to resolve fully 3D activity in multiple cell types, at high speeds, and in any region throughout the mammalian brain in behaving animals could transform our understanding of brain circuits and the functional role of cell types in behavior.

GRIN-SCAPE can provide high fidelity, fully 3D realtime dynamic recordings (e.g., 600×600×250 micron volumes at over 10 VPS) anywhere in the awake, behaving mammalian brain.

The GRIN-SCAPE embodiments described herein provide high-speed, fully 3D, optically sectioned images at the tip of an implanted GRIN lens. This feature would permit simultaneous recordings of larger populations of cells, require less precise placement of the GRIN lens and permit imaging further away from the region of potential damage from the GRIN insertion. The 3D coordinates of each cell will be known, and should unambiguously define its identity to permit tracking of activity of the same cell from session to session (with structural validation using point-scanning 2-photon if desired). By optimizing resolution and simultaneous multi-spectral acquisition, we will add to the types of questions that can be asked using existing techniques by permitting analysis of full 3D activity throughout single cells, and/or intricate dynamic interactions between cells and cell types within a 3D volume. By pairing GRIN-SCAPE with methods capable of labelling specific cell types with different color indicators of cellular activity we will be able to capture local interactions between multiple cell types in real time behavior.

Compatibility of GRIN-SCAPE-1 with head-mounted camera based imaging could permit comparisons between freely moving and head-fixed behaviors and representations. The versatile form of GRIN-SCAPE-Meso systems will can also permit imaginative experiments that combine imaging from multiple brain regions at once to evaluate brain-wide circuits (e.g. pan-cortical wide-field imaging of sensory and motor cortices with simultaneous cellular imaging of striatum in the context of spontaneous movements). This system would also be compatible with a range of optogenetic manipulations including patterned cortical activation and inactivation, GRIN-based exposure of the deep brain region during imaging and holographic single-cell optogenetic activation or silencing during GRIN-SCAPE volumetric imaging. GRIN-SCAPE is useful in mice, as well as GCaMP contrast in the brains of weakly electric fish, Siamese fighting fish and adult salamanders.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An imaging apparatus comprising:

a first set of optical components having a proximal end and a distal end, wherein the first set of optical components includes a first objective disposed at the distal end of the first set of optical components;

a GRIN lens positioned distally beyond the first objective;

a second set of optical components having a proximal end and a distal end, wherein the second set of optical components includes a second objective disposed at the distal end of the second set of optical components;

a scanning element that is disposed proximally with respect to the proximal end of the first set of optical components and proximally with respect to the proximal end of the second set of optical components;

wherein the scanning element is positioned to route a sheet of excitation light so that the sheet of excitation light will pass in a proximal to distal direction through the first set of optical components and through the GRIN lens, and project into a sample that is positioned distally beyond the GRIN lens, wherein the sheet of excitation light is projected into the sample at an oblique angle with respect to an optical axis of the first objective, and wherein the sheet of excitation light is projected into the sample at a position that varies depending on an orientation of the scanning element, wherein the GRIN lens and the first set of optical components route detection light from the sample in a distal to proximal direction back to the scanning element, and wherein the scanning element is also positioned to route the detection light so that the detection light will pass through the second set of optical components in a proximal to distal direction and form an oblique intermediate image plane at a position that is distally beyond the distal end of the second set of optical components; and a third objective with an associated optical interface that are collectively positioned to route light that arrives at the oblique intermediate image plane towards a camera, wherein the third objective and the associated optical interface are collectively configured to provide a zero working distance to maximize detection NA, wherein the second objective is an air objective and the third objective is a non-air immersion objective, and wherein the associated optical interface comprises a cured polymer spacer having a refractive index that matches an immersion medium of the third objective, wherein the cured polymer spacer is affixed directly to a front surface of the third objective.

2. The imaging apparatus of claim 1, further comprising:

a light source that generates a beam of excitation light;

at least one optical component that expands the beam of excitation light into the sheet of excitation light and directs the sheet of excitation light towards the scanning element; and the camera.

3. The imaging apparatus of claim 1, further comprising an image splitter positioned between the third objective and the camera, where the image splitter is configured to direct first wavelength light to a first portion of an image sensor within the camera and to direct second wavelength light to a second portion of the image sensor.

4. The imaging apparatus of claim 1, wherein the cured polymer spacer is positioned so that the oblique intermediate image plane is formed on a face of the cured polymer spacer.

5. The imaging apparatus of claim 1, wherein the second objective is an air objective and the third objective is a 1.0 NA water immersion objective, and wherein the associated optical interface comprises a cured polymer spacer having a refractive index of 1.33, wherein the cured polymer spacer is affixed directly to a front surface of the third objective, and wherein the cured polymer spacer is positioned so that the oblique intermediate image plane is formed on a face of the cured polymer spacer.

6. The imaging apparatus of claim 5, wherein the third objective is not coverglass corrected.

7. The imaging apparatus of claim 1, wherein the third objective and the associated optical interface are integrated together into a single package.

* * * * *